(12) United States Patent
Barker et al.

(10) Patent No.: US 6,781,609 B1
(45) Date of Patent: Aug. 24, 2004

(54) TECHNIQUE FOR FLEXIBLE INCLUSION OF INFORMATION ITEMS AND VARIOUS MEDIA TYPES IN A USER INTERFACE

(75) Inventors: Kevin S. Barker, Raleigh, NC (US); Charles E. Burkett, Chapel Hill, NC (US); David B. Lection, Raleigh, NC (US); Roland A. Merrick, Worcs. (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,487

(22) Filed: May 9, 2000

(51) Int. Cl.[7] .................................................. G06F 3/00
(52) U.S. Cl. ...................... 345/760; 345/744; 345/762; 345/764; 715/513
(58) Field of Search ............................... 345/700–866; 715/501.1, 513, 522

(56) References Cited

U.S. PATENT DOCUMENTS

| | | | |
|---|---|---|---|
| 6,067,559 A | * 5/2000 | Allard et al. | 709/202 |
| 6,342,907 B1 | * 1/2002 | Petty et al. | 345/762 |
| 6,345,292 B1 | * 2/2002 | Daugherty et al. | 709/214 |
| 6,476,828 B1 | * 11/2002 | Burkett et al. | 345/760 |
| 6,516,321 B1 | * 2/2003 | De La Huerga | 707/102 |
| 6,624,826 B1 | * 9/2003 | Balabanovic | 345/727 |
| 6,629,097 B1 | * 9/2003 | Keith | 707/5 |

OTHER PUBLICATIONS

Pedro Azevedo et al. "OVID to AUIML—User–Oriented Interface Modelling", 2000, IBM, pp. 1–8.*

* cited by examiner

*Primary Examiner*—John Cabeca
*Assistant Examiner*—X. L. Bautista
(74) *Attorney, Agent, or Firm*—Jeanine S. Ray-Yarletts; Gregory M. Doudnikoff; Marcia L. Doubet

(57) ABSTRACT

A method, system, and computer program product for flexibly including descriptive information items, and the various media resources used for those items, in a user interface (UI). One markup language document is used for the UI data content, and a separate markup language document is used for specifying the descriptive items and media resources to be used along with that content. This technique enables dynamically altering the descriptive items and media resources to be used for a UI document, without requiring change to the UI document itself This technique also enables developing the descriptive items and media resources separately from developing the UI document, without a requirement to share common files between these development efforts. The specifications of descriptive information items and media resources can be efficiently reused among multiple UI documents.

35 Claims, 37 Drawing Sheets

550

```
<MRI>                                          561
560 <MRI-AGGREGATION NAME="LastNameMRI">  572
    571 <META-CAPTION MRI-NAME="LastNameCaption" />
    573 <META-HINT MRI-NAME="LastNameHint" />
        </MRI-AGGREGATION>
                                        576
    575 <CAPTION NAME="LastNameCaption">  582
    581 <META-TEXT MRI-NAME="LastNameText" />
    583 <META-IMAGE MRI-NAME="Logo" />
        </CAPTION>
                                586
    585 <HINT NAME="LastNameHint">
    587 <META-TEXT MRI-NAME="TextEntryHint" />
        </HINT>
                    594        592
    591 <TEXT NAME="LastNameText">Last Name</TEXT>
    593 <TEXT NAME="TextEntryHint">Please enter a text string</TEXT>
    595 <IMAGE NAME="Logo" SRC="./logo.gif />
    597 <AUDIO NAME="LastNameAudioPrompt" SRC="./LastName.wav" />
        </MRI>
```

FIG. 1
(Prior Art)

```
105 <STRING NAME="LastName">
120 <HINT>Please enter the last name of the user</HINT>
140 <HELP>
    <META-TEXT>Enter a text string</META-TEXT>
150 </HELP>
160 </STRING>
```

FIG. 3

| | |
|---|---|
| <STRING> | A string is a collection of characters |
| <NUMBER> | A number is any valid numeric expression of the form "characteristic.fraction" |
| <BOOLEAN> | A boolean data item contains either a true value or a false value |
| <DATE> | Any valid date expression in a subset of ISO 8601 format |
| <TIME> | Any valid time expression in a subset of ISO 8601 format |
| <TCPIP-ADDRESS> | A compound data type that stores a TCP-IP formatted numeric address |
| <NETWORK-NAME> | A compound data type that can be resolved by host name or DNS to a TCP-IP address |
| <TELEPHONE-NUMBER> | A compound data type that can be used to address a device on a PSTN |
| <RICH-TEXT> | A compound data type that contains text, text formatting and special embedded tags to do linking |
| <IMAGE> | A complex data type that stores a bit stream that is rendered as a visual image |
| <AUDIO> | A complex data type that stores a bit stream that is rendered as a sound |
| <VIDEO> | A complex data type that stores a bit stream that is rendered as a video sequence |
| <BIT-STREAM> | A complex data type that stores a contiguous stream of binary data |
| <UDT> | User-definable type |

FIG. 4
(Prior Art)

```
105 <STRING NAME="LastName">
120 <HINT>Please enter the last name of the user</HINT>
140 <HELP>
        <META-TEXT>Enter a text string</META-TEXT>
150 </HELP>
410 <CAPTION>
420 <META-TEXT>Last Name< META-TEXT/>
440 <META-AUDIO SRC="http://www.ibm.com/captionAudio.wav" />
160 </STRING>
```

```
<AUIML NAME="SampleUI" MRI-SRC="./MRI.XML">
    <DATA-GROUP NAME="UI-DG">
        <STRING NAME="LastName">
            <CAPTION>
                <META-TEXT>Last Name</META-TEXT>
                <META-IMAGE SRC="./logo.gif />
                <META-AUDIO SRC="./LastName.wav" />
            </CAPTION>
            <HINT NAME="LastNameHint">
                <META-TEXT>Please enter a text string</META-TEXT>
            </HINT>
        </STRING>
        <STRING NAME="FirstName">
            <CAPTION>
                <META-TEXT>First Name</META-TEXT>
                <META-IMAGE SRC="./logo.gif />
                <META-AUDIO SRC="./FirstName.wav" />
            </CAPTION>
            <HINT NAME="FirstNameHint">
                <META-TEXT>Please enter a text string</META-TEXT>
            </HINT>
        </STRING>
        <GROUP>
            <BOOLEAN NAME="FULL-TIME-EMPLOYEE" />
            <NUMBER NAME="ANNUAL-SALARY" />
        </GROUP>
    </DATA-GROUP>
    <DIALOG NAME="UI-DIALOG">
        <VERTICAL-AREA />
        <HORIZONTAL-AREA />
    </DIALOG>
</AUIML>
```

FIG. 5B

```
                              511   512
510                            /    /
<AUIML NAME="SampleUI" MRI-SRC="./English/MRI.XML">
    <DATA-GROUP NAME="UI-DG">
        <STRING NAME="LastName">          521
                                          /
520— <INSERT-MRI MRI-NAME="LastNameMRI" />
        </STRING>
        <STRING NAME="FirstName">
540—<INSERT-MRI MRI-NAME="FirstNameMRI" />
        </STRING>
        <GROUP>
            <BOOLEAN NAME="FULL-TIME-EMPLOYEE" />
            <NUMBER NAME="ANNUAL-SALARY" />
        </GROUP>
    </DATA-GROUP>
    <DIALOG NAME="UI-DIALOG">
        <VERTICAL-AREA />
        <HORIZONTAL-AREA />
    </DIALOG>
</AUIML>
```

```
    <MRI>                          ⟋561
560 <MRI-AGGREGATION NAME="LastNameMRI">  ⟋572
    571 <META-CAPTION MRI-NAME="LastNameCaption" />
    573 <META-HINT MRI-NAME="LastNameHint" />
    </MRI-AGGREGATION>
                              ⟋576
575 <CAPTION NAME="LastNameCaption">  ⟋582
    581 <META-TEXT MRI-NAME="LastNameText" />
    583 <META-IMAGE MRI-NAME="Logo" />
    </CAPTION>
                          ⟋586
585 <HINT NAME="LastNameHint">
    587 <META-TEXT MRI-NAME="TextEntryHint" />
    </HINT>
            594    ⟋592
591 <TEXT NAME="LastNameText">Last Name</TEXT>
593 <TEXT NAME="TextEntryHint">Please enter a text string</TEXT>
595 <IMAGE NAME="Logo" SRC="./logo.gif />
597 <AUDIO NAME="LastNameAudioPrompt" SRC="./LastName.wav" />
    </MRI>
```

FIG. 6

| TAG TYPE | EXAMPLE TAGS |
|---|---|
| Media | <TEXT>, <IMAGE>, <AUDIO>, <VIDEO> |
| Media Inclusion | <META-TEXT>, <META-IMAGE>, <META-AUDIO>, <META-VIDEO> |
| Media Aggregation | <CAPTION>, <HINT>, <TIP>, <HELP> |
| Media Aggregation Inclusion | <META-CAPTION>, <META-HINT>, <META-TIP>, <META-HELP> |
| MRI Aggregation | <MRI-AGGREGATION> |

FIG. 7

| Media Type or Media Class | Media Type(s) to be Excluded |
|---|---|
| Text | <TEXT> |
| Audio | <AUDIO> |
| Video | <VIDEO> |
| Image | <IMAGE> |
| AURAL* | <AUDIO> |
| VISUAL* | <TEXT>, <IMAGE>, <VIDEO> |
| Caption | <CAPTION> |
| Hint | <HINT> |
| Tip | <TIP> |
| Help | <HELP> |
| USER-ASSISTANCE* | <HINT>, <TIP>, <HELP> |
| REALTIME-META-DATA* | <AUDIO>, <VIDEO> |

```
<AUIML NAME="SampleUI" MRI-URI="./MRI.XML">
    <DATA-GROUP NAME="UI-DG">
        <STRING NAME="LastName">            /821
        820 <INSERT-MRI MRI-NAME="LastNameMRI">
            830 <EXCLUDE-HINT />
                <EXCLUDE-CAPTION>
            840     <EXCLUDE-IMAGE />
                </EXCLUDE-CAPTION>
            </INSERT-MRI>
        </STRING>
        <STRING NAME="FirstName">
            <INSERT-MRI MRI-NAME="FirstNameMRI" />
        </STRING>
        <GROUP>
            <BOOLEAN NAME="FULL-TIME-EMPLOYEE" />
            <NUMBER NAME="ANNUAL-SALARY" />
        </GROUP>
    </DATA-GROUP>
    <DIALOG NAME="UI-DIALOG">
        <VERTICAL-AREA />
        <HORIZONTAL-AREA />
    </DIALOG>
</AUIML>
```

TECHNIQUE FOR FLEXIBLE INCLUSION OF INFORMATION ITEMS AND VARIOUS MEDIA TYPES IN A USER INTERFACE

BACKGROUND OF THE INVENTION

1. Field of the Invention

The present invention relates to the field of computer programming, and deals more particularly with a method, system, and computer program product for including information items having various media formats (such as text, image, audio, etc.) in a user interface that is specified in, and will be rendered from, a markup language document (such as an Extensible Markup Language, or "XML", document).

2. Reservation of Copyright

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

3. Description of the Related Art

The advanced user interfaces used by state-of-the-art applications often provide information using a wide variety of media, both for the user interface (UI) and for descriptive information items associated with the interface. The types of descriptive information items in common use today include tool tips; audio or visual explanations for an element presented via the UI, where these explanations may be selectable by a user; help text; hints, including "hover help" information that is provided when a user allows the cursor of a pointing device to hover over an element of a displayed UI; etc. The media types in which these descriptive items are provided may include text, video clips, graphic images, audio or speech, etc. Because these kinds of media are typically human-language specific, they are by convention stored in files which are separate from the files containing the software code of the application and/or the code from which the UI is created. This separate storage facilitates translating the stored information into different natural languages, sometimes referred to as "internationalization" of the information, without requiring changes or recompilation of the executable software. "Resource files" is a term commonly used to refer to these separately-stored media files, referring to the fact that the stored media information is used as a resource by an application program. An application typically includes a particular resource file by specifying a reference to the file system location where the resource file is stored (e.g. by providing the file system name to a compiler and/or linker utility). If multiple resource files are needed by the application, then multiple of these references are used. Resource files may be shared among multiple applications. These concepts are well known in the art.

Techniques for referencing media resource files from markup language documents are also known in the art. In the Hypertext Markup Language ("HTML") notation, for example, the HTML syntax which specifies a Web page may include a reference to a separately-stored image, or video clip, or other type of media resource. Typically, the Web developer specifies an explicit reference to the separately-stored media resource using its Uniform Resource Locator (URL) or Uniform Resource Identifier (URI). The developer of an Extensible Markup Language ("XML") document may also specify references to separately-stored media resources, which is also typically done by specifying a URL or URI reference. HTML and XML are both tag languages, where a tag language uses specially-designated constructs referred to as "tags" to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to treated as an e-mail address; the syntax "</email>" would then be inserted after the character string, to delimit where the e-mail character string ends.

While HTML uses a predefined set of tags, the syntax of XML is extensible and allows document developers to define their own tags which may have application-specific semantics. Because of this extensibility, XML documents may be used to specify many different types of information, for use in a virtually unlimited number of contexts. (A number of XML derivative notations have been defined, and continue to be defined, for particular purposes. "VoiceXML" is an example of one such derivative. References herein to "XML" are intended to include XML derivatives and semantically similar notations such as derivatives of the Standard Generalized Markup Language, or "SGML", from which XML was derived. Refer to ISO 8879, "Standard Generalized Markup Language (SGML)", (1986) for more information on SGML. Refer to "Extensible Markup Language (XML), W3C Recommendation 10-Feb.-1998" which is available on the World Wide Web from the World Wide Web Consortium, or "W3C", for more information on XML.)

The present invention is concerned with XML documents which are used to specify a user interface. In this UI context, XML tags may be defined which specify media resources that may be used to provide the descriptive items described above, such as help text, hints, etc. For example, if a UI has an element such as a text entry field requesting a user to enter his or her last name, this element may have an associated hint which reminds the user that this is the surname. The element may also have associated help information which provides more detailed information, such as guidance on any syntactic data entry requirements for the surname, references to other places where the surname value may have been previously entered, etc. This hint and/or help information may be rendered using text, audio, etc. A UI designer may in some cases choose to provide multiple media types for one or more of the descriptive information items associated with a particular UI element. In the surname example, the user may be given a choice of receiving the hint in audio or text format, in which case the UI XML document must specify or reference both types of media resource files. FIG. 1 provides an example of prior-art XML syntax 100 that may be used for specifying UI information for a single UI field. In this example, a <STRING> tag pair 105, 160 represents information for a last name, as indicated at 115 for the NAME attribute 110. The <HINT> tag pair 120, 130 brackets a textual hint 125. The <HELP> tag pair 140, 150 brackets textual help 145 which is enclosed within <META-TEXT> 142 and </META-TEXT> 147 tags. (In this example, a shortcut notation for the text within the <HINT> tag has been used, where this hint text has not been enclosed within <META-TEXT> tags.)

The techniques which exist in the prior art have a number of drawbacks, however. As will be obvious, as a UI XML document provides resource tags for more types of descriptive items, and/or more different media types for each descriptive item, the tagging in the source document becomes more verbose and cluttered, as well as more complex. The data content within the UI document may become obscured due to these multiple resource tags. In addition, a great deal of time can be expended when the developer of the UI XML document must explicitly and manually specify each type of descriptive information item to be provided for the UI content, and each media type to be provided for those items. In complex projects where one person or team develops the UI content and a different person or team develops the descriptive items, there may be a significant amount of overhead effort expended to coordinate sharing of files between these persons or teams during the development and testing phases, and to perform an integration of the final results. Furthermore, once such information has been statically specified for a particular UI XML document, it can be a time-consuming and error-prone process to revise that document such that it uses different descriptive items and/or different media types. The resource capabilities which are currently available in the art (such as in the Windows operating system and Java programming language) are rather limited. There is no capability for cross-referencing resources within a file to allow multiple use of a resource, for example, and very little structured support for resources. (For example, Windows allows definition of a dialog box, but this dialog box definition cannot reference other resources such as strings or other types of media in the resource file.)

Accordingly, what is needed is an improved technique for including descriptive information items, and the various media resources used for those items, in the markup language document from which a user interface is to be rendered.

SUMMARY OF THE INVENTION

An object of the present invention is to provide an improved technique for including descriptive information items, and the various media resources used for those items, in a user interface.

Another object of the present invention is to provide this technique by using one markup language document for the UI data content, and a separate markup language document for specifying the descriptive items and media resources to be used along with the content of that UI document.

Still another object of the present invention is to provide a technique which enables dynamically altering the descriptive items and media resources to be used for a UI document, without requiring change to the UI document itself.

Yet another object of the present invention is to provide a technique whereby the descriptive information items and media resources to be used for a UI document are specified in an MRI document, where the UI document and the MRI document may be developed independently.

Another object of the present invention is to provide a technique for efficiently reusing specifications of descriptive information items and media resources.

A further object of the present invention is to provide this reuse of specifications among multiple UI documents.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for flexibly including descriptive items and media types in a user interface. This technique comprises: providing a UI document, the UI document comprising a specification of one or more UI elements to be rendered to a user; providing a machine readable information (MRI) document, the MRI document comprising one or more aggregations of MRI elements, each of the aggregations specifying one or more descriptive items in one or more media formats, and wherein selected ones of the UI elements reference selected ones of the aggregations of MRI elements; applying the selected ones of the aggregations to expand the references by the selected ones of the UI elements, thereby creating a media-enhanced UI document; and rendering the media-enhanced UI document.

The MRI elements may comprise one or more of: media specifications, references to include one or more of the media specifications, descriptive media containers, and references to include one of more of the descriptive media containers. The media specifications may comprise one or more of: a text format, a video format, an audio format, and an image format. The technique may further comprise one or more exclusion statements to exclude particular ones of the descriptive media containers, and the applying may further comprise omitting the particular ones when expanding the references to create the media-enhanced UI document.

The descriptive media containers may comprise one or more of: a caption container, a hint container, a tip container, and a help container. In this case, the UI document may further comprise one or more exclusion statements to exclude particular media types within particular ones of the descriptive media containers, and the applying may further comprise omitting the particular media types when expanding the references to create the media-enhanced UI document.

The applying may further comprise creating a hash table for quick and efficient retrieval of the MRI elements for use by the rendering.

The UI document and the MRI document may be specified in an Extensible Markup Language (XML) derivative., which may be an abstract UI markup language (AUIML).

An alternate version of the MRI document may be used by the applying, thereby altering results of the rendering without requiring change to the UI document. The technique may further comprise: providing second UI document, this second UI document comprising second UI elements which reference particular ones of the aggregations of MRI elements; applying the particular ones of the aggregations to expand the second UI elements, thereby creating a media-enhanced second UI document by reusing the particular ones of the aggregations from the MRI document; and rendering the media-enhanced second UI document.

The present invention will now be described with reference to the following drawings, in which like reference numbers denote the same element throughout.

BRIEF DESCRIPTION OF THE DRAWINGS

FIG. 1 is an example specifying descriptive items for a field of a user interface according to the prior art;

FIG. 3 provides a table of data types that may be used in the markup notation processed by a preferred embodiment of the present invention;

FIG. 4 illustrates a more complex example of the prior art technique with which descriptive items, and various media forms thereof, may be specified in a UI document;

FIG. 5A provides an example of a prior art UI document specified in an extended XML notation, and FIGS. 5B and 5C then show how a preferred embodiment of the present invention uses two separate documents for separately specifying the user interface content, and the descriptive items and media types to be used along with that content, from this prior art document;

FIG. 6 provides tags that may be used in marking up UI documents and media resource documents, according to a preferred embodiment of the present invention;

FIG. 7 provides information that may be used with an optional exclusion feature of the present invention when reusing descriptive items and media resources;

FIG. 8 provides an example of this optional exclusion feature of the present invention whereby a specification of descriptive information items and media resources may be efficiently reused among UI documents having different needs;

DESCRIPTION OF THE PREFERRED EMBODIMENT

Figure 2:
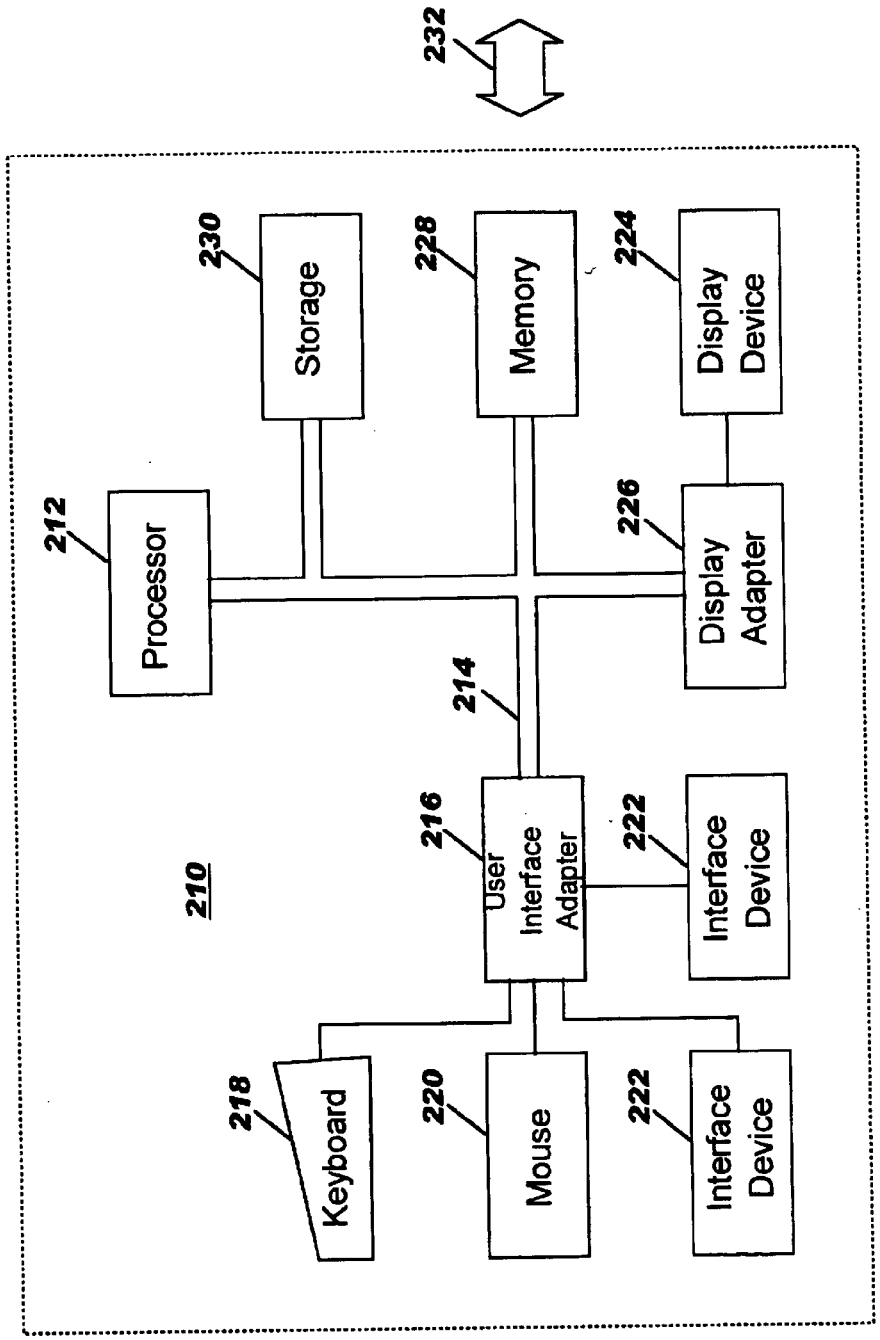
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a local area network (LAN) or a wide area network (WAN), or the workstation 210 can be a client in a client/server arrangement with another computer, etc. All of these configurations, as well as the appropriate communications hardware and software, are known in the art.

Software programming code which embodies the present invention is typically accessed by the microprocessor 212 of the workstation 210 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

In the preferred embodiment, the present invention is implemented as one or more modules (also referred to as code subroutines, or "objects" in object-oriented programming) of one or more computer software programs. This software may operate on a user's workstation. Alternatively, the software may operate on a server in a network, or on any other suitable device, or partly on a workstation and partly on a server or other device in a distributed fashion. These environments and configurations are well known in the art.

The present invention provides a technique for flexibly including descriptive information items and various media types in a user interface, where that UI is specified in (and is to be rendered from) a markup language document.

The present invention will be described with reference to the Extended Markup Language, and an intent-based extension thereof which is designed for user interface markup documents and which is referred to herein as the Abstract User Interface Markup Language, or "AUIML". In the preferred embodiment, the present invention is used with UI documents specified in XML or in the AUIML. Note, however, that other markup notations may exist or may be developed in the future which have similar properties to XML and the AUIML. Accordingly, while the present invention will be described with reference to examples expressed in the AUIML notation, it may also be used advantageously with information content expressed in other markup languages without deviating from the inventive concepts disclosed herein.

The AUIML is an XML extension developed by IBM. A description of the AUIML notation may be found in "AUIML: A Language for Marking-up Intent-based User Interfaces", a copy is which is found herein in Table I. The AUIML provides a particular XML vocabulary which is designed for specifying a user interface definition, where that specification conveys not only the data content to be used but also formatting information that is to be used when rendering the content. In AUIML, data content and information regarding interactions with a user (e.g. which items have a mandatory response, what to display if the user requests a data entry "hint", relationships among multiple data items and their values, etc.) are specified within <DATA-GROUP> and </DATA-GROUP> markup tags. An arbitrary number of <GROUP>, </GROUP> tags may be specified to define logical groups within a <DATA-GROUP>, where each group has an arbitrary number of data items. Data items may have a simple elementary data type, a user-defined type, or a complex data type. Examples of elementary types include: a string of characters representing a person's name, a Boolean value used with a checkbox, a number, etc. The types currently supported in the AUIML, as well as types which may be supported in extensions thereto, are shown in the table in FIG. 3. In the AUIML as in XML, the organization of the data items within the groups, and the organization of groups within the data groups, indicates the structure of the information content.

For more information on how AUIML documents are written and processed in the prior art, refer to the AUIML specification in Table I and/or to U.S. Pat. No. 6,476,828, entitled "Systems, Methods and Computer Program Products for Building and Displaying Dynamic Graphical User Interfaces" (Ser. No. 09/321,700, filed May 28, 1999), which is incorporated herein by reference and is referred to hereinafter as "the referenced invention".

According to the AUIML, descriptive information may be provided for each individual item of a UI or for an aggregation (i.e. a group) of UI items. The tags which are used in the preferred embodiment of the present invention to specify descriptive information include, but are not limited to, the following: <CAPTION>, <HINT>, <TIP>, and <HELP>. A <CAPTION> tag is used for specifying information that is preferably to be rendered as the title of the data item or group with which it is associated. A <HINT> tag is used for specifying information that is preferably to be rendered as a tooltip for its associated data item or group. A <TIP> is preferably rendered in a tip window for its associated data item or group, and <HELP> is preferably rendered as a separate page of information (for example, in a pop-up window). As will be obvious, an alternative tag syntax may be used, other types of descriptive items may be added, fewer of the descriptive items may be supported, and the manner of rendering the descriptive items may be altered, all without deviating from the concepts of the present invention.

FIG. 4 illustrates an example of the prior art technique with which these descriptive items, and various media forms thereof, may be specified in a UI document. This example expands on the previously-described example in FIG. 1, adding a <CAPTION> 410 which is comprised of a textual caption 420 and an audio caption 440. The textual caption 420 is similar to the textual help 140. However, note that the content for audio caption 440 is not defined directly in the UI document (i.e. as the value of the <CAPTION> tag), as is the textual caption 420. Instead, a reference to a separately-stored audio resource file is specified using a SRC=attribute format. The value of the SRC attribute 442 is a URI 444, indicating that a separately-stored audio resource file having this URI 444 is to be located and used to provide some type of audio caption information. A similar URI reference syntax may be used, if desired, to specify <META-AUDIO>, <META-VIDEO>, and/or <META-IMAGE> resource files for each of the types of descriptive information.

The preferred embodiment of the present invention will now be discussed in more detail with reference to FIGS. 5 through 28.

An example document of the prior art, where multiple resource tags are specified for the last name component 510 and first name component 530, is shown in FIG. 5A. This document 500 has been encoded using the AUIML, wherein the data content of a UI is enclosed within a <DATA-GROUP> and formatting (layout) information for that content is enclosed within layout tags such as <DIALOG> or <PANEL>, <PROPERTY-SHEET>, or <WIZARD> tags. (Refer to the AUIML specification and/or the referenced invention for more information on the prior art AUIML syntax.) As seen in this example, a significant number of tags are used to specify the descriptive information and media resources (see elements 515 and 535).

Rather than specifying the descriptive items and media resources directly within the UI document, in the manner which was depicted in the prior art examples of FIGS. 1, 4, and 5A, the present invention specifies this information in a separate "MRI document" or "MRI file", so called because it provides the Machine Readable Information ("MRI") for use with the UI. In the preferred embodiment, the MRI document is correlated to the UI document through the value of an MRI-SRC attribute on the root tag of the UI document. In one aspect of the present invention, the multiple resource tags which were used in the prior art for a component of the UI are now replaced by a single tag. This single tag provides a reference to an element in the MRI document where this element (which may itself comprise one or more tags) then provides the MRI information to be used for that component. (In a second aspect of the present invention, to be described below, multiple tags may be used in the UI document when specifying the media resources for a component.) The descriptive items and media resources to be used are then specified in this separate MRI document. In the preferred embodiment, this single tag has the syntax <INSERT-MRI MRI-NAME="MRI-file-name"/>, and the separate MRI document is enclosed by an opening <MRI> tag and a closing </MRI> tag. Within this <MRI> definition in the MRI document, an <MRI-AGGREGATION NAME="MRI-file-name"> is defined. The value of the MRI-NAME attribute on the <INSERT-MRI> tag and the NAME attribute on the <MRI-AGGREGATION> tag are then used to correlate a reference for a component of the UI document with its associated MRI definition in the MRI document. FIGS. 5B and 5C illustrate how the single UI document of FIG. 5A is changed to use this approach of the present invention. FIG. 5B shows the new form of UI document (element 510), wherein an MRI-SRC attribute 511 indicates that the MRI information is stored in a file 512. (In this example, the file directory "ENGLISH" indicates that this MRI file presumably contains media in the English language. Translation of MRI may be facilitated in this manner, where the same MRI may be translated into other languages in the same or another directory, and the appropriate language version is then used for a particular rendering of the UI document by altering the MRI-SRC attribute value.) FIG. 5B also shows that the multiple resource tags 515 of FIG. 5A (for the last name field) are now replaced by the single <INSERT-MRI> tag 520, and similarly the multiple resource tags 535 (for the first name field) are replaced by the single tag 540. FIG. 5C depicts an example MRI document 550 that is used, along with the UI document 510 of FIG. 5B, to flexibly include descriptive information items of various media types in the UI which will be rendered. The values 521, 561 of the MRI-NAME attributes in the UI document 510 (in FIG. 5B) and MRI document 550 (in FIG. 5C) provide the correlation which ties the MRI for the last name component between the two documents together at run-time. (In this example, the MRI in FIG. 5C provides only the media resources for the last name field; the media resources for the first name field may be provided in a similar manner within this MRI document 550, or may use different features of the present invention that will be described.)

FIG. 6 provides a table showing the different types of MRI tags, and examples thereof, that may be used in the preferred embodiment. (Note that these examples are provided by way of illustration, and not of limitation: other tag types may be used instead of, or in addition to, these examples to support different media. Furthermore, a particular embodiment of the present invention is not required to support all of the tags shown in FIG. 6. As will be obvious, changes to the syntax of the tags may be made without deviating from the scope of the present invention.) These tags are divided into five different types: media, media inclusion, media aggregation, media aggregation inclusion, and MRI aggregation. The file structure of an MRI document has a uniform reference mechanism with which these references are resolved, where each of these types of MRI tags follows particular inclusion rules, as will now be described.

A Document Type Definition (DTD) expressing the grammar of the MRI markup language (MRIML) used by the preferred embodiment of the present invention is provided herein in Table II.

The media tags are used when specifying content in-line, or specifying a URI reference to a stored media file. According to the present invention, media types are specified in the MRI document. See elements 591, 593, 595, and 597 of FIG. 5C. These media types can then be referenced from media inclusion tags. (Note that in the prior art, a descriptive item such as a caption could not specify a media item in-line except through use of a <META- . . . > tag, nor was resource file indirection—as provided by the present invention—supported.)

Media inclusion tags include their content using name correspondence and media type matching. An example of this is shown in FIG. 5C, where the <META-TEXT> tag 581 has the MRI-NAME value of "LastNameText": by finding a corresponding name for a corresponding media type, it can be seen that this tag 581 will be associated at run-time with the <TEXT> tag 591 (the matching media type) and the NAME "LastNameText" 592 (the matching name value). Tags 583 and 587 are also media inclusion tags.

Media aggregation tags include their content by allowing a plurality of children tags to be included, where the children tags specify the media content for the aggregation. A media aggregation tag provides a definition, and has the attribute "NAME=". An example is shown in FIG. 5C, where the <CAPTION> media aggregation tag 575 includes two child tags 581, 583, where these child tags specify textual and image content for the last name caption, respectively. Tag 585 is another example of a media aggregation tag, and has a single child 587. Media aggregation tags are referenced from a media aggregation inclusion tag. (Media aggregation tags 575 and 585, for example, are referenced from media aggregation inclusion tags 571 and 573, respectively.)

Media aggregation inclusion tags do not define media content, but rather include media content by reference to a definition in a media aggregation which has the same container type and name correspondence. Media aggregation inclusion tags do not have child tags, and use an "MRI-NAME=" attribute to provide the reference to the associated definition of the same container type. The <META-CAPTION> tag 571 in FIG. 5C, as an example, refers to the content defined in <CAPTION> tag 575, because these tags are of the same container type of CAPTION and have the same attribute value "LastNameCaption" (see elements 572 and 576).

MRI aggregation tags bracket the MRI for a UI component, and include their contents by specifying media aggregation inclusion tag(s) which use an MRI-NAME attribute. In the example of FIG. 5C, the MRI aggregation tag 560 specifies two media aggregation inclusion tags 571, 573. The first tag 571 is associated by container matching and name correspondence with tag 575 (including its children 581, 583). The second tag 573 is associated, again using container matching and name correspondence, with tag 585.

For a given UI component, either an INSERT-MRI tag may be included (as shown in FIG. 5B at 520 and 540), as in the first aspect described above, or in a second aspect of the present invention, selected ones of the plurality of media aggregation inclusion tags may be used. Whereas the style used in FIG. 5B specifies a single tag 520 to include all the MRI defined in MRI document 550 at <MRI-AGGREGATION> tag 560 for use in rendering the last name field, the alternative style of using multiple media aggregation inclusion tags (up to one each of the media aggregation inclusion tags depicted in FIG. 6) may be used in the UI document to explicitly reference MRI in the MRI document according to this second aspect. As an example, a caption and help for the Last Name field may be referenced as follows:

<STRING NAME="LastName">
      <META-CAPTION      MRI-NAME="LastNameCaption"/>
      <META-HELP      MRI-NAME="EmployeeInfoHelpPanel"/>
    </STRING>

According to an optional feature of the present invention, MRI inclusion tags (i.e. the media inclusion tags and media aggregation inclusion tags) may be specified in the layout of the UI document, in addition to just allowing them in the data group. When this option is supported and used within an UI document, the definitions used in the layout preferably include media resources into the UI document by overriding any definitions in the data group for a particular UI component. (The flowcharts which are described below automatically implement this optional override feature through the manner in which an AUIML document and its associated MRI document are processed.)

According to another optional feature of the present invention, "EXCLUDE" tags may be defined. An EXCLUDE tag enables re-using previously specified MRI, but omitting selected parts thereof when the MRI is being rendered. Use of this exclusion feature enables efficiently reusing descriptive information items and media resources among UI documents having different needs. For example, all textual MRI from a previously specified MRI may be excluded, or all captions may be excluded therefrom. In the preferred embodiment of this optional feature, exclusion is supported only when the <INSERT-MRI> style of providing MRI for a UI component is used, although alternatively an exclusion feature may be provided with media aggregation inclusion tags as well. (For example, a <META-CAPTION> tag might have a child tag such as <EXCLUDE-AUDIO />.) Furthermore, while the preferred embodiment allows the exclusion syntax as one or more child elements of the <INSERT-MRI> tag, this is by way of illustration and not of limitation: an implementation may be provided where the exclusion tags are allowed at other places within the UI document, without deviating from the scope of the present invention. FIG. 7 provides a table showing the types and classes that may be used with a preferred embodiment of this exclusion feature. (The presence of an asterisk in the leftmost column of the table in FIG. 7 indicates a media class, which comprises one or more media types. When a media class is specified on an exclude tag, such as <EXCLUDE-VISUAL>, this is an indication that all of the associated media are to be excluded.) This exclusion feature will be particularly useful when supporting user interfaces having different modalities, such as audio-only or IVR (Interactive Voice Response), and for supporting pervasive devices where memory for dealing with a large amount of meta information may be limited. (Note that these media types and classes are merely examples of those that may be supported, and are provided by way of illustration, and not of limitation. Furthermore, a particular embodiment of the present invention is not required to support all of the media types and media classes shown in FIG. 7, and different or additional types and classes may be supported without deviating from the scope of the present invention.)

An example of using MRI exclusion is shown in UI document 800 of FIG. 8. As can be seen by comparing FIG. 8 with FIG. 5B, both UI document 510 and UI document 800 reference MRI for a last name field (elements 520 and 820, respectively). However, in UI document 800 the exclusion feature has been used to selectively exclude portions of the <MRI-AGGREGATION> 560 in MRI document 550 of FIG. 5C which is referenced by MRI-NAME attribute 821. In particular, all forms of HINT information are excluded by the <EXCLUDE-HINT/> tag 830, and caption information in image form is excluded by the tags at 840.

The logic with which the preferred embodiment of the present invention may be implemented will now be described with reference to the flowcharts in FIGS. 9 through 28.

Figure 9:
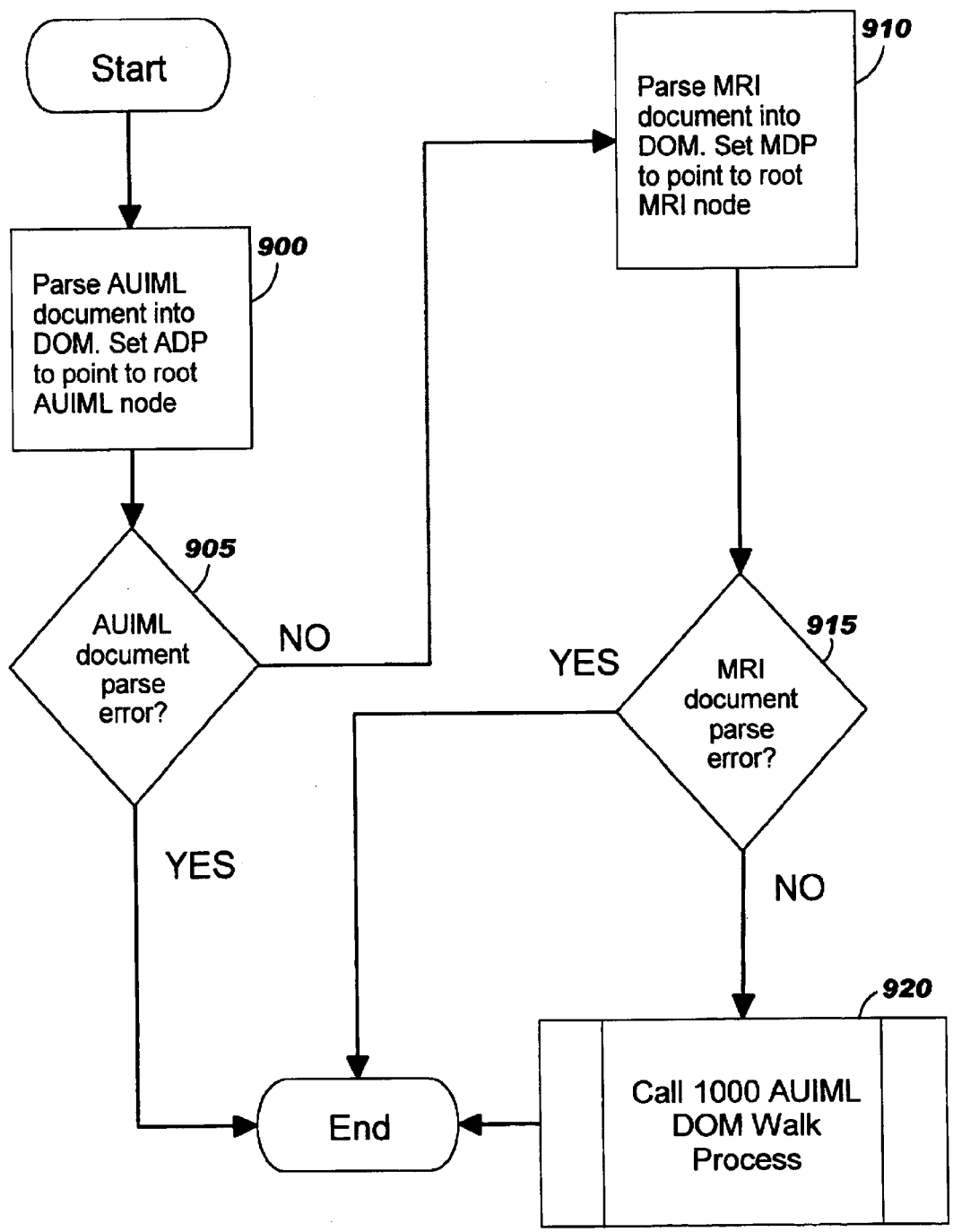
FIGS. 9 through 28 illustrate flow charts which set forth the logic which may be used to implement a preferred embodiment of the present invention.

The process for resolving the MRI for a particular UI document begins at Block 900 of FIG. 9, where a UI document (in the preferred embodiment, a UI document expressed using the AUIML) is parsed into a "DOM tree", and a pointer "ADP" (for "AUIML Document Pointer") is set to point to the root node of this tree. As is well known in the art, when a parser for XML or an XML derivative processes an input file, it reads the file and constructs a DOM tree based on the syntax of the tags embedded in the file and the interrelationships between those tags. The tag syntax is stored in the nodes of the DOM tree, and the shape of the tree is determined from the tag relationships. "DOM" is an acronym for "Document Object Model", which is a language-independent application programming interface ("API") for use with documents specified in markup languages including XML. DOM is published as a Recommendation of the World Wide Web Consortium, titled "Document Object Model (DOM) Level 1 Specification, Version 1.0" (1998) and available on the World Wide Web from the W3C.

"DOM tree" refers to the logical structure with which a document is modeled using the DOM. A DOM tree is a hierarchical representation of the document structure and contents. Each DOM tree has a root node and one or more leaf nodes, with zero or more intermediate nodes, using the terminology for tree structures that is commonly known in the computer programming art. A node's predecessor node in the tree is called a "parent" and nodes below a given node in the tree are called "child" nodes. A DOM tree can be streamed to a markup language document and back again, using techniques which are well known in the art. The DOM API enables application programs to access this tree-oriented abstraction of a document, and to manipulate document structure and contents (that is, by changing, deleting, and/or adding elements). Further, the DOM enables efficiently navigating the structure of the document.

Block 905 asks whether a parsing error was encountered while parsing the AUIML document. If so, then the document cannot be rendered, and processing stops. Otherwise, the MRI document is parsed (Block 910) into a DOM, and a pointer "MDP" ("MRI Document Pointer") is set to point to the root node of this MRI DOM tree. Block 915 tests whether a parsing error occurred while parsing the MRI document. If so, the MRI provided according to the present invention cannot be resolved, and processing is halted. Otherwise, Block 920 invokes the logic of FIG. 10 to perform a DOM walk process. Control returns to the processing of FIG. 9 when the DOM walk has completed and the MRI has been resolved, after which an expanded UI document resulting from this resolution process can be rendered for the document user. (The actual rendering of the expanded document uses prior art techniques which are well known, and accordingly is not shown.)

Figure 10:
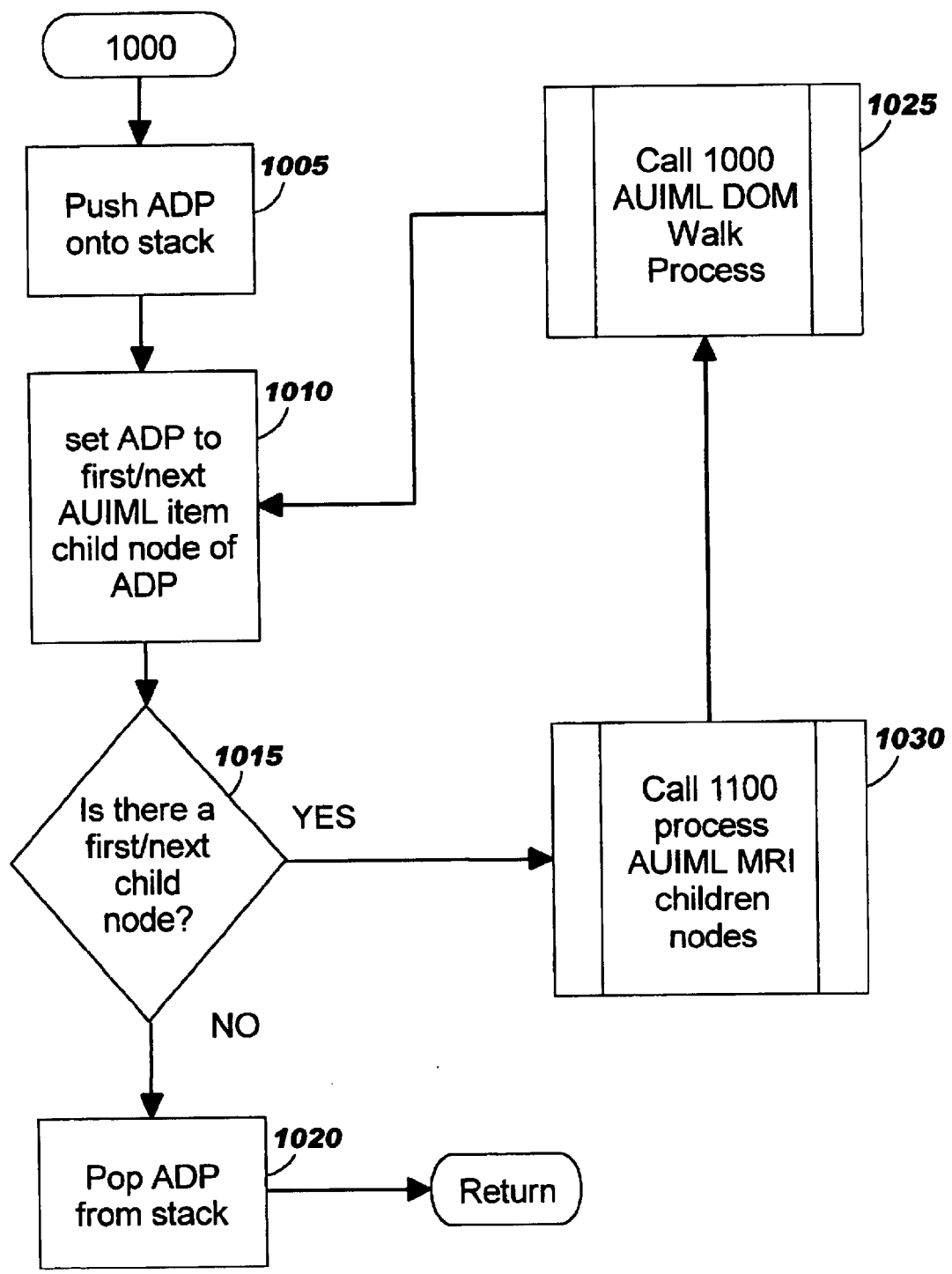

The DOM walk process depicted in FIG. 10 is a recursive process which is first invoked from Block 920 of FIG. 9, and may be subsequently invoked from Block 1025. Upon entering the logic of this process, the ADP pointer is pushed onto a stack (Block 1005). (Note that all pointers referenced herein are preferably implemented as global variables.) Block 1010 then moves the ADP pointer to point to its first child for the first invocation of Block 1010 for a traversal through FIG. 10 for a parent node, or to the next child of this parent node for subsequent invocations. Block 1015 then asks whether there was such a child node. If there was, control transfers to Block 1030; otherwise, processing continues at Block 1020, which pops the ADP pointer from the stack and returns to the invoking logic.

Figure 11:
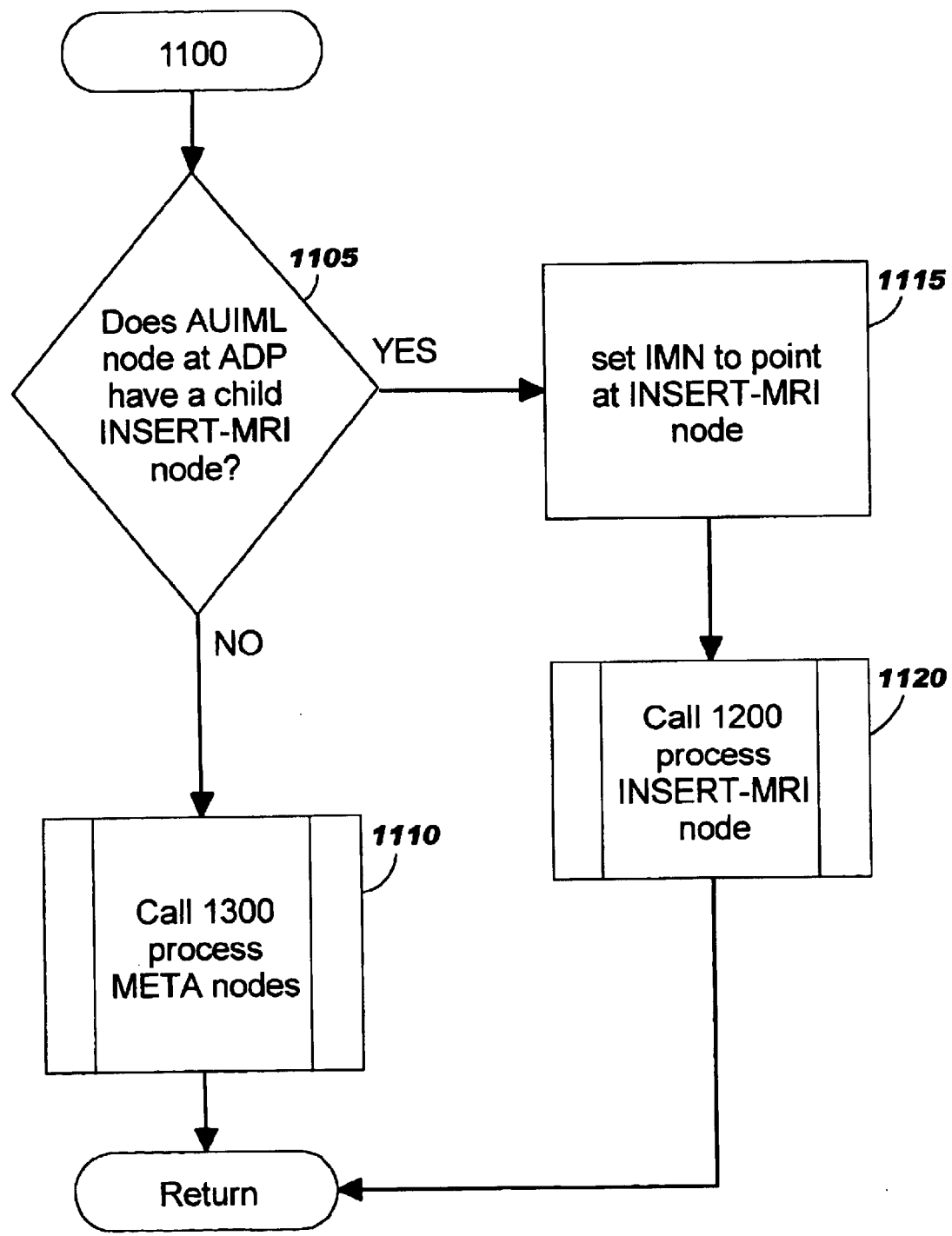

Block 1030 invokes the logic of FIG. 11 to process the AUIML child nodes in this branch of the AUIML DOM tree, searching for MRI tags. As previously stated, the tags in the UI document may be of the form <INSERT-MRI>or <META- . . . >. Upon returning from this invocation in Block 1030, a recursive invocation of the logic of FIG. 10 is made from Block 1025, after which control transfers to Block 1010 to begin processing another child node.

FIG. 11 depicts the logic used to process MRI inclusion nodes of the AUIML DOM tree. Block 1105 asks whether the AUIML node pointed to by ADP has a child node representing an <INSERT-MRI> tag. If so, control transfers to Block 1115 which sets a pointer "IMN" (for "Insert MRI Node") to point to this child node, and Block 1120 invokes the logic of FIG. 12 to process this INSERT-MRI node. When control reaches Block 1110, the alternate style used for providing MRI for a UI component was used in the UI document, where one or more <META- . . .> tags will be present. Block 1110 invokes the logic of FIG. 13 to process each of the nodes representing these tags. (While Block 1110 is shown in FIG. 11 as a single invocation, it will be obvious to one of ordinary skill in the art how to repeat this invocation for each META node which is a child of the node pointed to by ADP.) Upon returning from the invocation of FIG. 12 or FIG. 13, control returns to the logic from which FIG. 11 was invoked.

Figure 12:
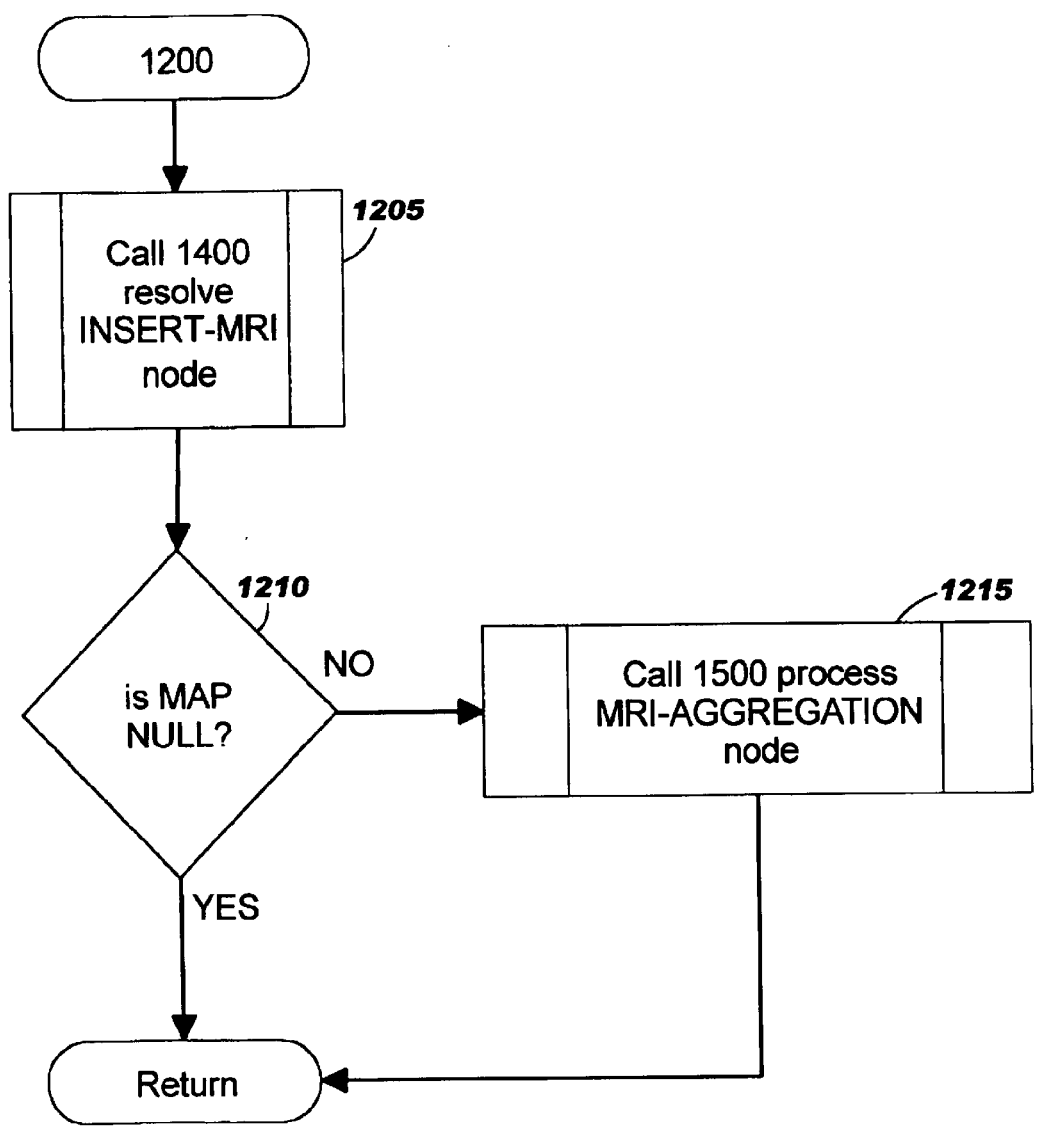

An INSERT-MRI node is processed using the logic of FIG. 12. The processing begins at Block 1205, which invokes the logic of FIG. 14 to resolve the MRI-NAME reference for this node. Block 1210 then checks a "MAP" pointer ("MRI Aggregation Pointer") that is set during the processing of FIG. 14, to see if the pointer has a null value. If it does, then the matching MRI-AGGREGATION node (i.e. the node of the DOM tree representing the <MRI-AGGREGATION> tag having the same attribute value as specified as an attribute value for the <INSERT-MRI> tag) could not be found, and the processing of FIG. 12 ends. Otherwise, when the pointer is not null, Block 1215 invokes the logic of FIG. 15 to process the located MRI-AGGREGATION node.

Figure 13:
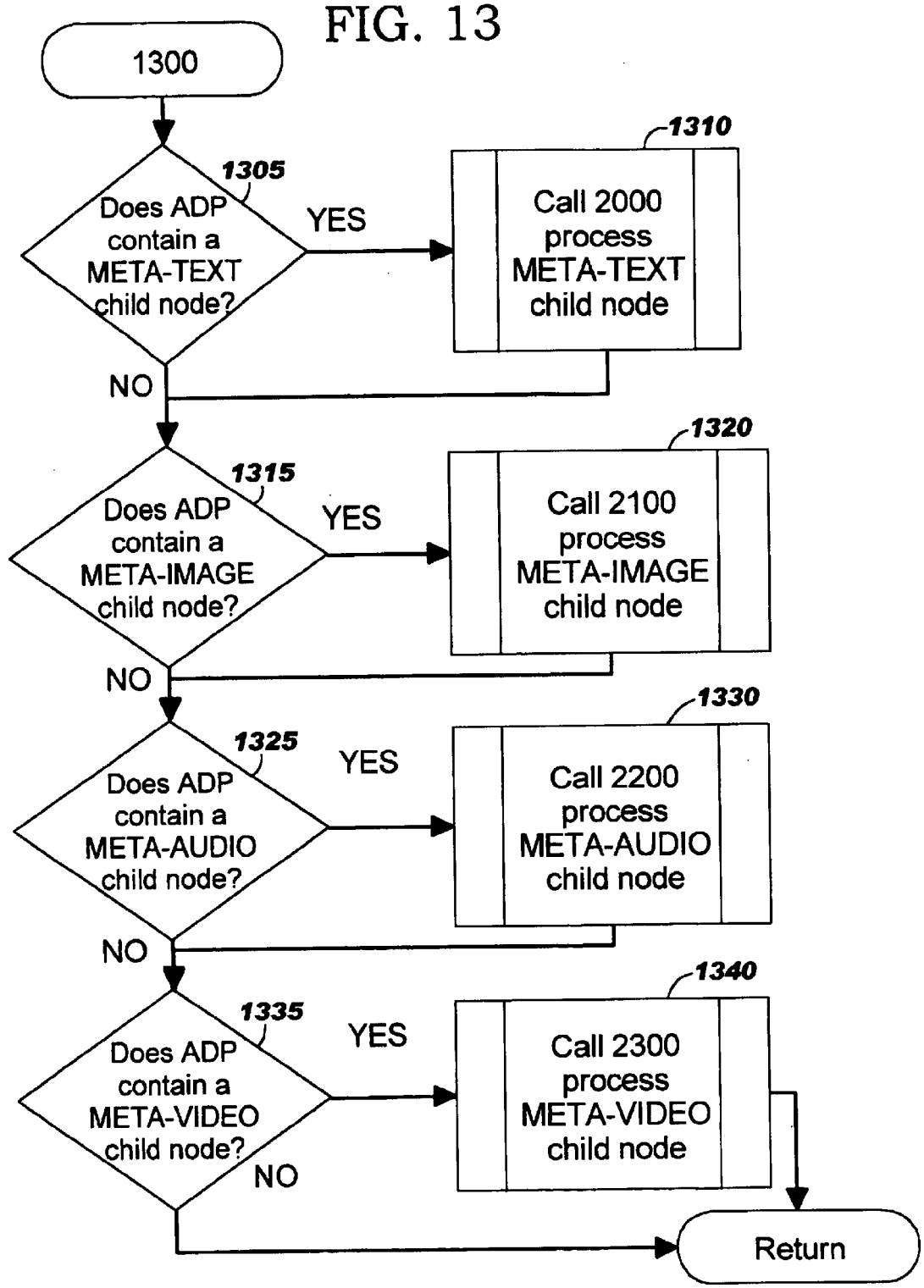

FIG. 13 represents the logic which is preferably used to process the <META- . . .> inclusion nodes of the AUIML DOM tree when this style of specifying MRI for a UI component was used. Block 1305 checks to see whether the AUIML node pointed to by ADP has a child node representing a <META-TEXT> tag. If so, Block 1310 invokes the processing of FIG. 20 to process this META-TEXT node, after which control transfers to Block 1315. Block 1315 checks to see if there is a child node representing a <META-IMAGE> node. If so, Block 1320 invokes the processing of FIG. 21 to process this META-IMAGE node. In a similar manner, Blocks 1325 and 1330 are used to invoke the processing of FIG. 22 for a META-AUDIO node, and Blocks 1335 and 1340 invoke FIG. 23 to process a META-VIDEO node. (It will be obvious to one of ordinary skill in the art how to modify FIG. 13 if a particular implementation of the present invention supports fewer of these media inclusion tags, or additional inclusion tags for alternative media types.)

Figure 14:
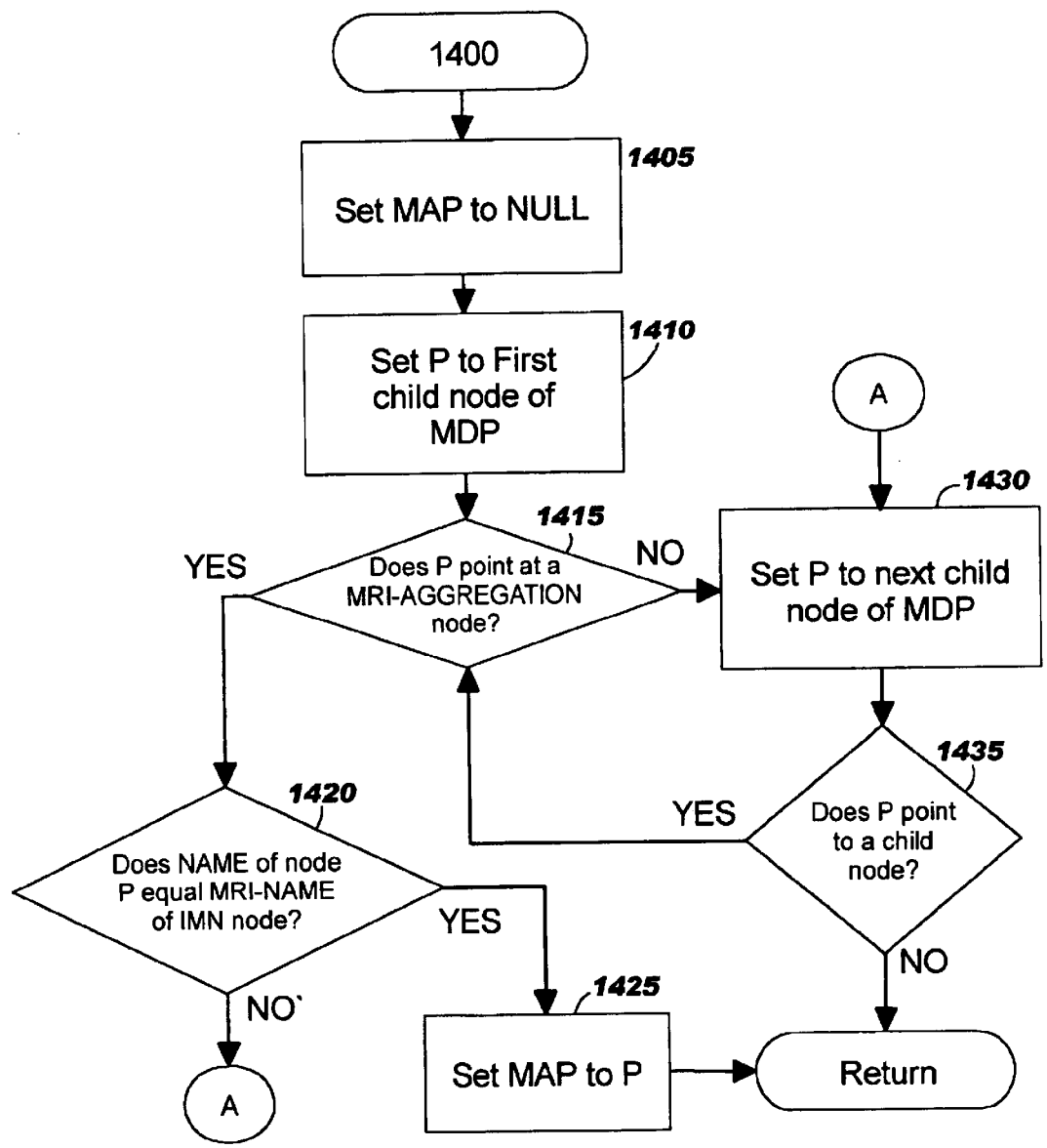

FIG. 14 resolves the MRI-NAME reference for an INSERT-MRI node, and is invoked from Block 1205 of FIG. 12. Block 1405 initializes the MAP pointer, which will be used to point to the MRI-AGGREGATION node in the MRI DOM tree, to a null value. Block 1410 sets a pointer "P" to point to the first child of the node being pointed to by MDP. (With reference to the example MRI document 550 in FIG. 5C, the MDP pointer points to the node representing the <MRI> tag, and the P pointer will thus now point to its child node which represents <MRI-AGGREGATION> tag 560.) Block 1415 asks whether P points at an MRI-AGGREGATION node. If so, control transfers to Block 1420. Otherwise, control transfers to Block 1430.

Block 1420 checks whether the value of the NAME attribute for the node to which P is pointing is the same as the value of the MRI-NAME attribute of the INSERT-MRI node (i.e. the node pointed to by IMN). If so, then the matching MRI-AGGREGATION node has been found. Block 1425 therefore sets MAP to point to this node, and control exits from FIG. 14 to the invoking logic. Otherwise, control transfers to Block 1430.

Block 1430 is reached when the MRI-AGGREGATION node has not yet been located. A breadth-wise traversal of the MRI DOM tree is then performed by moving the pointer P to the next child of the node pointed to by MDP. Block 1435 asks whether there was such a node; if so, control returns to Block 1415 to evaluate this child node. Otherwise, when there are no more child nodes to evaluate, then the INSERT-MRI cannot be successfully resolved and the processing of FIG. 14 ends by returning control to the invoking logic.

Figure 15:
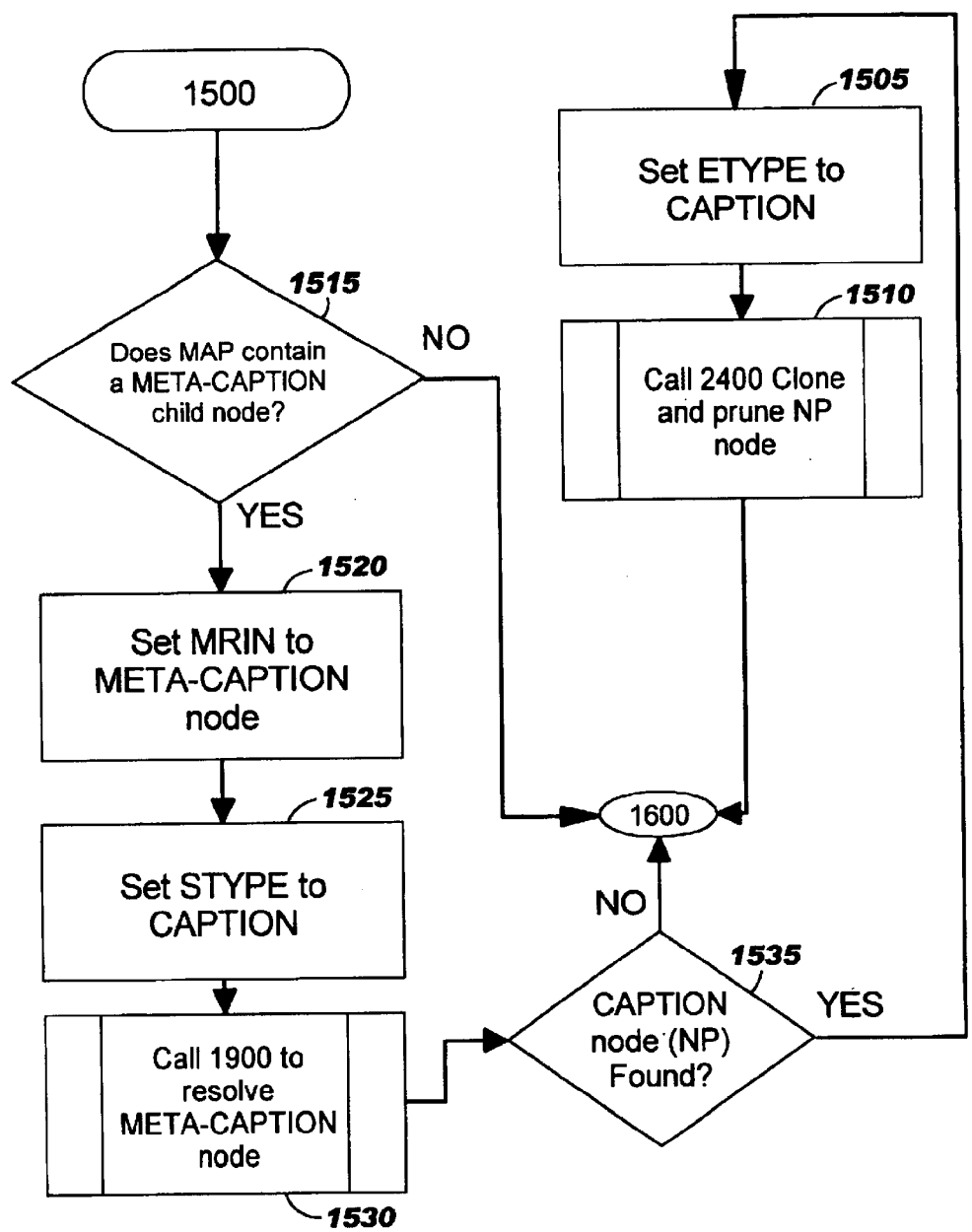
Figure 16:
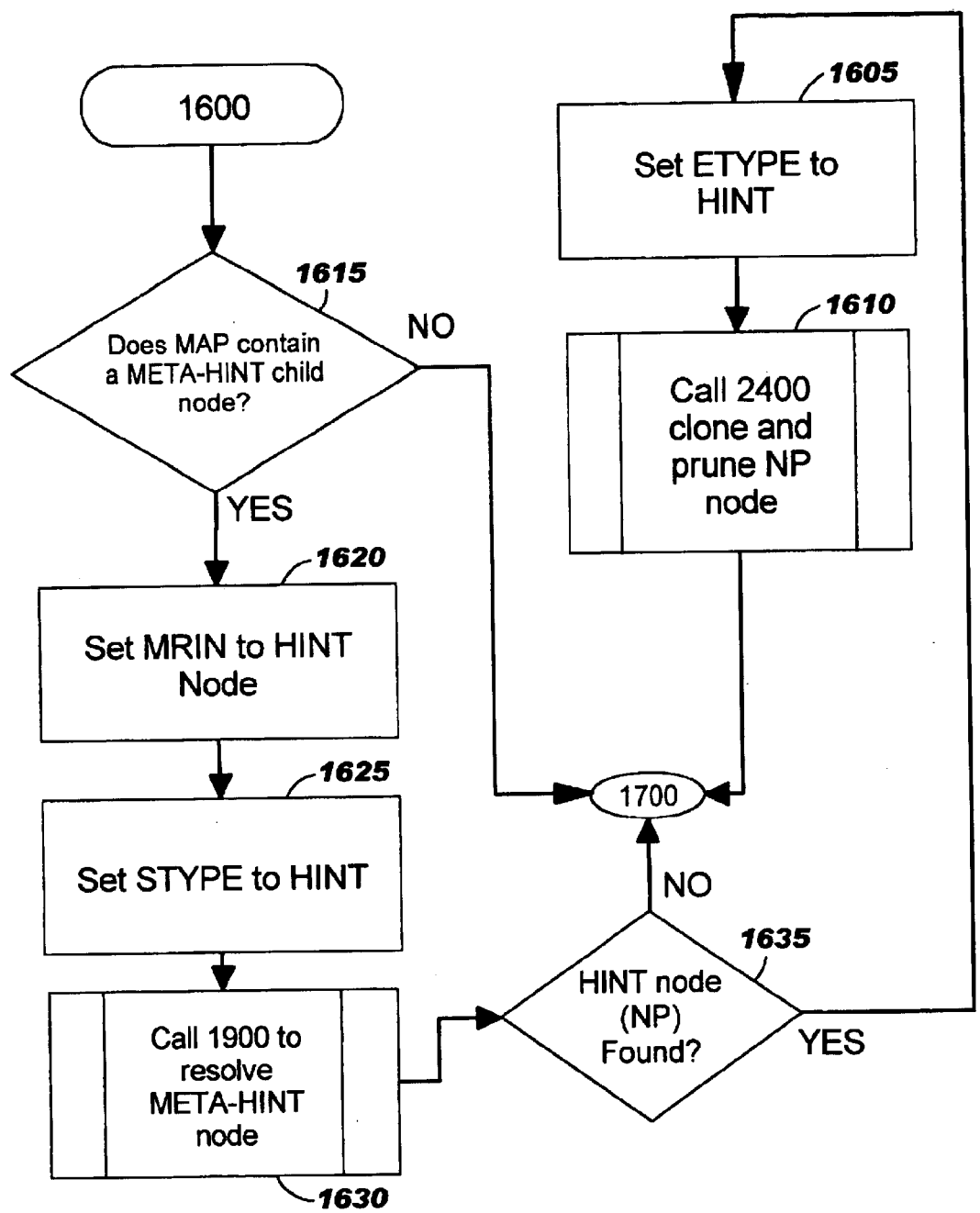
Figure 17:
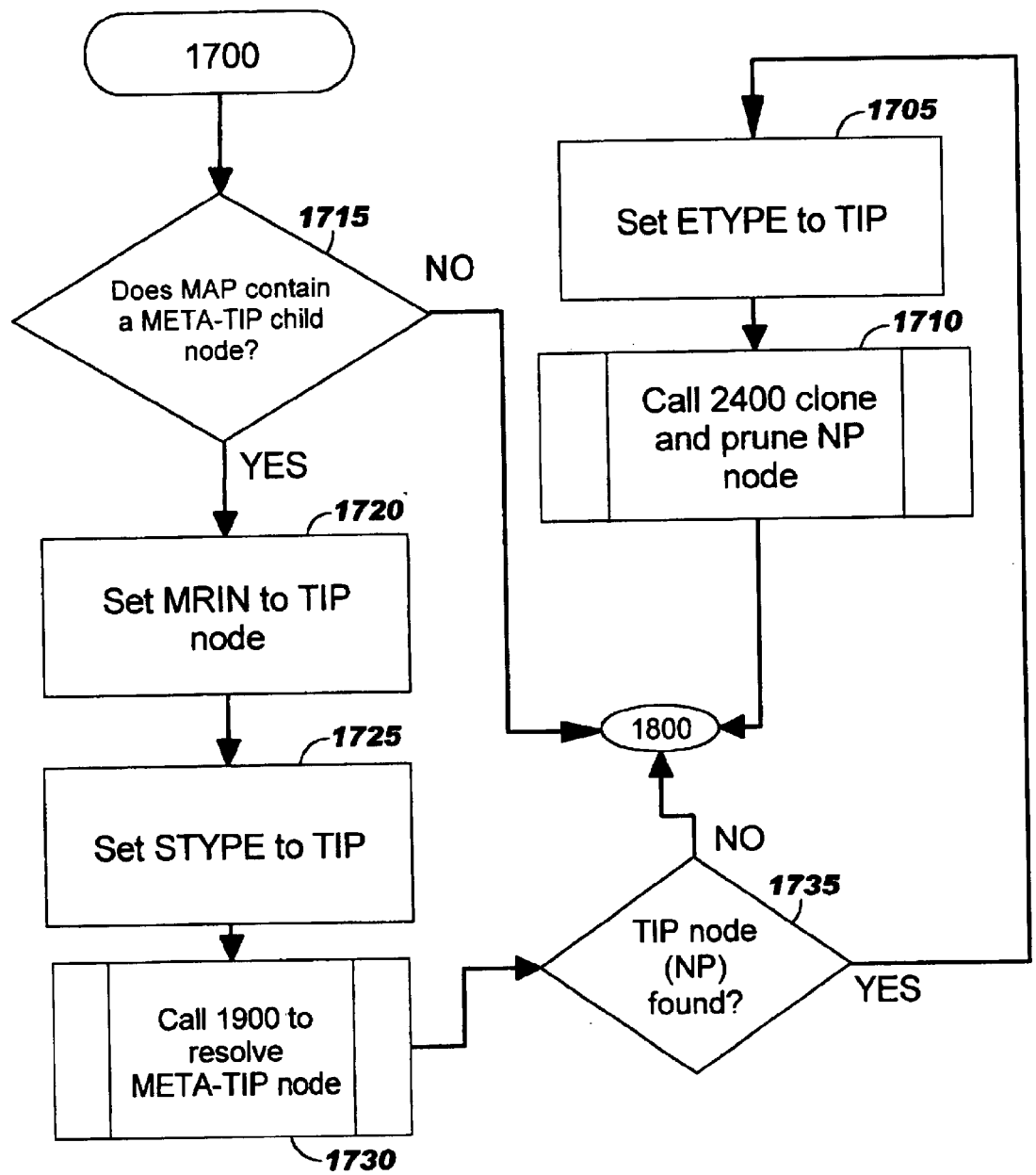
Figure 18:
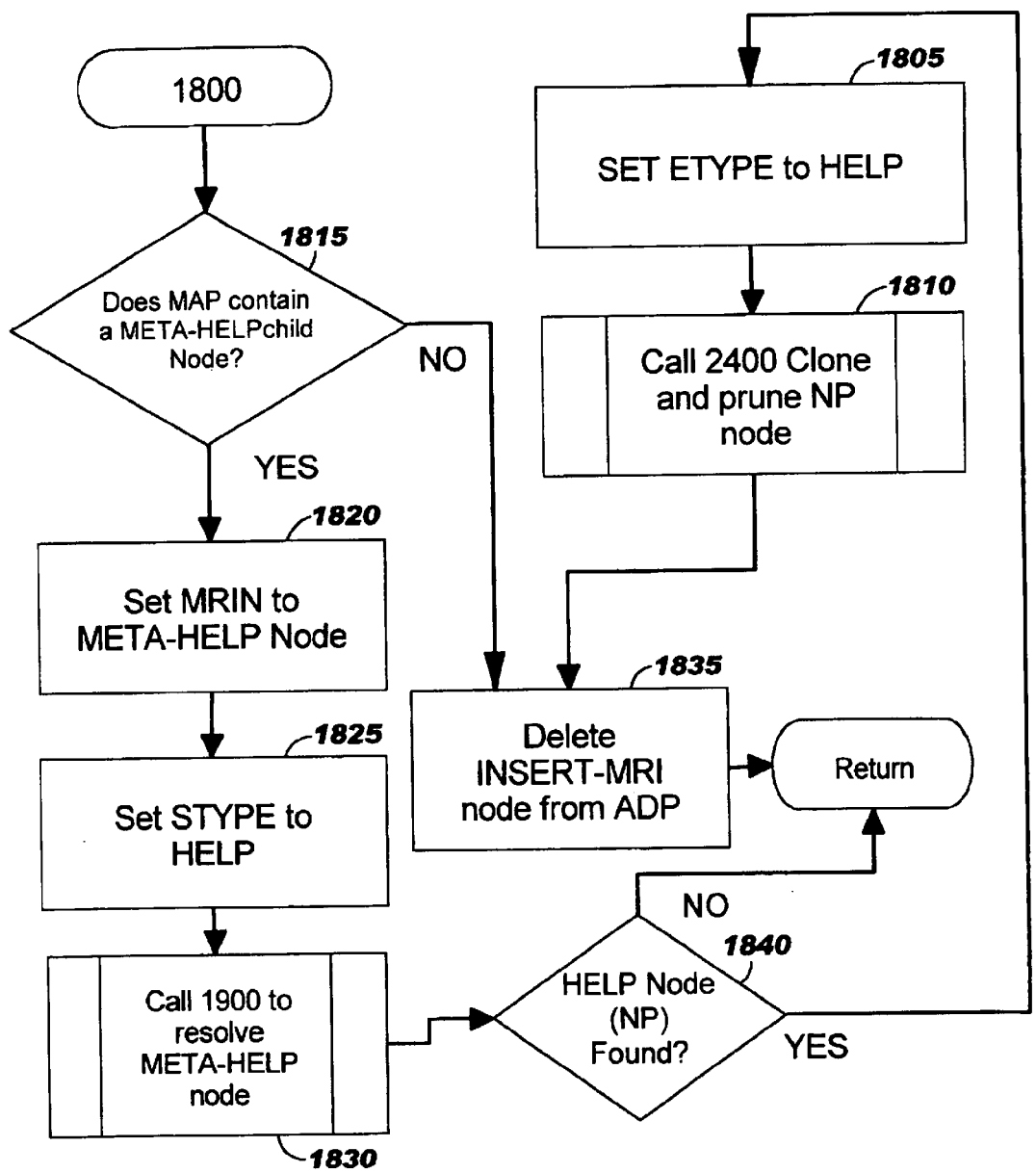

FIG. 15 begins the processing of an MRI-AGGREGATION node which was located by the processing of FIG. 14, and is invoked from Block 1215 of FIG. 12 with the MAP pointer pointing to the MRI-AGGREGATION node. FIGS. 16–18 continue the processing of the MRI-AGGREGATION node, as will be described. Block 1515 asks whether the node pointed to by MAP has a child which is a META-CAPTION node, If not, control transfers to Block 1600 of FIG. 16. Otherwise, Block 1520 sets an "MRIN" pointer ("MRI Node") to point to the child node containing the META-CAPTION, and Block 1525 sets a variable "STYPE" to the value CAPTION. (This STYPE variable is subsequently used to find the associated container node in the process of container matching and name correspondence, as previously described with reference to finding the CAPTION container 575 for <META-CAPTION> tag 571 of FIG. 5C.) Block 1530 then invokes the processing of FIG. 19 to resolve this META-CAPTION node. Upon returning from FIG. 19, Block 1535 asks whether the matching CAPTION container node (which will be pointed to by pointer NP) was found. If so, control transfers to Block 1505, and if not, control transfers to Block 1600 of FIG. 16.

Block 1505 sets a parameter or variable "ETYPE" (for "Exclusion Type") to CAPTION. (The ETYPE parameter is subsequently used during the processing of FIG. 24.) Block 1510 then invokes the processing of FIG. 24 to clone (i.e. make a copy of) this CAPTION node (referred to in FIG. 15 as the "NP" node because a node pointer NP points to it during subsequent processing) for inclusion in the AUIML DOM and prune it from the MRI DOM, after which control transfers to Block 1600 of FIG. 16 to continue processing the MRI-AGGREGATION node. (Note that references herein to making a clone of a node are to be interpreted as copying the node and any descendant nodes which it may have.)

FIG. 16 continues the processing of the MRI-AGGREGATION node, and performs similar processing for hints to that performed for captions by FIG. 15. Block 1615 asks whether the node pointed to by MAP has a child which is a META-HINT node. If not, control transfers to Block 1700 of FIG. 17. Otherwise, Block 1620 sets MRIN to point to the child node containing the META-HINT, and Block 1625 sets the STYPE variable to the value HINT. Block 1630 then invokes the processing of FIG. 19 to resolve this META-HINT node. Upon returning from FIG. 19, Block 1635 asks whether the matching HINT container node was found. If so, control transfers to Block 1605, and if not, control transfers to Block 1700 of FIG. 17.

Figure 24:
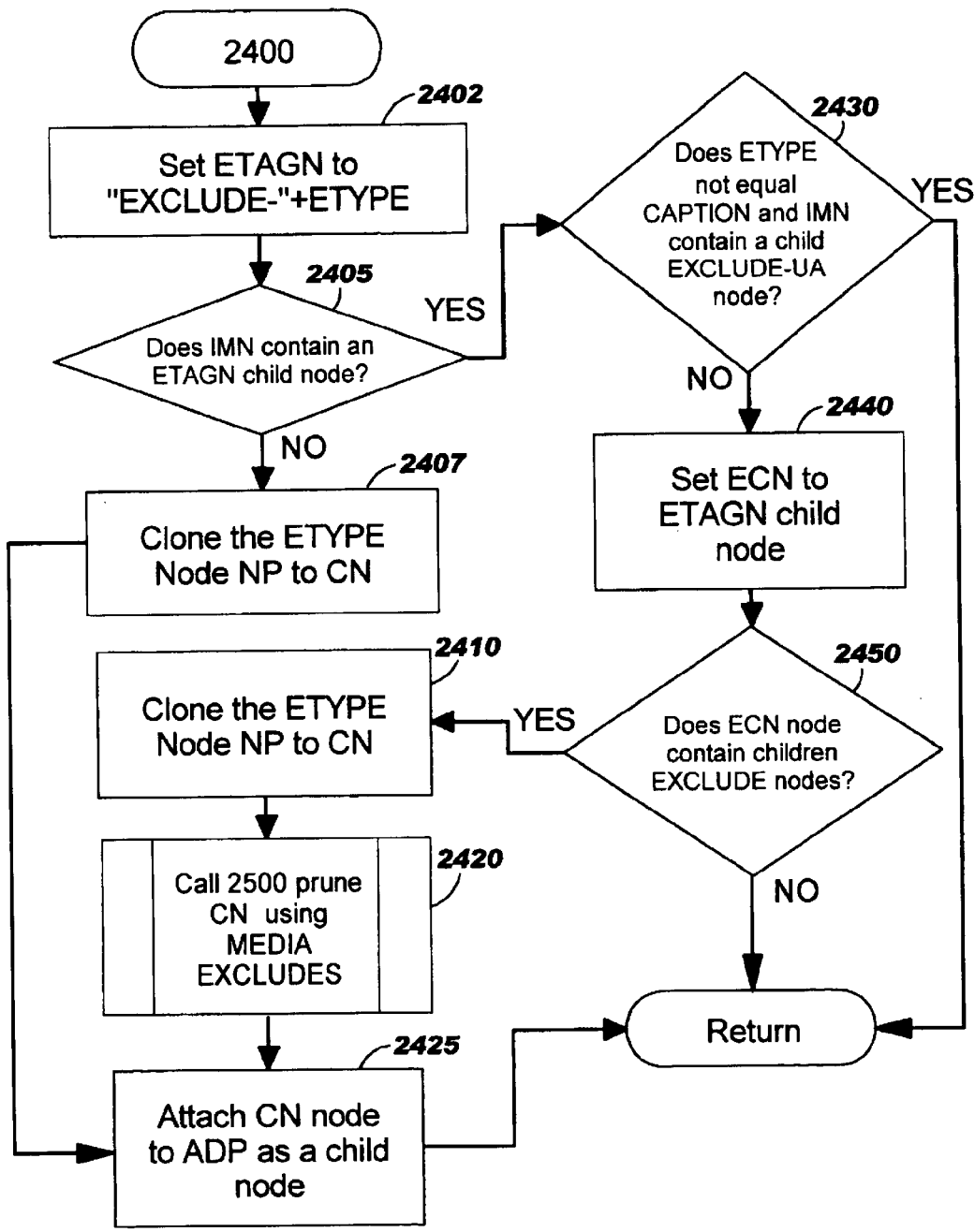

Block 1605 sets ETYPE to HINT, and Block 1610 invokes the processing of FIG. 24 to clone this HINT node for inclusion in the AUIML DOM and prune it from the MRI DOM, after which control transfers to Block 1700 of FIG. 17 to continue processing the MRI-AGGREGATION node.

FIG. 17 continues the processing of the MRI-AGGREGATION node, and performs similar processing for tips to that of FIGS. 15 and 16 for captions and hints. Block 1715 asks whether the node pointed to by MAP has a child which is a META-TIP node. If not, control transfers to Block 1800 of FIG. 18. Otherwise, Block 1720 sets MRIN to point to the child node containing the META-TIP, and Block 1725 sets the STYPE variable to the value TIP. Block 1730 then invokes the processing of FIG. 19 to resolve this META-TIP node. Upon returning from FIG. 19, Block 1735 asks whether the matching TIP container node was found. If so, control transfers to Block 1705, and if not, control transfers to Block 1800 of FIG. 18.

Block 1705 sets ETYPE to TIP, and Block 1710 invokes the processing of FIG. 24 to clone this TIP node for inclusion in the AUIML DOM and prune it from the MRI DOM, after which control transfers to Block 1800 of FIG. 18 to continue processing the MRI-AGGREGATION node.

FIG. 18 completes the processing of the MRI-AGGREGATION node, and performs similar processing for help to that performed for captions, hints, and tips by FIGS. 15–17. Block 1815 asks whether the node pointed to by MAP has a child which is a META-HELP node. If not, control transfers to Block 1835, where the INSERT-MRI node (which is pointed to in the AUIML DOM by the IMN pointer, and which has now been completely resolved and expanded) is deleted as a child of the node pointed to by ADP. Control then returns to the invoking logic (Block 1215 of FIG. 12). Otherwise, Block 1820 sets MRIN to point to the child node containing the META-HELP, and Block 1825 sets the STYPE variable to the value HELP. Block 1830 then invokes the processing of FIG. 19 to resolve this META-HELP node. Upon returning from FIG. 19, Block 1840 asks whether the matching HELP container node was found. If so, control transfers to Block 1805, and if not, control returns to the invoking logic in FIG. 12.

Block 1805 sets ETYPE to HELP, and Block 1810 invokes the processing of FIG. 24 to clone this HELP node for inclusion in the AUIML DOM and prune it from the MRI DOM, after which control transfers to Block 1835, described above.

Figure 19:
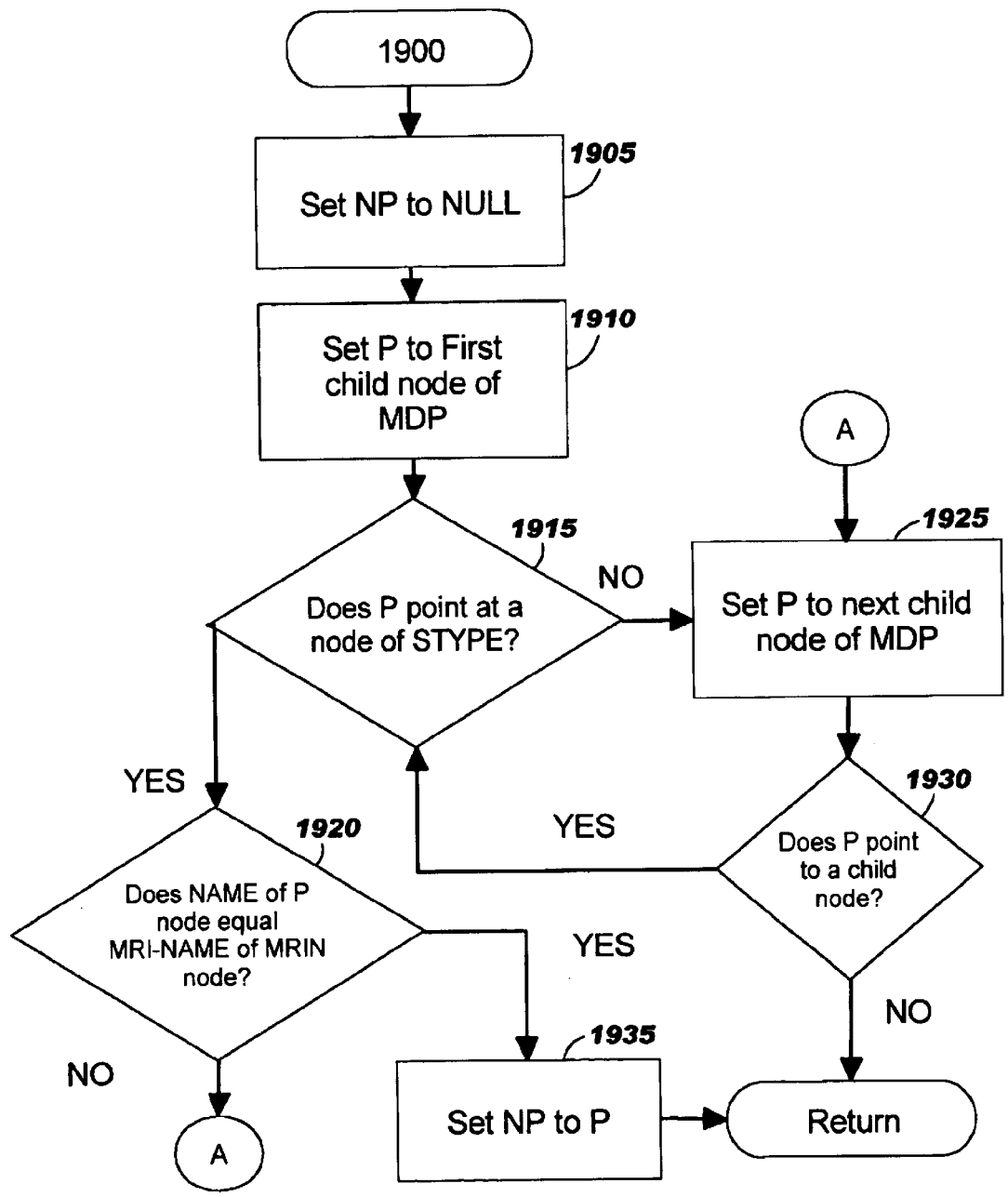

FIG. 19 resolves a META aggregation node, and is invoked from Blocks 1530, 1630, 1730, and 1830 for resolving META-CAPTION, META-HINT, META-TIP, and META-HELP media aggregation inclusion nodes, respectively. FIG. 19 uses container matching and name correspondence to search the MRI DOM to find the media aggregation node which corresponds to the media aggregation inclusion node for which FIG. 19 was invoked, where this media aggregation node provides the media content definition. Block 1905 initializes the node pointer NP to a null value. Block 1910 then sets the pointer P to point to the first child node of the node currently pointed to by MDP. Block 1915 asks whether P now points to a node having a container type which matches the value of variable STYPE. If so, Block 1920 checks the name correspondence between the name of the node pointed to by P and the node pointed to by MRIN. If the value of the NAME attribute in P's node is the same as the value of the MRI-NAME attribute in MRIN's node, then the names correspond and Block 1920 has a positive result. Block 1935 then sets the NP pointer to also point to the node pointed to by P, and control returns to the invoking logic. Otherwise, when the names do not correspond, control transfers from Block 1920 to Block 1925. Block 1925 is also reached when P did not point to a node of the appropriate STYPE. Therefore, Block 1925 moves the pointer P to point to the next child of MDP, to continue searching for the node having the appropriate STYPE and attribute value. Block 1930 asks if there was another child. If not, then the processing of FIG. 19 exits. Otherwise, control returns to Block 1915 to evaluate this child node for a match. Checking of the STYPE and attribute value continues until there are no more children to evaluate (a negative result in Block 1930) or a match is found (a positive result in Block 1920).

Figure 20:
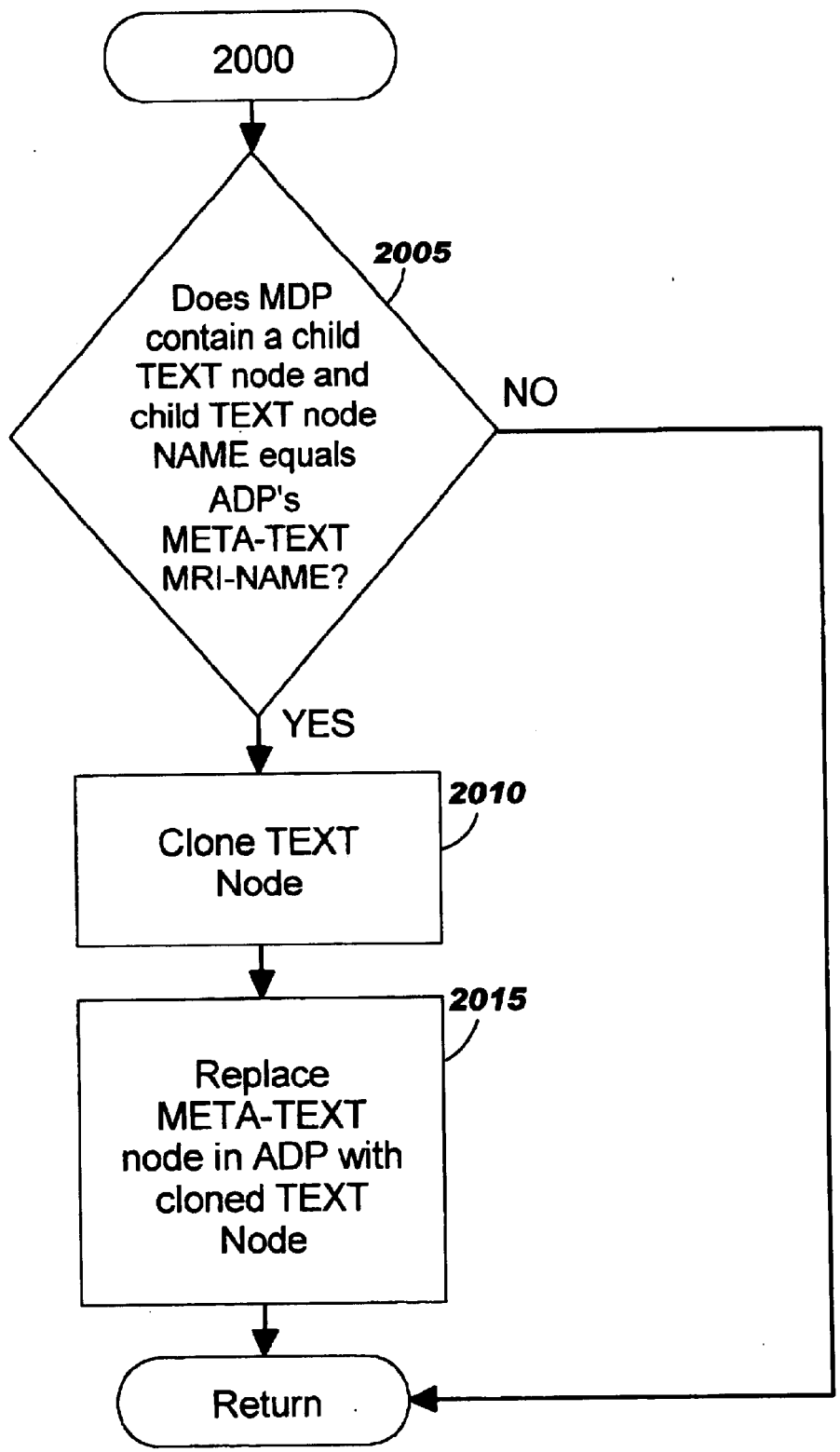

FIG. 20 comprises the logic for processing a META-TEXT node, and is invoked from Block 1310 of FIG. 13. Block 2005 asks whether the node pointed to by MDP has a child node which is a TEXT node, and where the value of the NAME attribute for that child corresponds to the value of the MRI-NAME attribute of the META-TEXT node in the AUIML DOM which is currently pointed to by ADP. If there is no such child, then the META-TEXT node cannot be resolved, and the processing of FIG. 20 exits. Otherwise, Block 2010 clones this matching TEXT node from the MRI DOM. Block 2015 then replaces the META-TEXT node in the AUIML DOM tree with this cloned TEXT node, and processing of FIG. 20 ends.

Figure 21:
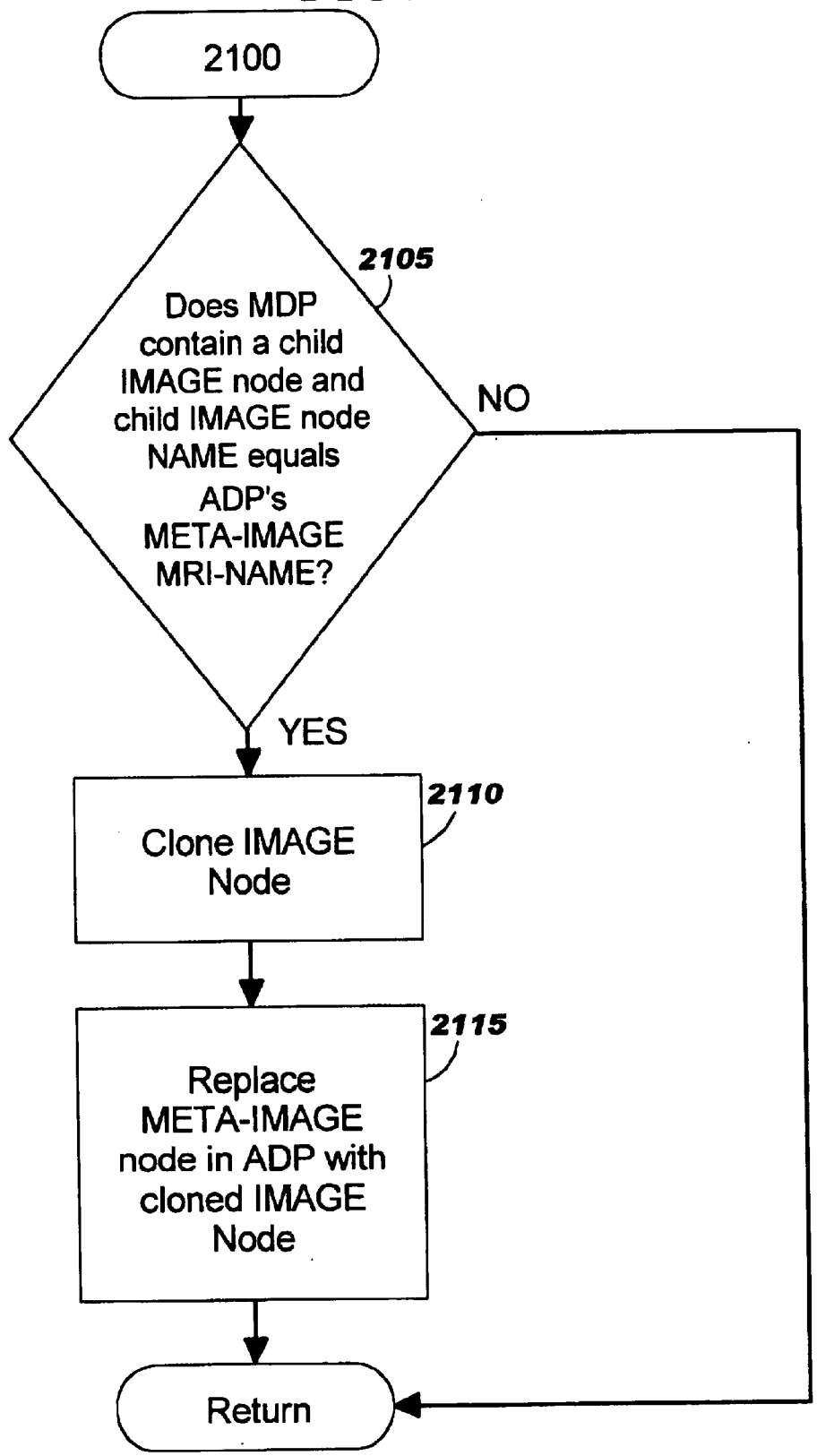

META-IMAGE nodes are processed by the logic of FIG. 21, which is invoked from Block 1320 of FIG. 13. Block 2105 asks whether the node pointed to by MDP has a child node which is an IMAGE node, and where the value of the NAME attribute for that child corresponds to the value of the MRI-NAME attribute of the META-IMAGE node in the AUIML DOM which is currently pointed to by ADP. If there is no such child, then the META-IMAGE node cannot be resolved, and the processing of FIG. 21 exits. Otherwise, Block 2110 clones this matching IMAGE node from the MRI DOM. Block 2115 then replaces the META-IMAGE node in the AUIML DOM tree (at the location where ADP points) with this cloned IMAGE node, and processing of FIG. 21 ends.

Figure 22:
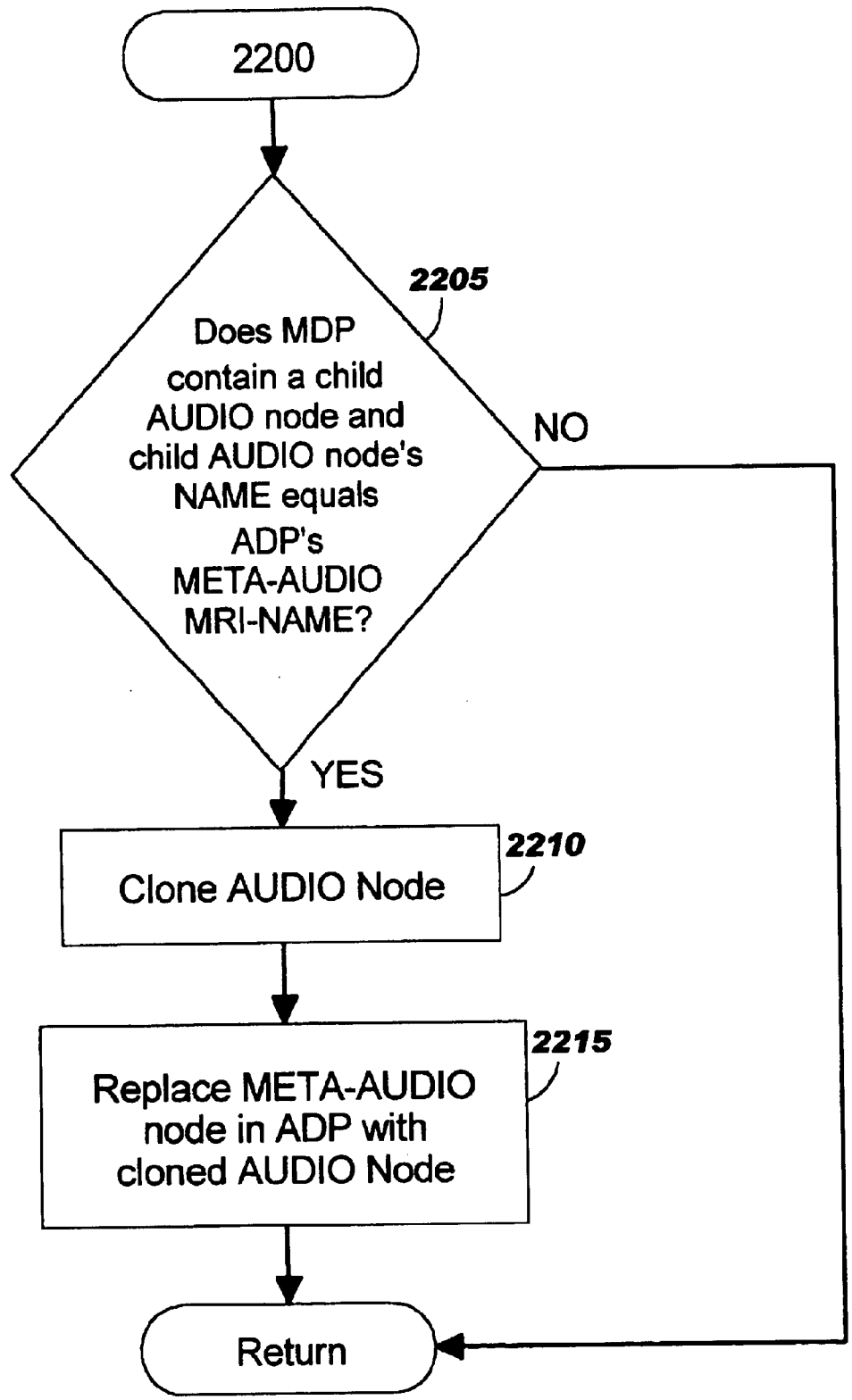

META-AUDIO nodes are processed by the logic of FIG. 22, which is invoked from Block 1330 of FIG. 13. Block 2205 asks whether the node pointed to by MDP has a child node which is an AUDIO node, and where the value of the NAME attribute for that child corresponds to the value of the MRI-NAME attribute of the META-AUDIO node in the AUIML DOM which is currently pointed to by ADP. If there is no such child, then the META-AUDIO node cannot be resolved, and the processing of FIG. 22 exits. Otherwise, Block 2210 clones this matching AUDIO node from the MRI DOM. Block 2215 then replaces the META-AUDIO node in the AUIML DOM tree with this cloned AUDIO node, and processing of FIG. 22 ends.

Figure 23:
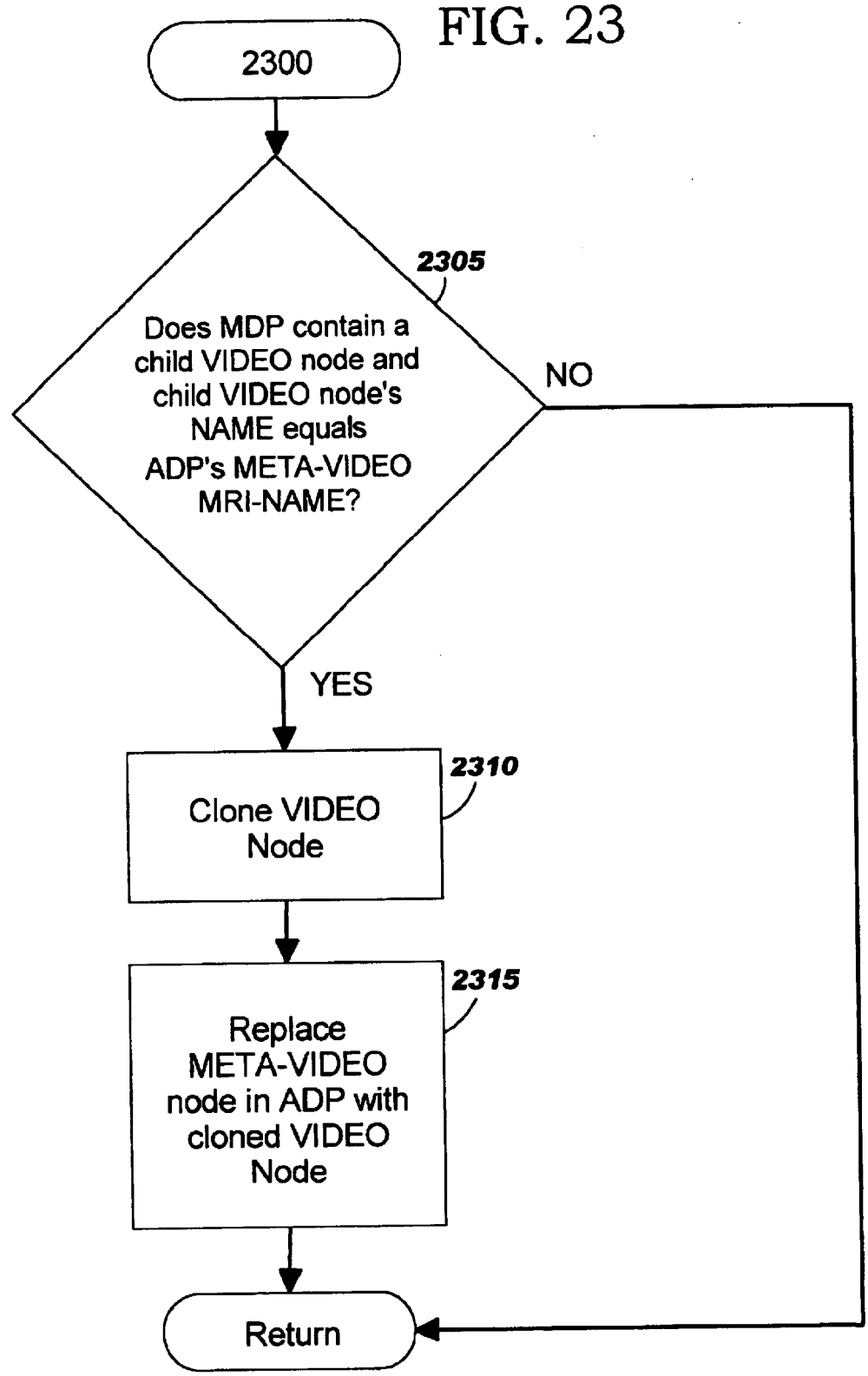

META-VIDEO nodes are processed by the logic of FIG. 23, which is invoked from Block 1340 of FIG. 13. Block 2305 asks whether the node pointed to by MDP has a child node which is a VIDEO node, and where the value of the NAME attribute for that child corresponds to the value of the MRI-NAME attribute of the META-VIDEO node in the AUIML DOM which is currently pointed to by ADP. If there is no such child, then the META-VIDEO node cannot be resolved, and the processing of FIG. 23 exits. Otherwise, Block 2310 clones this matching VIDEO node from the MRI DOM. Block 2315 then replaces the META-VIDEO node in the AUIML DOM tree with this cloned VIDEO node, and processing of FIG. 23 ends.

FIGS. 24–28 depict a preferred embodiment of the logic used to clone a node from the MRI DOM for inclusion in the AUIML DOM, and to then prune the node from the MRI DOM. Note that these FIGS. 24–28 are primarily concerned with the logic which supports the optional exclusion feature which was previously described. If the exclusion feature is not implemented, then only the functionality of Blocks 2410 and 2425 is to be implemented, as appropriate for each supported type of descriptive information.

On entry to this logic, the variable or parameter ETYPE indicates which type of node (CAPTION, HINT, TIP, or HELP) is being processed. The processing of FIG. 24 begins at Block 2402, which concatenates this ETYPE value to the syntax "EXCLUDE-", and stores the result as the value of "ETAGN" ("Exclude Tag Name"). At Block 2405, a test is made to determine whether the node of the AUIML DOM pointed to by IMN contains a node representing the appropriate ETAGN value (e.g. an EXCLUDE-CAPTION tag when FIG. 24 is being used to exclude a caption). If not, then there is no exclusion processing to be performed for the tag name with which FIG. 24 was invoked, and processing continues at Block 2407. Otherwise, Block 2430 tests to see if the ETYPE parameter is some value other than CAPTION (i.e. HINT, TIP, or HELP) and if the node in the AUIML DOM pointed to by IMN has a child node which specifies that all user assistance (i.e. a node representing an <EXCLUDE-USER-ASSISTANCE> tag) is to be excluded. If both of these conditions are true, then the node pointed to by NP is to be excluded, so the processing of FIG. 24 exits. If one or both of the conditions are false, then the node pointed to by NP is not necessarily to be excluded, and control transfers to Block 2440 where a pointer "ECN" ("Exclude Child Node") is set to point to the child of the node pointed to by IMN which has the value of ETAGN. With reference to the example of exclusion tags in FIG. 8, during a traversal through the logic of FIG. 24, IMN would point to a node representing the <INSERT-MRI> tag 820, ETAGN would have the value EXCLUDE-CAPTION, and ECN would thus point to a node representing the <EXCLUDE-CAPTION> node in the AUIML DOM. Block 2450 then checks to see if the ECN node has any child exclusion nodes (i.e. nodes which would exclude only certain media types from the caption, hint, tip, or help which is being processed). If this test has a positive result, control transfers to Block 2410; when it has a negative result, then the entire media aggregation (i.e. CAPTION, HINT, etc.) is to be excluded, and the processing of FIG. 24 exits without copying any information for this media aggregation into the AUIML DOM. With reference to the example in FIG. 8, the <EXCLUDE-CAPTION> tag has an <EXCLUDE-IMAGE> tag as a child, and thus the test in Block 2450 has a positive result.

At Block 2407, the ETYPE (i.e. CAPTION, HINT, TIP, or HELP) node from the MRI DOM (which is a child of the node to which MAP currently points and which is pointed to by NP) is cloned, and a pointer "CN" (cloned node) is set to point to this clone. Control then transfers to Block 2425.

Figure 25:
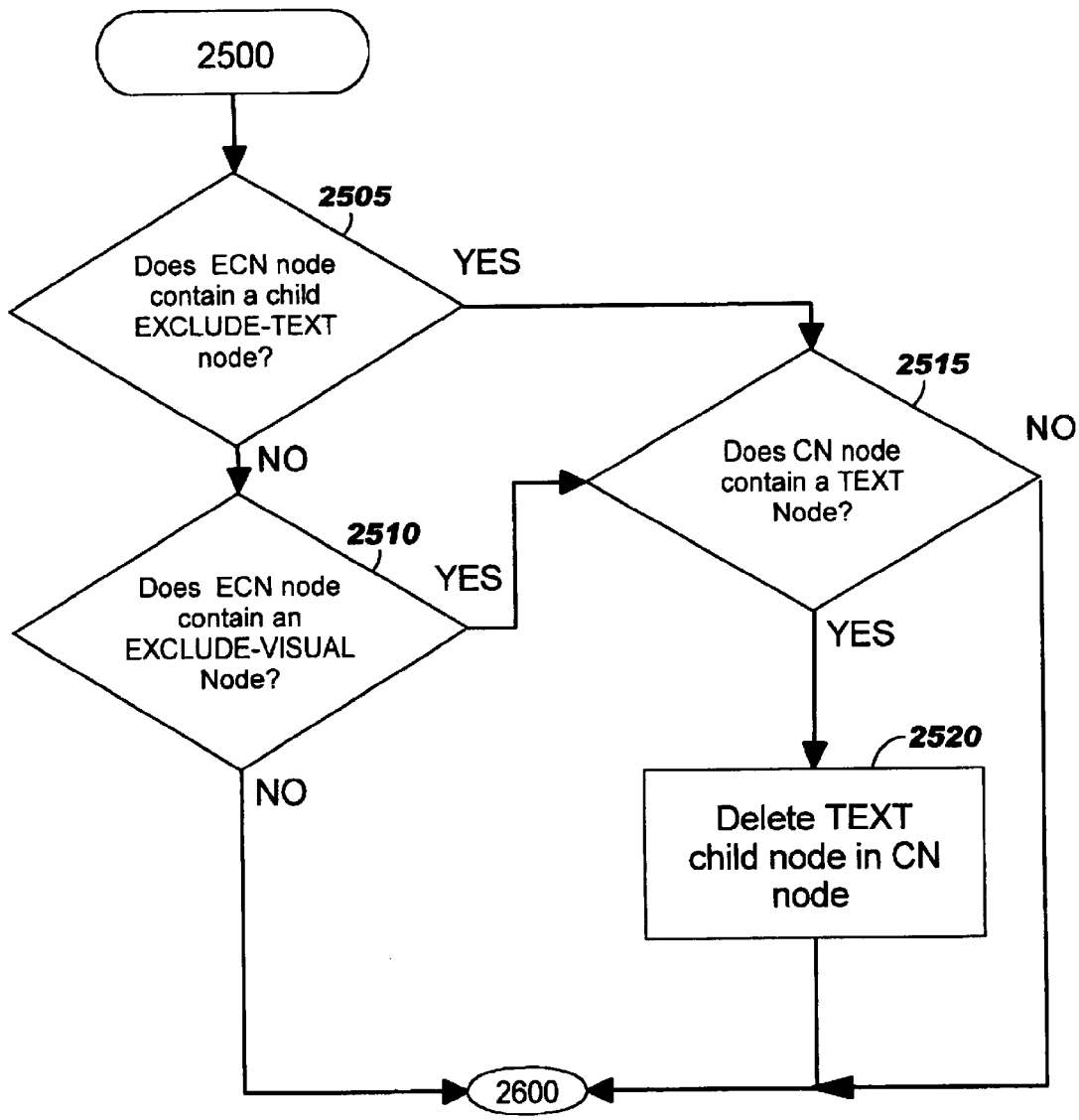

Block 2410 performs the same cloning process and setting of the CN pointer as Block 2407, after which Block 2420 then invokes the processing of FIG. 25 to prune any media-specific exclusions (i.e. exclusions using tags such as <EXCLUDE-AUDIO>) from this clone. Upon returning from FIG. 25, Block 2425 attaches the possibly-modified clone to the AUIML DOM as a child of the node currently pointed to by ADP. This attachment (whether the cloned node has been modified or not) has the effect of expanding the AUIML syntax in the UI document so that it dynamically reflects the current contents of its associated MRI document. Control then returns to the invoking logic (in one of FIGS. 15–18).

The processing of FIG. 25 is invoked from Block 2420 of FIG. 24, and begins the exclusion processing of the node (and any descendants it may have) which has just been cloned by Block 2410. Block 2505 asks whether the node pointed to by ECN (which is a child of the AUIML DOM node pointed to by IMN) contains (i.e. has a child which is) an EXCLUDE-TEXT node. If it does, control transfers to Block 2515. Otherwise, another test is performed at Block 2510 to determine whether the node pointed to by ECN contains an EXCLUDE-VISUAL node. With reference to the table in FIG. 7, it can be seen that an EXCLUDE-VISUAL tag is an indication that all types of visual media, comprising text, image, and video, are to be excluded. When the test at Block 2510 has a positive result, control transfers to Block 2515. When the test has a negative result, then neither text nor visual media is to be excluded from the node pointed to by ECN, so control transfers to Block 2600 of FIG. 26 to continue evaluating the node for other exclusions. (ECN points to an <EXCLUDE-CAPTION> node in the AUIML DOM, for example, when traversing through the logic of FIG. 25 for processing nodes corresponding to element 840 of FIG. 8; in this example, the tests in Blocks 2505 and 2510 both have a negative result.)

Control reaches Block 2515 when either text or all visual media is to be excluded from the media aggregation (i.e. CAPTION, HINT, etc.) being processed. Block 2515 then asks whether the cloned CN node includes a TEXT node. If so, processing continues to Block 2520 where this TEXT node is deleted as a child of the cloned CN node. When the test in Block 2515 has a negative result, and following processing of Block 2520, control transfers to Block 2600 of FIG. 26.

Figure 26:
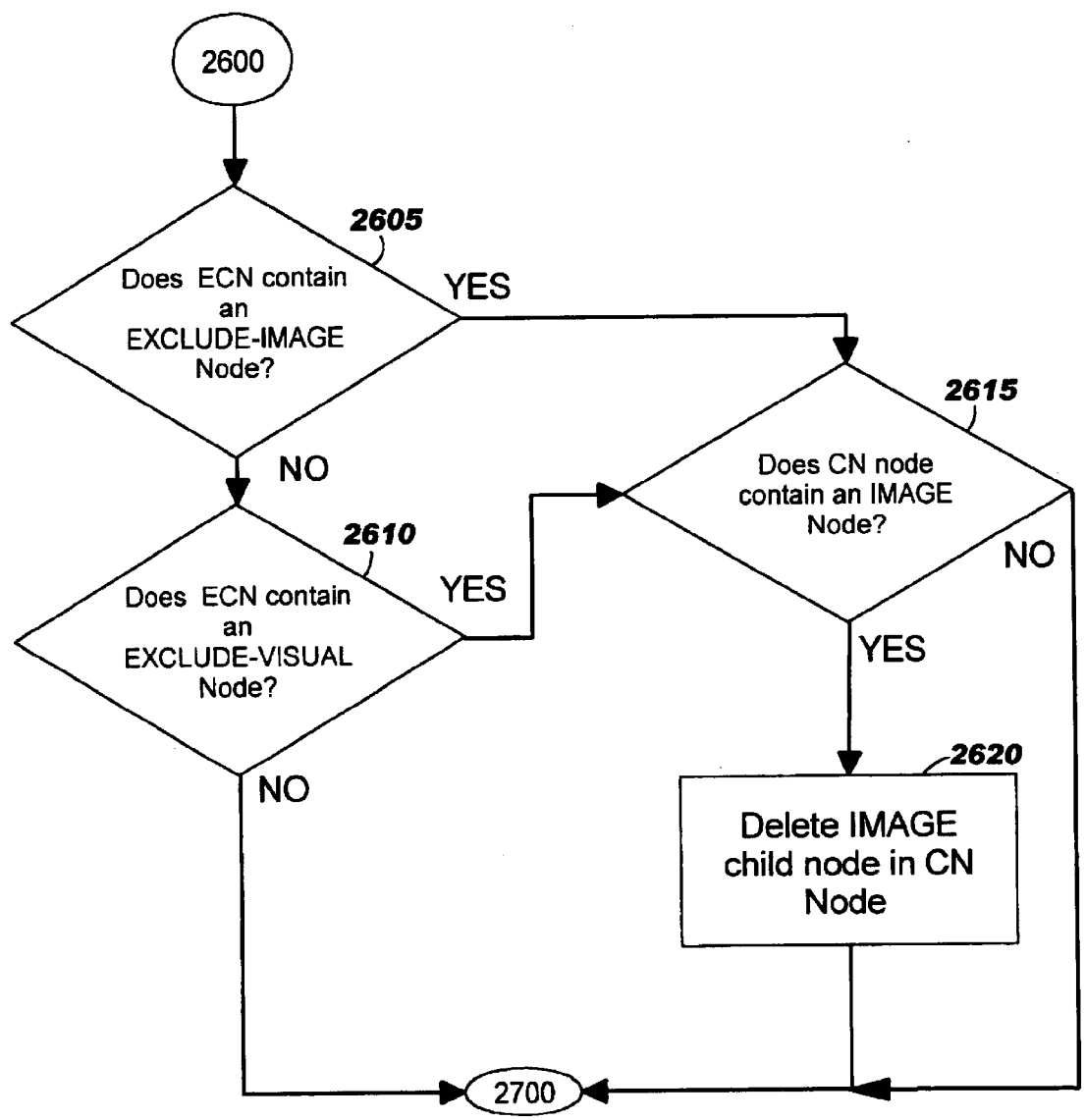

FIG. 26 continues the processing of the "EXCLUDE-..." node pointed to by ECN. At Block 2605, a test is made to determine whether the node pointed to by ECN has a child that represents an EXCLUDE-IMAGE node. If it does, control transfers to Block 2615. Otherwise, another test is performed at Block 2610 to determine whether the node pointed to by ECN contains an EXCLUDE-VISUAL node. When the test at Block 2610 has a positive result, control transfers to Block 2615. When the test has a negative result, then neither image nor visual media is to be excluded from the media aggregation being processed, so control transfers to Block 2700 of FIG. 27 to continue evaluating the node pointed to by ECN for other exclusions.

Control reaches Block 2615 when either image or all visual media is to be excluded from the media aggregation being processed. Block 2615 then asks whether the cloned CN node includes an IMAGE node. If so, processing continues to Block 2620 where this IMAGE node is deleted as a child of the cloned CN node. When the test in Block 2615 has a negative result, and following processing of Block 2620, control transfers to Block 2700 of FIG. 27.

Figure 27:
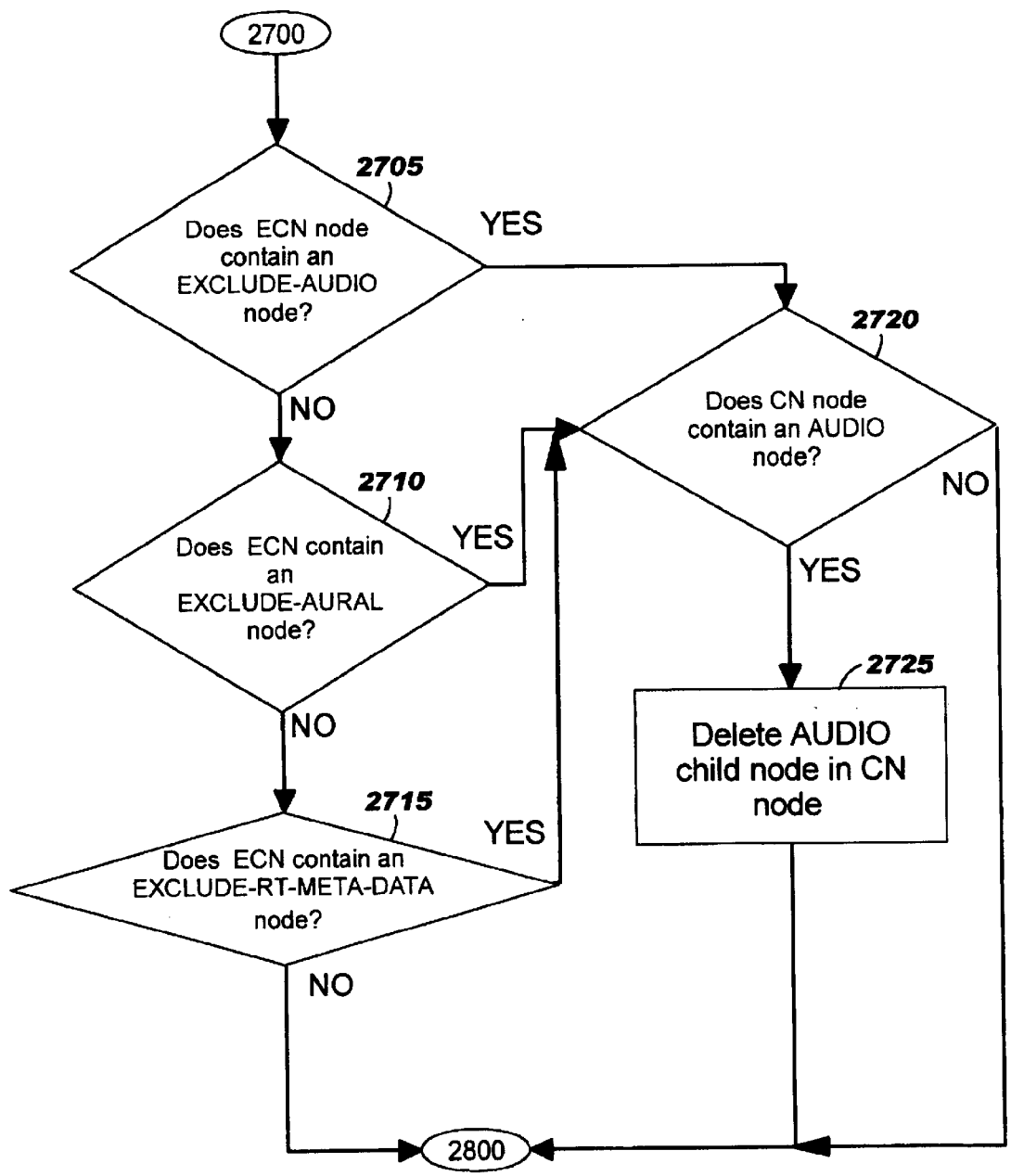

FIG. 27 performs the exclusion processing for AUDIO and AURAL media. At Block 2705, a test is made to determine whether the node pointed to by ECN contains an EXCLUDE-AUDIO node. If it does, control transfers to Block 2720. Otherwise, another test is performed at Block 2710 to determine whether the node pointed to by ECN contains an EXCLUDE-AURAL node. When this test has a positive result, control transfers to Block 2720. Otherwise, Block 2715 then checks whether the node pointed to by ECN contains an EXCLUDE-RT-META-DATA node (to exclude all real-time meta-data media resources). If it does, control transfers to Block 2720. When the test has a negative result, then none of the media types which have been checked are to be excluded from the media aggregation being processed, so control transfers to Block 2800 of FIG. 28 to continue evaluating the node pointed to by ECN for other exclusions.

Control reaches Block 2720 when either audio or all aural or real-time media is to be excluded from the media aggregation being processed. Block 2720 then asks whether the cloned CN node includes an AUDIO node. If so, processing continues to Block 2725 where this AUDIO node is deleted as a child of the cloned CN node. When the test in Block 2720 has a negative result, and following processing of Block 2725, control transfers to Block 2800 of FIG. 28.

Figure 28:
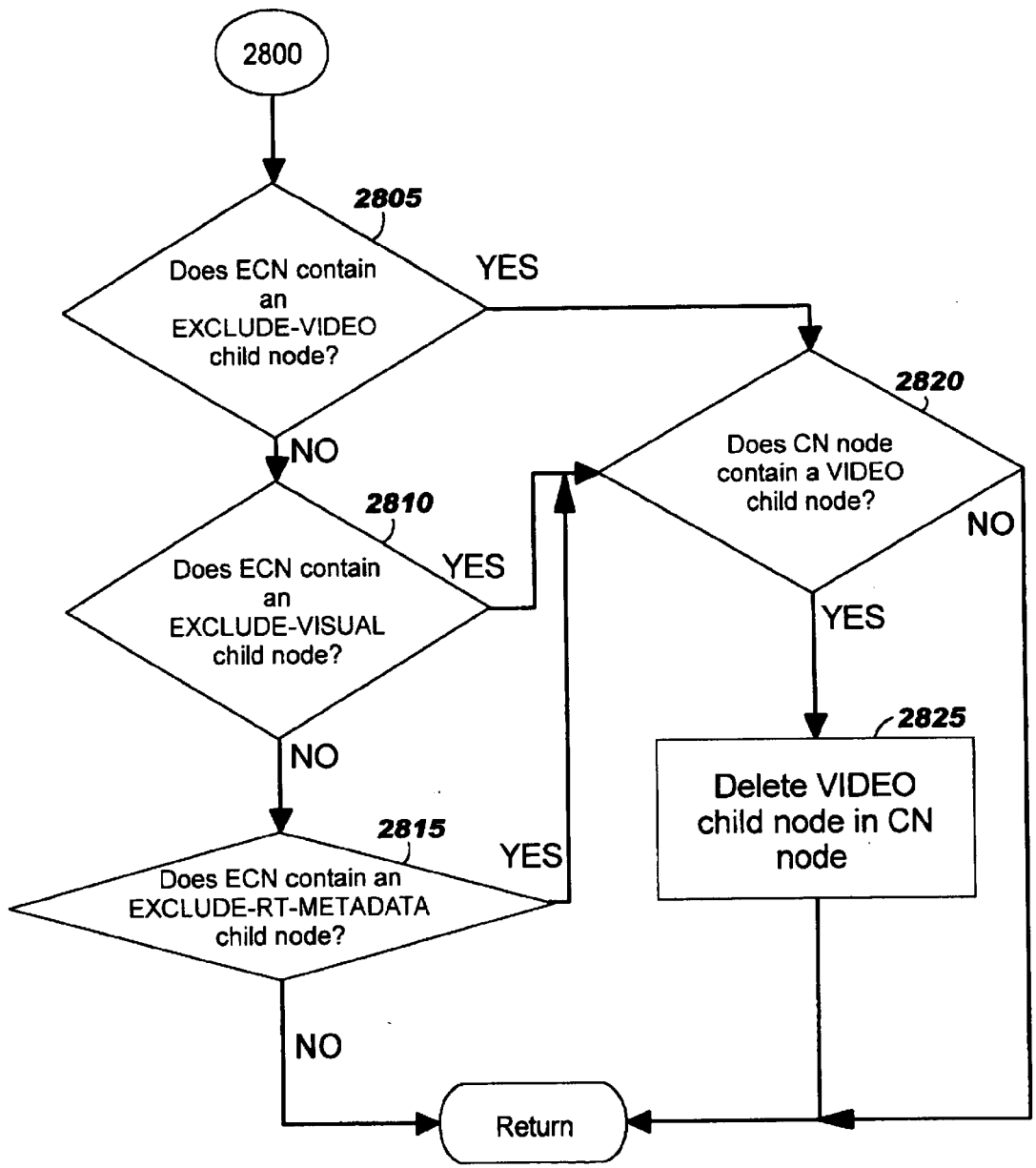

FIG. 28 finishes the processing of the node pointed to by ECN. At Block 2805, a test is made to determine whether the node pointed to by ECN has a child that represents an EXCLUDE-VIDEO node. If it does, control transfers to Block 2820. Otherwise, another test is performed at Block 2810 to determine whether the node pointed to by ECN contains an EXCLUDE-VISUAL node. When the test at Block 2810 has a positive result, control transfers to Block 2820. Otherwise, Block 2815 then checks whether the node pointed to by ECN contains an EXCLUDE-RT-META-DATA node. If so, control transfers to Block 2820. When the test has a negative result, then none of the media types which have been checked are to be excluded from the media aggregation being processed, so the processing of the node pointed to by ECN is complete and the traversal through the logic of FIGS. 25–28 ends, returning control to the invoking logic in FIG. 24.

Control reaches Block 2820 when either video or all visual or real-time media is to be excluded from the media aggregation being processed. Block 2820 then asks whether the cloned CN node includes a VIDEO node. If so, processing continues to Block 2825 where this VIDEO node is deleted as a child of the cloned CN node. When the test in Block 2820 has a negative result, and following processing of Block 2825, control returns to the invoking logic of FIG. 24.

In an alternative embodiment of the present invention, a hash table is used to optimize the process of looking up MRI to resolve the references from a UI document, rather than retrieving the information from the DOM. This optimization takes advantage of the fact that in the MRIML grammar (see Table II), items that are referenced by name are never META- . . . nodes, and all referenced nodes (i.e. those that contain content, and are not META- . . . nodes) are direct descendants of the root <MRI> tag. Since compound identifiers are not used, nor are nested names within groups, the hash table can be used to store and quickly look up (by name and type) every node that needs to be resolved. Preferably, an entry is created in the hash table for each node that is not a META- . . . node, where the hash table key is comprised of a concatenation of the node's type and name (where a separator such as a "." may be used between the type and name values). For example, the caption for the last name in FIG. 5C (element 575) would be stored using the key "CAPTION.LastNameCaption".

This alternative embodiment will now be discussed in more detail with reference to the logic in FIGS. 29 through 35.

Figure 29:
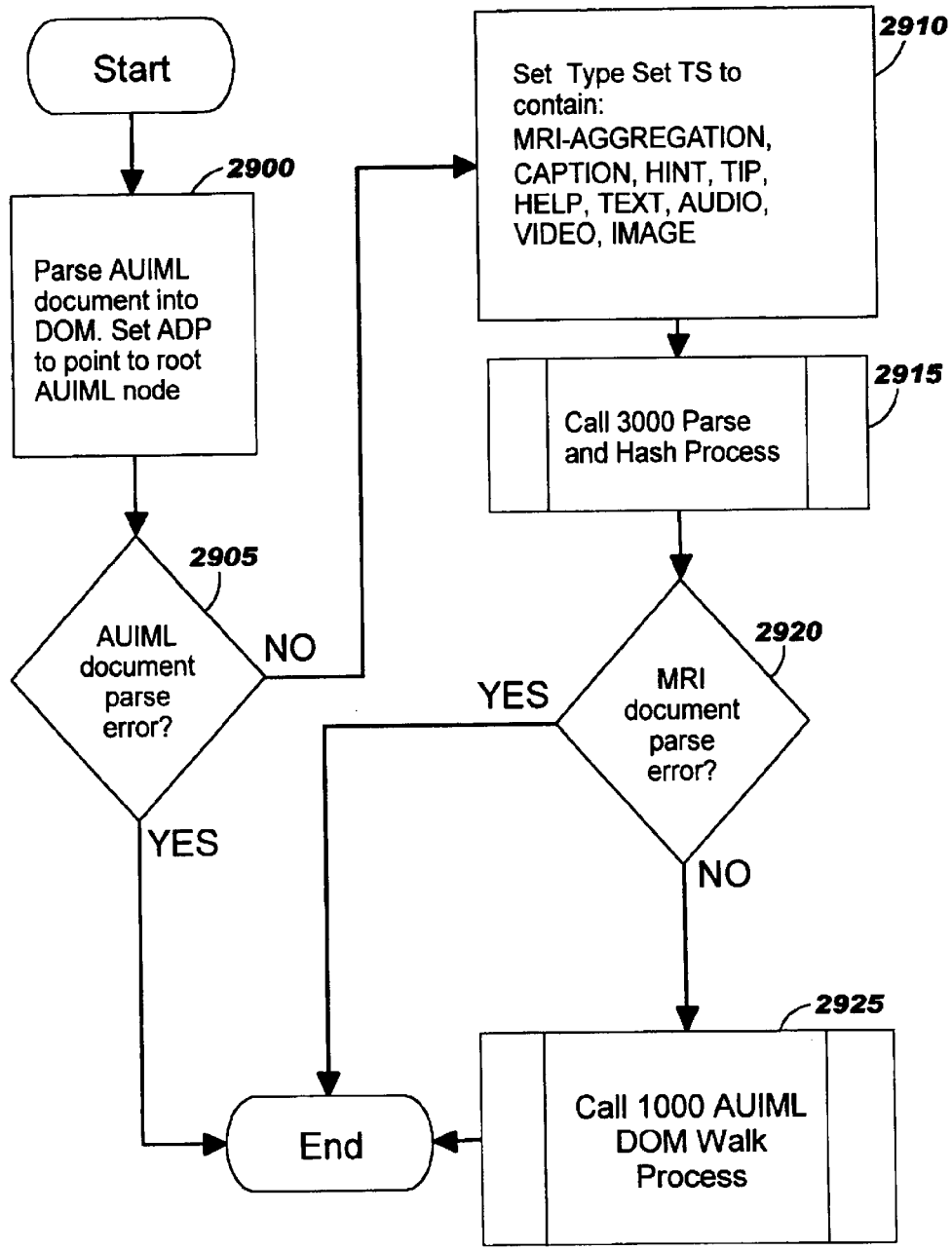
FIGS. 29 through 35 illustrate flow charts which set forth the logic which may be used in an alternative embodiment of the present invention.

FIG. 29 replaces the logic of FIG. 9, and has identical function except in Blocks 2910 and 2915. Rather than parsing the MRI document into a DOM, as in Block 910 of FIG. 9, Block 2910 sets a collection TS (for "TypeSet") to contain the types which are valid (which in this embodiment are MRI-AGGREGATION, CAPTION, HINT, TIP, HELP, TEXT, AUDIO, VIDEO, and IMAGE). Block 2915 then invokes a new hashing and parsing process which is described in FIG. 30. Upon returning from this hashing and parsing process, the processing of FIG. 29 is identical to returning from Block 910 of FIG. 9.

Figure 30:
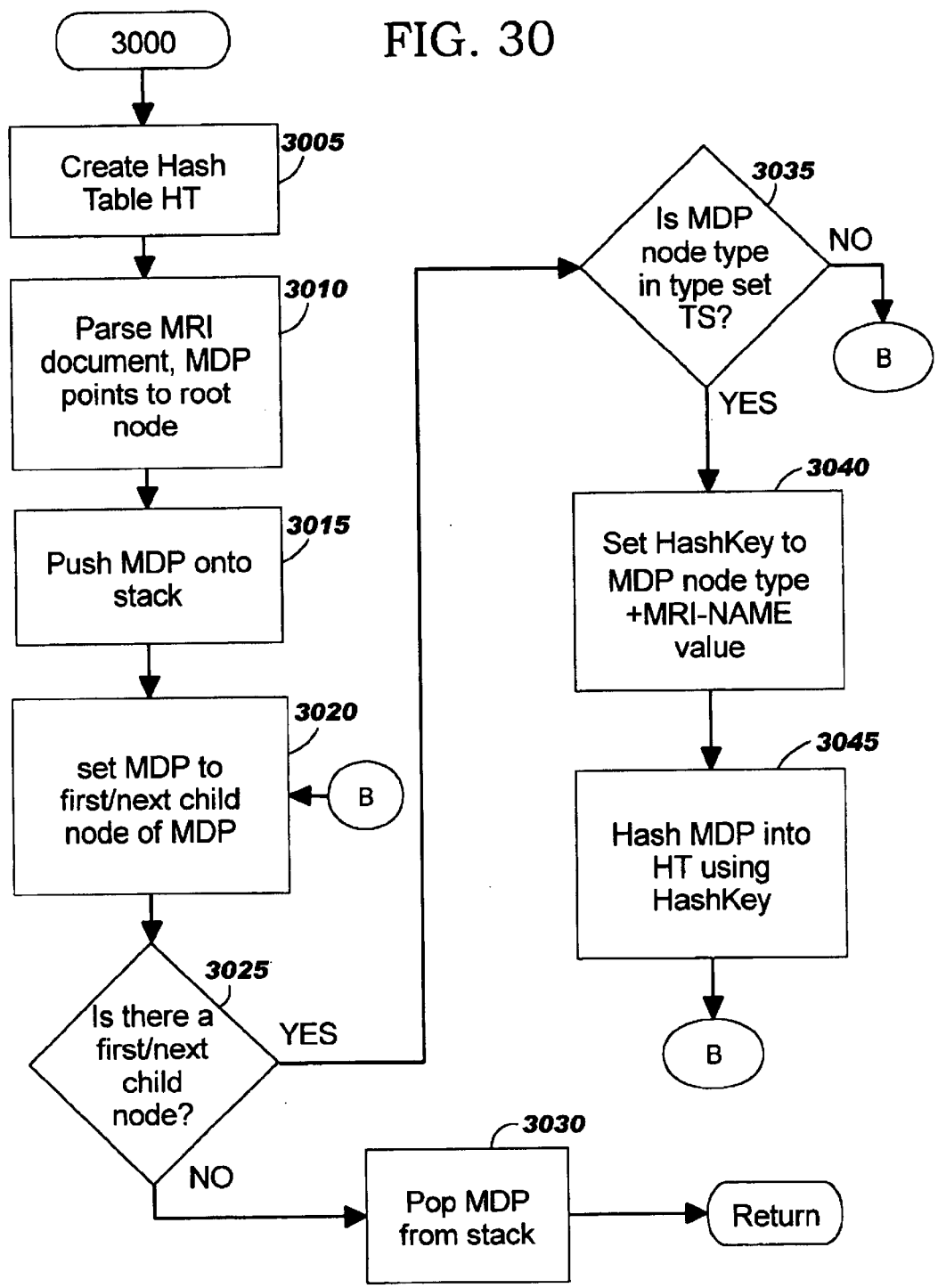

The hashing and parsing process of FIG. 30 begins at Block 3005, where the hash table "HT" is created. Block 3010 then parses the MRI document, and sets MDP to point to the root of the DOM tree created from this parsing. Block 3015 pushes MDP onto a stack, and Block 3020 moves MDP so that it now points to one of its children. (On the first pass through this logic for a parent node, the pointer will point to the first child; on subsequent passes, it will point in succession to each sibling of that first child.) Block 3025 asks whether there was a child node. If not, Block 3030 pops MDP from the stack, and control returns to the invoking logic. Otherwise, processing continues at Block 3035 where a test is made to determine whether the node type of the node to which MDP is pointing is contained within the set of valid types in TS. If this test has a negative result, then no hash table entry will be created for this node, and control transfers to Block 3020 to process the next sibling node. When the test in Block 3035 has a positive result, Block 3040 creates the hash key that will be used for the current node by concatenating its node type and the value of its MRI-NAME attribute. Block 3045 then computes a hash for this hash key, and inserts the node's information into the hash table at that location. Control then returns to Block 3020 to process the next sibling.

FIGS. 10–13 of the preferred embodiment are used in this alternative embodiment for processing the AUIML DOM, except for the following changes: (1) Block 1205 of FIG. 12 now invokes the processing of FIG. 31, rather than FIG. 14; (2) Blocks 1310, 1320, 1330, and 1340 of FIG. 13 now invoke the processing of FIGS. 32, 33, 34, and 35, respectively, rather than FIGS. 20, 21, 22, and 23; and (3) FIGS. 32, 33, 34, and 35, replace FIGS. 20, 21, 22, and 23, respectively.

Figure 31:
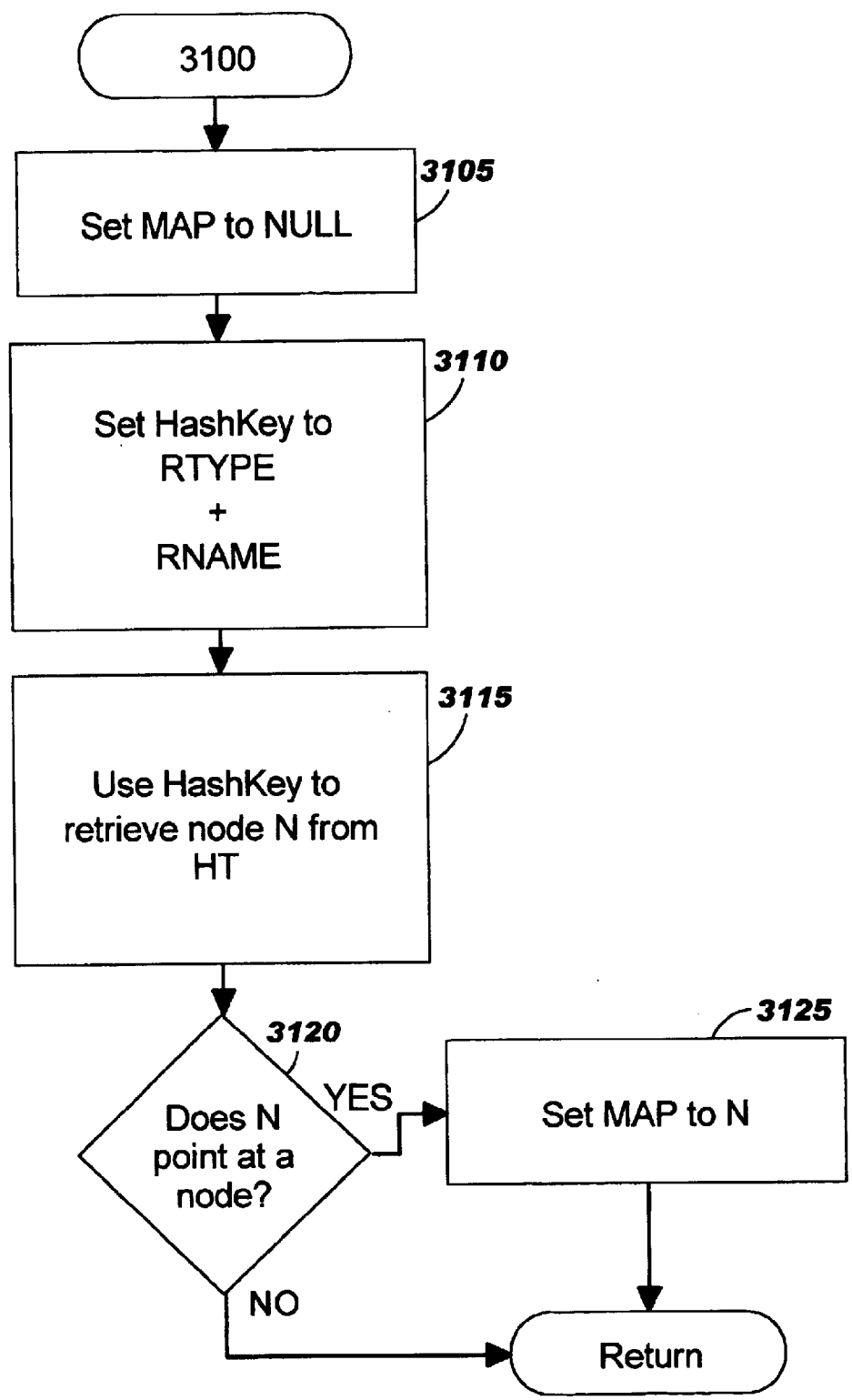

FIG. 31 is used to resolve the MRI-NAME reference for an INSERT-MRI node, and is invoked from Block 1205 of FIG. 12. Block 3105 initializes the MAP pointer, which will be used to point to the MRI-AGGREGATION node in the MRI DOM tree, to a null value. Block 3110 sets the hash key to the concatenation of variables RTYPE (which is set in FIGS. 32–35 to one of TEXT, IMAGE, AUDIO, or VIDEO) and RNAME (which is set in those same figures to the value of the MRI-NAME attribute for the node being processed). Block 3115 then uses this hash key to retrieve information from the hash table HT, and sets the pointer "N" to point to this retrieved information. Block 3120 asks whether N in fact points to a node. If not, then no information was located in the hash table, and control returns to the invoking logic. Otherwise, the test in Block 3120 has a positive result, and Block 3125 then sets the MAP pointer to point where N is pointing. The processing of FIG. 31 then exits.

Figure 32:
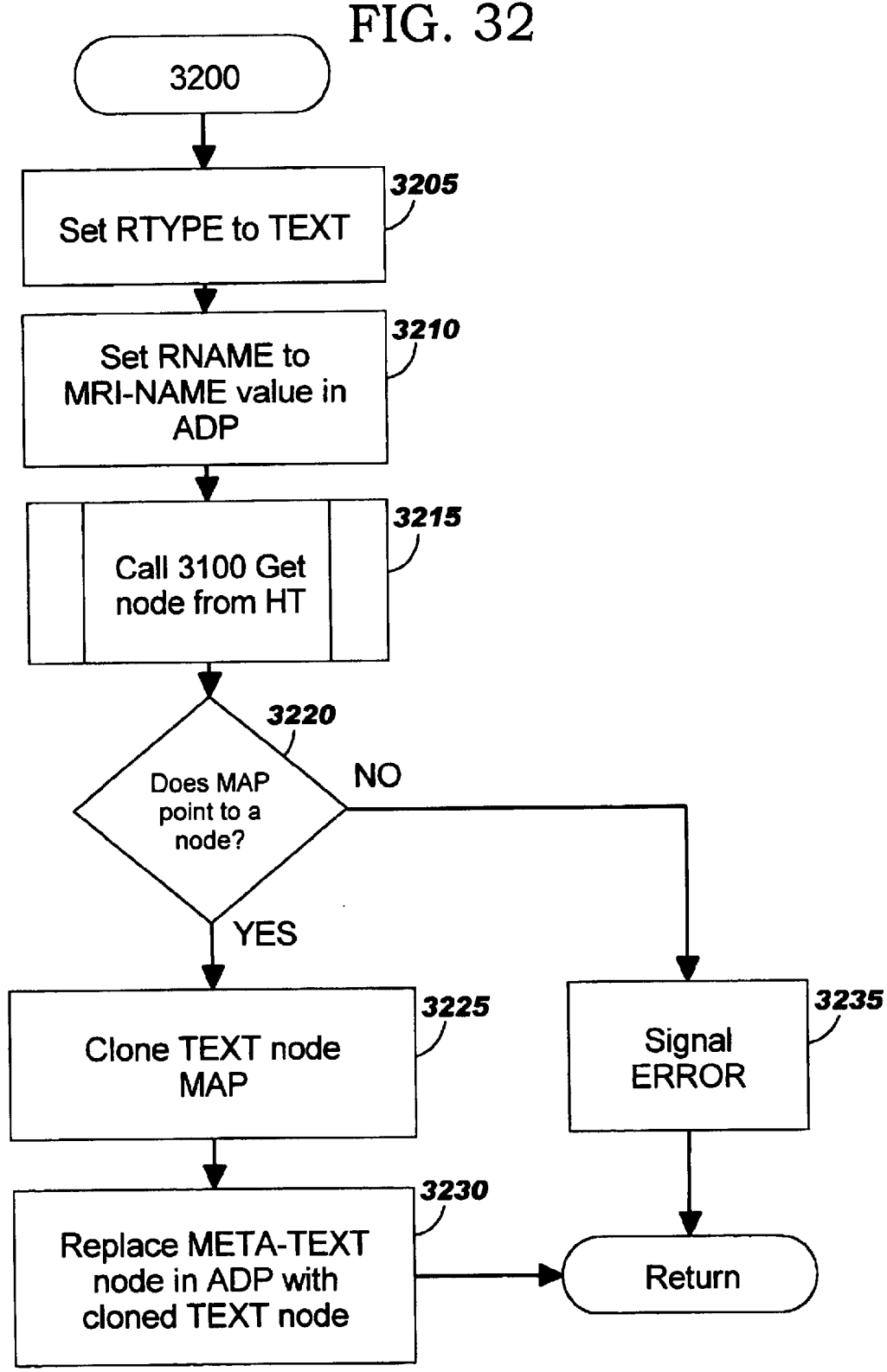

The logic of FIG. 32 is invoked from Block 1310 of FIG. 13. Beginning at Block 3205, the RTYPE variable is set to the value TEXT because a META-TEXT node is being processed. Block 3210 then sets the RNAME variable to the value of this META-TEXT node's MRI-NAME attribute. Block 3215 then invokes the logic of FIG. 31 to retrieve the information for this RTYPE, RNAME hash key from the hash table. On exit from FIG. 31, the pointer MAP points either to a null value (when no entry was found in the hash table) or to a located entry for a node. Block 3220 thus tests the value of MAP to see if it points to a node. If not, Block 3235 signals an error, and the processing of FIG. 32 ends. Otherwise, Block 3225 clones the TEXT node currently pointed to by MAP, and Block 3230 replaces the META-TEXT node in the AUIML DOM which is pointed to by ADP with this cloned TEXT node. The processing of FIG. 32 then ends.

Figure 33:
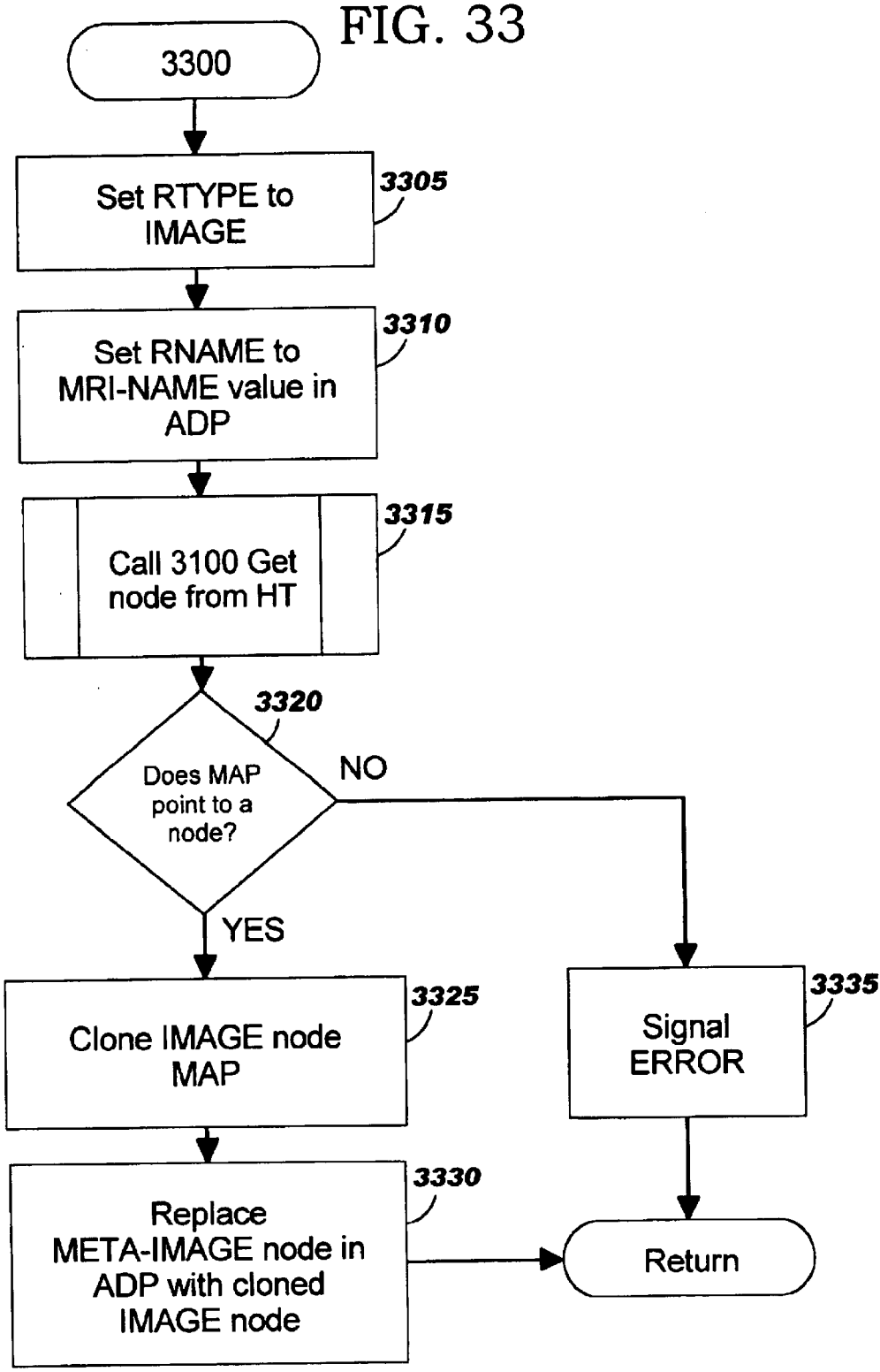

FIG. 33 is invoked from Block 1320 of FIG. 13, and processes a META-IMAGE node. At Block 3305, the RTYPE variable is set to the value IMAGE, and Block 3310 then sets the RNAME variable to the value of this META-IMAGE node's MRI-NAME attribute. Block 3315 then invokes the logic of FIG. 31 to retrieve the information for this RTYPE, RNAME hash key from the hash table. On returning from FIG. 31, Block 3320 tests the value of MAP to see if it points to a node. If not, Block 3335 signals an error, and the processing of FIG. 33 ends. Otherwise, Block 3325 clones the IMAGE node currently pointed to by MAP, and Block 3330 replaces the META-IMAGE node in the AUIML DOM which is pointed to by ADP with this cloned IMAGE node. The processing of FIG. 33 then ends.

Figure 34:
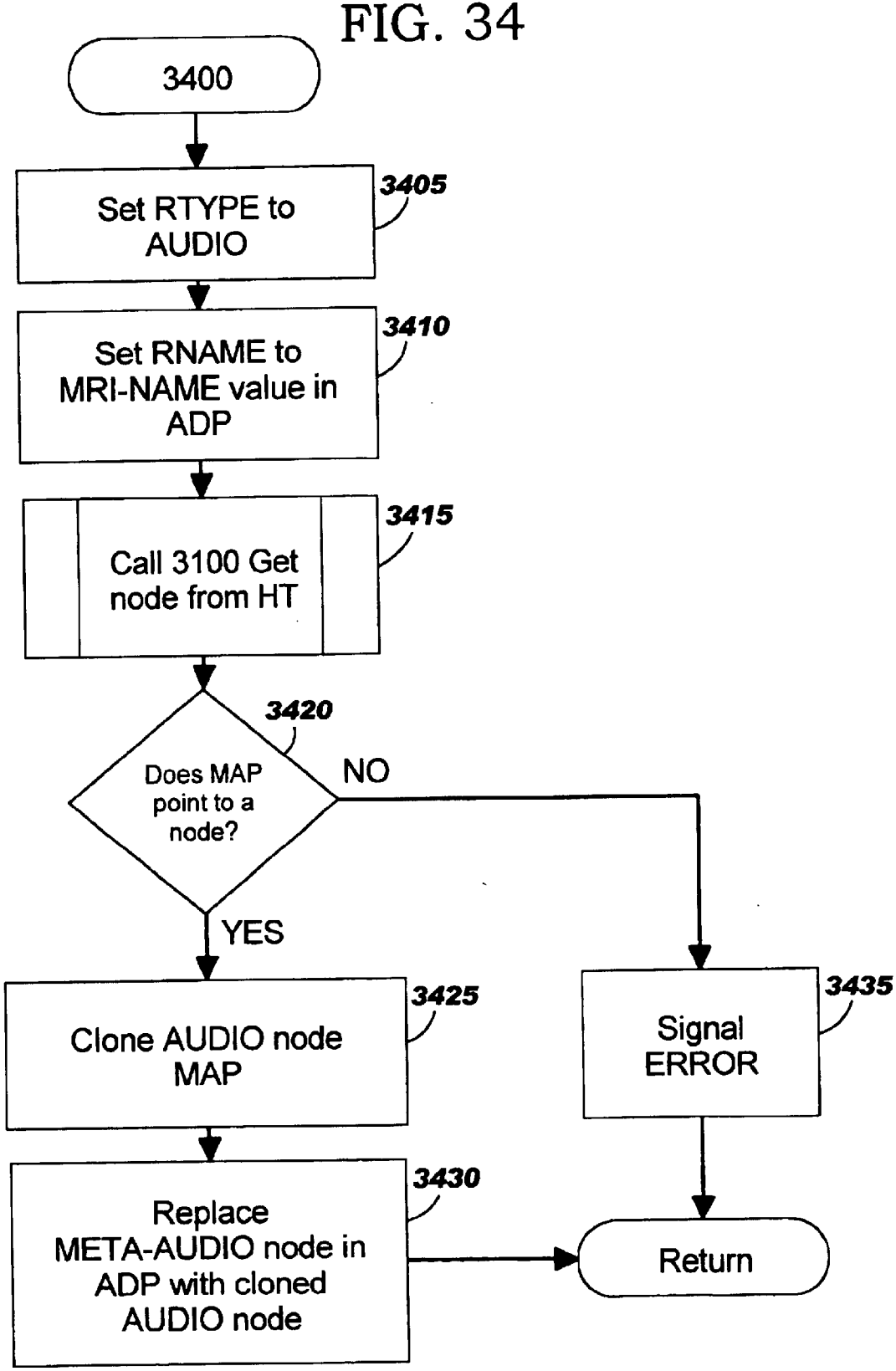

The logic of FIG. 34 is invoked from Block 1330 of FIG. 13, and processes a META-AUDIO node. Beginning at Block 3405, the RTYPE variable is set to the value AUDIO, and Block 3410 then sets the RNAME variable to the value of this META-AUDIO node's MRI-NAME attribute. Block 3415 then invokes the logic of FIG. 31 to retrieve the information for this RTYPE, RNAME hash key from the hash table. On returning from FIG. 31, Block 3420 tests the value of MAP to see if it points to a node. If not, Block 3435 signals an error, and the processing of FIG. 34 ends. Otherwise, Block 3425 clones the AUDIO node currently pointed to by MAP, and Block 3430 replaces the META-AUDIO node in the AUIML DOM which is pointed to by ADP with this cloned AUDIO node. The processing of FIG. 34 then ends.

Figure 35:
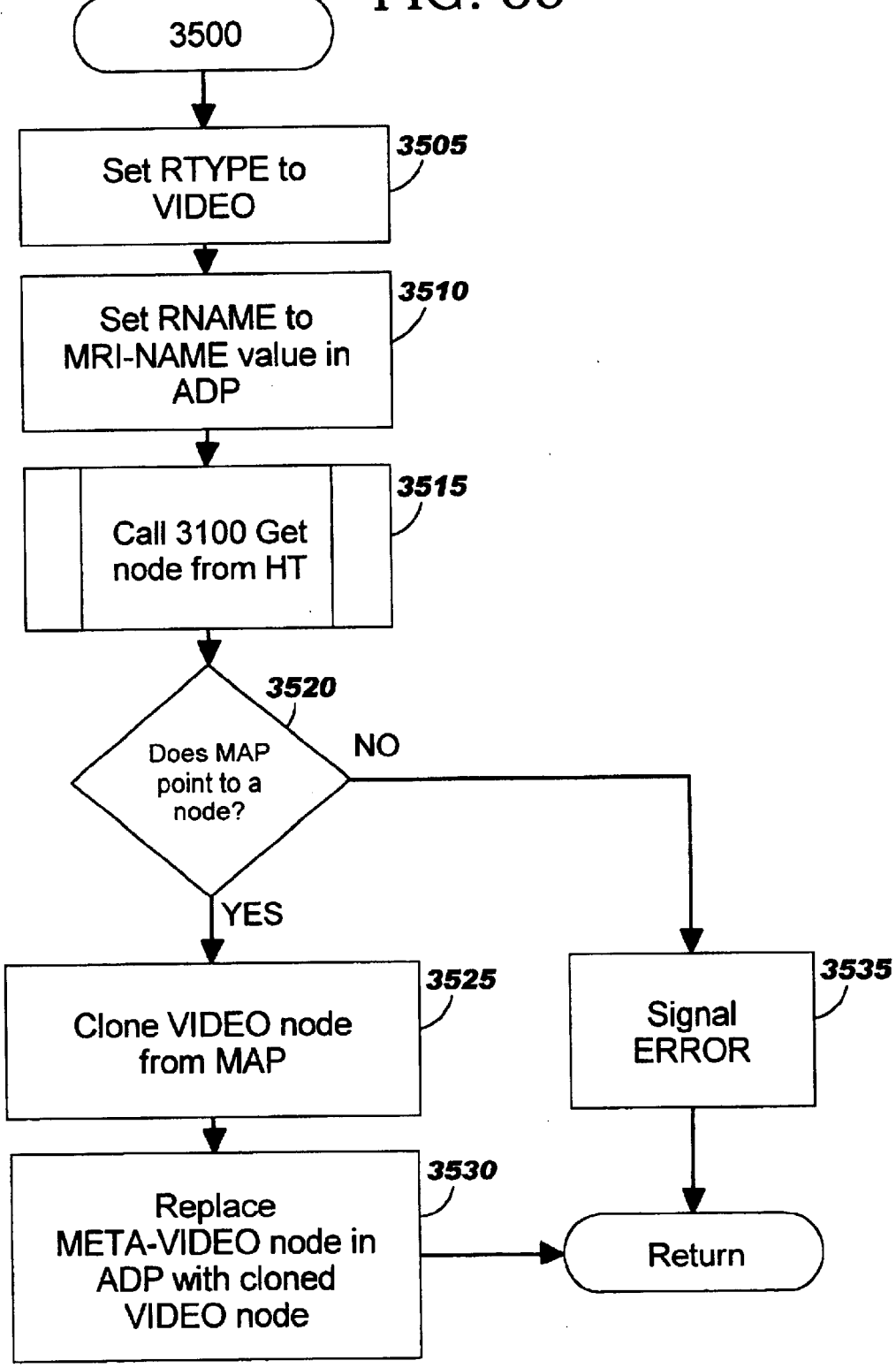

FIG. 35 is invoked from Block 1340 of FIG. 13, and processes a META-VIDEO node. At Block 3505, the RTYPE variable is set to the value VIDEO, and Block 3510 then sets the RNAME variable to the value of this META-VIDEO node's MRI-NAME attribute. Block 3515 then invokes the logic of FIG. 31 to retrieve the information for this RTYPE, RNAME hash key from the hash table. On returning from FIG. 31, Block 3520 tests the value of MAP to see if it points to a node. If not, Block 3535 signals an error, and the processing of FIG. 35 ends. Otherwise, Block 3525 clones the VIDEO node currently pointed to by MAP, and Block 3530 replaces, the META-VIDEO node in the AUIML DOM which is pointed to by ADP with this cloned VIDEO node. The processing of FIG. 35 then ends.

As has been demonstrated, the present invention provides an efficient, flexible technique for including descriptive information of various media types in a user interface. The type of descriptive information, and the media formats of that information, can be easily changed by altering the MRI document; the UI document does not need to be changed. This technique is particularly beneficial for translation-sensitive information, where MRI in alternative languages can easily be substituted as needed. Furthermore, using the optional exclusion feature, a particular UI document specification can reference an MRI document but make changes to that UI document as suited to the needs of a particular situation. This feature is particularly beneficial for when a UI document is to be rendered on devices which support different modalities.

While the preferred embodiment of the present invention has been described, additional variations and modifications in that embodiment may occur to those skilled in the art once they learn of the basic inventive concepts. The techniques disclosed herein are based partially upon certain predefined characteristics of the XML and AUIML notations. It will be obvious to one of ordinary skill in the art that the inventive concepts disclosed herein may be adapted to changes in the notations, should they occur. The inventive concepts may also be used with notations other than XML and AUIML that provide the same characteristics described herein for XML and AUIML documents, and with modeling techniques other than DOM trees that exhibit the required properties discussed for DOM trees (i.e. the modeling technique creates a tree that represents the structure and content described in the particular notation.) Therefore, it is intended that the appended claims shall be construed to include both the preferred embodiment and all such variations and modifications as fall within the spirit and scope of the invention.

Table I

AUIML
A Language for Marking-up
Intent-based User Interfaces

Editor:
    Roland A. Merrick (IBM) <Roland_Merrick@uk.ibm.com>
Copyright Notice
    Copyright © 1998-2000 IBM Corporation

---

Abstract

This document describes two XML vocabularies intended to facilitate the definition of a User Interface using an intent based approach. The intent part is described in User Interface Data Markup Language (UIDML), this vocabulary is intrinsic to the intent nature of AUIML and must be used. In addition there is the User Interface Presentation Markup Language (UIPML) which may be used to complement UIDML and influence the layout and control assignments made by a renderer. For convenience a composite vocabulary (AUIML) has been provided to obviate the need to use namespaces. These vocabularies are intended to be independent of the client platform on which the user interface is rendered, the implementation language and the user interface implementation technology.

Table of contents

1. Introduction
    1.1 Intent based markup
    1.2 Presentation based markup
    1.3 Classification of Elements
    1.4 Notation
    1.5 Templates
2. Data Model
    2.1 The DATA-GROUP Tag
    2.2 The GROUP Tag
    2.3 The CHOICE Tag
    2.4 The TABLE Tag
    2.5 The ROW Tag
    2.6 The TREE Tag
    2.7 The NODE Tag
    2.8 Precedence of attributes
    2.9 Elementary data types
    2.10 The WHEN-event tags
    2.11 The VALUE Tag 2.12 The STRING Tag
2.13 The NUMBER Tag
2.14 The DATE Tag
2.15 The TIME Tag
2.16 The BOOLEAN Tag
2.17 User Defined types
2.18 The UDT Tag
2.19 Complex data types
2.20 The IMAGE Tag
2.21 The AUDIO Tag
2.22 Item manipulation verbs
2.23 CHANGE-ITEM
2.24 REFRESH-ITEM
2.25 DISPLAY-ITEM
2.26 User Actions against the Data Model
2.27 ACTION-GROUP
2.28 ACTION-LIST
2.29 CONTEXT-GROUP
2.30 ACTION
2.31 ACCELERATORs
3. Presentation Model
  3.1 The WIZARD Tag
  3.2 The PROPERTYSHEET Tag
  3.3 The PANEL Tag
  3.4 Action Containers
  3.5 The MENUBAR Tag
  3.6 The MENU Tag
  3.7 The MENUITEM Tag
  3.8 The SEPARATOR Tag
  3.9 The TOOLBAR Tag
  3.10 Areas
  3.11 The VERTICAL-AREA Tag
  3.12 The HORIZONTAL-AREA Tag
  3.13 The DEFINITE-AREA Tag
  3.14 The SPLIT-AREA Tag
  3.15 The DECK-AREA Tag
  3.16 The TABBED-AREA Tag
  3.17 The CHOICE-AREA Tag
  3.18 The TABLE-AREA Tag
  3.19 The HEADING Tag
  3.20 The COLUMN Tag
  3.21 The TREE-AREA Tag
  3.22 The GRID-AREA Tag
  3.23 The GRIDROW Tag
  3.24 The GRIDCOLUMN Tag
  3.25 The GRIDCELL Tag 3.26 Visual Controls
  3.27 The COMPONENT Tag
  3.28 The LABEL Tag
  3.29 The BUTTON Tag
  3.30 The TEXTFIELD Tag
  3.31 The TEXTBOX Tag
  3.32 The IMG Tag
  3.33 The SLIDER Tag
  3.34 The SPINNER Tag
  3.35 The PROGRESSBAR Tag
  3.36 The RADIOBUTTON Tag
  3.37 The CHECKBOX Tag
  3.38 The COMBOBOX Tag
  3.39 The LIST Tag
4. Common Metadata Elements
  4.1 The CAPTION Tag
  4.2 The HINT Tag
  4.3 The TIP Tag
  4.4 The META-TEXT Tag
  4.5 The META-IMAGE Tag
  4.6 The META-AUDIO Tag
5. Examples

1. Introduction

AUIML consists of two major classifications of Elements, those that define the Data Model which underpins a specific interaction with a user and the Presentation Model which specifies what the User Interface should "look like". The Data Model is independent of the modality of user interaction. The Presentation Model allows flexibility in the degree of specificity of what exactly is expected of a renderer.

These two aspects allow a designer a spectrum of options to specify a user interface. At the one extreme is the intent based definition where all the interaction is encoded in the data model and the presentation is almost entirely determined by the renderer applied. At the other end of the spectrum, the designer adopts a highly prescriptive visual approach and designs in terms of appearance, selecting all the visual components and explicitly laying them out.

The intent based approach provides a great deal of flexibility by allowing decisions on the most appropriate "presentation" to be taken by the renderer. For example, should a choice need to be made by a user the intent model will merely state the list of alternatives, any default and how many choices are allowed. This will allow a renderer to exploit the resources available in the most effective manner.

However, a designer may wish to reproduce an existing User Interface which any rule based renderer is unlikely to be able to reproduce. In this circumstance the designer can specify as much as they wish. They may choose the control and leave placement to be automatic, or specify both.

|  | PC | PalmPilot | Telephone |
|---|---|---|---|
|  | 1024*768, 16bit color display | 160*160, 2bit gray |  |
|  | Keyboard, mouse | Pen | Keypad, microphone |
| Choose title from: Mr., Mrs., Miss, Ms. | An array of 4 radio buttons. | 4 entries in a dropdown list box (COMBOBOX) | "Speak" options, press #1 for Mr. press #2 for Mrs. press #3 for Miss press #4 for Ms. |

1.1 Intent based markup

The following example would define all the information necessary to offer a choice of person's Title to a user. The designer has not specified presentation information and what exactly is rendered is left entirely to the renderer.

```
<CHOICE NAME="PersonTitles" Selection-Policy="SINGLE">
   <CAPTION>A set of Person titles</CAPTION>
   <HINT>This is a set of valid titles for a person.</HINT>
   <STRING NAME="Mr">
     <CAPTION>Mr.</CAPTION>
   </STRING>
   <STRING NAME="MRS">
     <CAPTION>Mrs.</CAPTION>
   </STRING>
   <STRING NAME="MISS">
     <CAPTION>Miss</CAPTION>
   </STRING>
   <STRING NAME="MS">
     <CAPTION>Ms</CAPTION>
   </STRING>
</CHOICE>
```

1.2 Presentation based markup

The following example makes use of the same data model but specifies that the choice is to be offered via Radio buttons. The designer has gained more control of the rendering but at the expense of the flexibility to use alternative renderers such as a Voice Response Unit (VRU). This example also shows the designer having specified the position of each control. This could have been omitted, leaving some degree of flexibility to the renderer.

```
<CHOICE-AREA NAME="PersonTitles">
   <RADIOBUTTON />
</CHOICE-AREA>
```

Hybrid approaches are also possible whereby the designer creates a complete data model and potentially many presentation models for devices where some degree of control is required.

1.3 Classification of Elements

The Presentation and Data Model elements can both be classified in one of three ways:

|  | Presentation | Data[1] |
|---|---|---|
| Root container: This provides the outermost containment. | WIZARD, PROPERTYSHEET, PANEL | DATA-GROUP |
| Container: Containers can be nested to any level. | VERTICAL-AREA, HORIZONTAL-AREA, DEFINITE-AREA, DECK-AREA, SPLIT-AREA, TABBED-AREA | GROUP, CHOICE, TABLE, TREE, ACTION-GROUP |
| Leaf entity: Leaves are the end nodes and can appear at any level in the containment hierarchy. | TEXTFIELD, LABEL, etc. | STRING, NUMBER, DATE, TIME, ACTION etc. |

1.4 Notation

The XML elements which make up AUIML are order-dependent, and must be specified in the order described in the following sections. Names of elements and attributes are case sensitive, but predefined character data and attribute values are not. Further information on XML syntax guidelines and the definition of XML entities is presented in the Extensible Markup Language (XML) 1.0 Specification available at http://www.w3.org/TR/1998/REC-xml-19980210

All entities which can have an identity assigned to them use a common attribute "NAME=", this is intentionally not "ID=" since this might imply that it has a type of ID which requires that all IDs within a document are unique. It is the responsibility of an interpreter to ensure that names are unique within their defined scope, XML parsers will not be able to assist. When Element and Attribute names contain more than one word they will be hyphenated.

All entity references conform to the URI specification, see:
http://www.w3.org/hypertext/WWW/Addressing/URL/URI_Overview.html

1.5 Templates

Many of the elements can defined in such a way that they can be used as templates allowing for extensive reuse. Elements which support both the NAME and TEMPLATE attributes can be used in this way. For example, it is common to have the need to ask a user to choose between two alternatives such as YES and NO. This can be achieved by defining the choice once and
assigning it a NAME and then *copying* the element by use of TEMPLATE:

A reusable template would be defined as:

```
<CHOICE NAME="yes-no">
   <CAPTION>Options available are:</CAPTION>
   <STRING NAME="Affirmative">
     <CAPTION>Yes</CAPTION>
   </STRING>
   <STRING NAME="Negative">
     <CAPTION>No</CAPTION>
   </STRING>
</CHOICE>
```

The template could then be reused:

```
<CHOICE NAME="thisQuestion" TEMPLATE="yes-no"/>
``` characteristics of the group could then be overridden

```
<CHOICE NAME="thisQuestion" TEMPLATE="yes-no">
   <CAPTION>Please choose from the following:</CAPTION>
</CHOICE>
```

2. Data Model

The data model structures the information necessary to support a particular user interaction, this
does not generally reflect the physical or logical schema of a database which will require
transformation to be expressed as a AUIML Data Model.

For example, a database might hold attributes of people, some of which could be Title,
LastName, FirstName, MiddleInitial. For the user interaction it may be important to group these
together and describe them as a FullName. The Data Model for this would be:

```
<GROUP NAME="PersonName">
   <CAPTION>Person's complete name</CAPTION>
   <STRING NAME="Title">
     <CAPTION>Title</CAPTION>
     <VALUE>Mr.</VALUE>
   </STRING>
   <STRING NAME="FirstName">
     <CAPTION>First Name</CAPTION>
     <VALUE>Roland</VALUE>
   </STRING>
   <STRING NAME="Initial">
     <CAPTION>Initial</CAPTION>
     <VALUE>A</VALUE>
   </STRING>
   <STRING NAME="LastName">
     <CAPTION>Last Name</CAPTION>
     <VALUE>Merrick</VALUE>
   </STRING>
</GROUP>
```

This example also illustrates that data attributes can be specified in the data model, in this case <CAPTION> should be interpreted by the renderer as the field prompt or caption.

The data model consists of a small number of structural elements and a small number of elements which correspond to types of data.

2.1 The DATA-GROUP Tag

A data-group is the outermost container of data elements and possible actions associated with a single user interaction. It has an identity such that it can exist independently and hence be reused by reference. It also supports the common meta-data attributes.

| <DATA-GROUP | NAME="identifier"<br>TEMPLATE="URI"<br>VALID="TRUE \| FALSE"<br>NOTIFY-COMPLETE="TRUE \| FALSE"<br>BINDING="databinding"> |
|---|---|
| NAME | common usage which is used to uniquely identify this element. |
| TEMPLATE | Specifies the URI of a <DATA-GROUP> which is to be used as a template for this instance. |
| VALID | Indicates the validity of the current state of the DATA-GROUP. For a it to be valid all its children need to be valid except for any which are conditional and the condition is not satisfied. Can be used as a hint by a renderer to communicate this state to the user. |
| NOTIFY-COMPLETE | Indicates that the task logic should be notified when data entry for items in the DATA-GROUP are complete. The event will be triggered immediately prior to the renderer generating a COMPLETE in response to the user initiating an Action defined to generate such an event. |
| BINDING | Allow the specification of a string to facilitate binding of this DATA-GROUP to the task logic. |

Within the scope this tag the following tags may optionally be defined:
<GROUP>, <ACTION-GROUP>, <CHOICE>, <TABLE>, <TREE>, <CAPTION>, <HINT>, <TIP>

Plus all elementary data types, complex data types and <UDT>.

e.g.
```
<DATA-GROUP NAME="thisonesname">
   <CAPTION>A useful description of the purpose</CAPTION>
   <GROUP TEMPLATE="#PersonName" />
   <GROUP TEMPLATE="#PersonPostalAddress" />
   <ACTION NAME="OK" Type="COMPLETE">
     <CAPTION>Ok<CAPTION>
   </ACTION>
</DATA-GROUP>
```

2.2 The GROUP Tag

A group aggregates a number of individual data items and other groups. It is similar to a DATA-GROUP except that it can be nested and does not contain ACTION-GROUPs. It has an identity such that it can referenced and hence be reused. It also supports the common meta-data attributes.

```
<GROUP
         NAME="id"
         TEMPLATE="uri"
         SHOWN="TRUE | FALSE"
         ENABLED="TRUE | FALSE"
         SELECTED="TRUE | FALSE"
         VALID="TRUE | FALSE"
         NOTIFY-COMPLETE="TRUE | FALSE"
         BINDING="databinding"
         ITEM-NAME="data-item-name"
         TEST="SELECTED | ENABLED | SHOWN | VALID | VALUE"
         CONDITION="TRUE | FALSE | EQ | NE | GT | GE | LT | LE | CONTAINS">
```

| | |
|---|---|
| NAME | common usage which is used to uniquely identify this element. |
| TEMPLATE | Specifies the URI of a <GROUP> which is to be used as a template for this instance. |
| SHOWN | A group may be defined as visible or invisible. If it is defined as invisible (SHOWN="FALSE"), then the renderer should not present the user with this item. |
| ENABLED | A group may be defined as enabled or disabled. If it is defined as enabled (ENABLED="TRUE"), then the renderer should present the user with this item such that the user can change its value. |
| SELECTED | When "TRUE" is specified for this data item, the renderer should use this as a hint that this item should be rendered such that the user realises that it is "selected". |
| VALID | Indicates the validity of the current state of the GROUP. For a GROUP to be valid all its children need to be valid except for any which are conditional and the condition is not satisfied. Can be used as a hint by a renderer to communicate this state to the user. |
| NOTIFY-COMPLETE | Indicates that the task logic should be notified when the user completes data entry of all the items in a GROUP (which are enabled for data entry). The event is generated when the user invokes an action or switches focus to another GROUP. |
| BINDING | Allow the specification of a string to facilitate binding of this GROUP to the task logic. |
| ITEM-NAME | This is the name of another data item to which the conditional test is to be applied. |

| | Which attribute of the named item is to be tested. |
|---|---|
| TEST | |
| | The condition applied. |
| CONDITION | |

Within the scope of this tag the following tags may optionally be defined:
<GROUP>, <CONTEXT-GROUP>, <CHOICE>, <TABLE>, <TREE>, <VALUE>, <ACTION>, <CAPTION>, <HINT>, <TIP>

Plus all elementary data types, complex data types and <UDT>.

e.g.
```
<GROUP NAME="PersonName">
    <CAPTION>Person's complete name</CAPTION>
    <CHOICE NAME="PersonTitles" Selection-Policy="SINGLE">
      <CAPTION>Title</CAPTION>
      <HINT>This is a set of valid titles you may choose from.</HINT>
      <STRING NAME="MR">
        <CAPTION><META-TEXT>M<MN>r</MN>.</META-TEXT></CAPTION>
      </STRING>
      <STRING NAME="MRS">
        <CAPTION><META-TEXT><MN>M</MN>rs.</META-TEXT></CAPTION>
      </STRING>
      <STRING NAME="MISS">
        <CAPTION><META-TEXT>M<MN>i</MN>ss</META-TEXT></CAPTION>
      </STRING>
      <STRING NAME="MS">
        <CAPTION><META-TEXT>M<MN>s</MN>.</META-TEXT></CAPTION>
      </STRING>
    </CHOICE>
    <STRING NAME="FirstName">
      <CAPTION>First Name</CAPTION>
      <VALUE>Roland</VALUE>
    </STRING>
    <STRING NAME="Initial">
      <CAPTION>Initial</CAPTION>
      <VALUE>A</VALUE>
    </STRING>
    <STRING NAME="LastName">
      <CAPTION>Last Name</CAPTION>
      <VALUE>Merrick</VALUE>
    </STRING>
</GROUP>

<GROUP ITEM-NAME="MRS" TEST="SELECTED" CONDITION="TRUE">
    <STRING NAME="MaidenName">
      <CAPTION>Maiden Name</CAPTION>
      <VALUE></VALUE>
    </STRING>
</GROUP-GROUP>
```

2.3 The CHOICE Tag

A `CHOICE` aggregates a list of individual data items. It has an identity such that it can referenced and hence be reused. It also supports the common meta-data attributes. The contents will be in the form of a homogeneous collection of elementary data items.

A renderer should use the CAPTION when making the alternatives available to a user, if no CAPTION is supplied then any VALUE supplied can be used. An example of a visual rendering could be the usage of Radio buttons or a List box.

```
<CHOICE
        NAME="id"
        TEMPLATE="uri"
        SHOWN="TRUE | FALSE"
        ENABLED="TRUE | FALSE"
        NOTIFY-SELECTION='TRUE | FALSE"
        BINDING="databinding"
        OPTIMUM-SIZE="opt"
        SELECTION-POLICY="SINGLE | SINGLE-RANGE | MULTIPLE">
```

| | |
|---|---|
| NAME | common usage which is used to identify this element. |
| TEMPLATE | Specifies the URI of a `<CHOICE>` which is to be used as a template for this instance. |
| SHOWN | A group may be defined as visible or invisible. If it is defined as invisible (`SHOWN="FALSE"`), then the renderer should not present the user with this item. |
| ENABLED | A group may be defined as enabled or disabled. If it is defined as enabled (`ENABLED="TRUE"`), then the renderer should present the user with this item such that the user can change its value. |
| NOTIFY-SELECTION | A SELECTION event will be generated when the selection state of the subject entity changes and NOTIFY-SELECTION="TRUE". It is the responsibility of the application logic receiving the event to determine the resultant state. |
| BINDING | Allow the specification of a string to facilitate binding of this `CHOICE` to the task logic. |
| OPTIMUM-SIZE | Specifies the optimum number of entries in the list. While the actual number of entries in the list at run time can vary over time, this value should not change. |
| SELECTION-POLICY | Specifies whether any items in the list are allowed to be selectable and if so if it is only one, a contiguous range, or any number. |

Within the scope of this tag the following tags may optionally be defined:
`<CAPTION>, <HINT>, <TIP>`

Plus all elementary data types, complex data types and `<UDT>`.

2.4 The TABLE Tag

A TABLE aggregates ROWS and provides a structured collection familiar as a table. It has an identity such that it can referenced and hence be reused. It also supports the common meta-data attributes. The contents will be in the form of a homogeneous collection of ROWS which are in turn containers of elementary data items.

```
<TABLE
          NAME="id"
          TEMPLATE="uri"
          SHOWN="TRUE | FALSE"
          ENABLED="TRUE | FALSE"
          NOTIFY-SELECTION='TRUE | FALSE"
          BINDING="databinding"
          OPTIMUM-SIZE="opt"
          SELECTION-POLICY="NONE | SINGLE | MULTIPLE">
```

| | |
|---|---|
| NAME | common usage which is used to identify this element. |
| TEMPLATE | Specifies the URI of a <TABLE> which is to be used as a template for this instance. |
| SHOWN | A group may be defined as visible or invisible. If it is defined as invisible (SHOWN="FALSE"), then the renderer should not present the user with this item. |
| ENABLED | A group may be defined as enabled or disabled. If it is defined as enabled (ENABLED="TRUE"), then the renderer should present the user with this item such that the user can change its value. |
| NOTIFY-SELECTION | A SELECTION event will be generated when the selection state of the subject entity changes and NOTIFY-SELECTION="TRUE". It is the responsibility of the application logic receiving the event to determine the resultant state. |
| BINDING | Allow the specification of a string to facilitate binding of this CHOICE to the task logic. |
| OPTIMUM-SIZE | Specifies the optimum number of rows in the table in the list. While the actual number of entries in the table can vary over time, this value should not change. |
| SELECTION-POLICY | Specifies whether rows in the table are allowed to be selectable and if so if it is only one, or more than one. |

Within the scope of this tag the following tags may optionally be defined:
<ROW>, <CONTEXT-GROUP>, <CAPTION>, <HINT>, <TIP>

Plus all elementary data types, complex data types and <UDT>.

2.5 The ROW Tag

A ROW aggregates a number of elementary data items.

```
<ROW                    >
```

Within the scope of this tag the following tags may defined: elementary data types, complex data types and <UDT>.

2.6 The TREE Tag

A TREE aggregates NODES and provides a structured collection familiar as a tree. It has an identity such that it can referenced and hence be reused. It also supports the common meta-data attributes. The contents will be in the form of a collection of nodes and/or individual data types.

```
<TREE
        NAME="id"
        TEMPLATE="uri"
        SHOWN="TRUE | FALSE"
        ENABLED="TRUE | FALSE"
        NOTIFY-SELECTION='TRUE | FALSE"
        BINDING="databinding"
        OPTIMUM-SIZE="opt"
        SELECTION-POLICY="NONE | SINGLE | MULTIPLE">
```

| | |
|---|---|
| NAME | common usage which is used to identify this element. |
| TEMPLATE | Specifies the URI of a <TREE> which is to be used as a template for this instance. |
| SHOWN | A group may be defined as visible or invisible. If it is defined as invisible (SHOWN="FALSE"), then the renderer should not present the user with this item. |
| ENABLED | A group may be defined as enabled or disabled. If it is defined as enabled (ENABLED="TRUE"), then the renderer should present the user with this item such that the user can change its value. |
| NOTIFY-SELECTION | A SELECTION event will be generated when the selection state of the subject entity changes and NOTIFY-SELECTION="TRUE". It is the responsibility of the application logic receiving the event to determine the resultant state. |
| BINDING | Allow the specification of a string to facilitate binding of this CHOICE to the task logic. |
| OPTIMUM-SIZE | Specifies the optimum number of child nodes and elements in the tree. While the actual number of entries in the tree can vary over time, this value should not change. |
| SELECTION-POLICY | Specifies whether items in the tree are allowed to be selectable and if so if it is only one, or more than one. |

Within the scope of this tag the following tags may optionally be defined:
<NODE>, <CONTEXT-GROUP>, <CAPTION>, <HINT>, <TIP>

Individual data elements, e.g. `<STRING>`, `<NUMBER>`.

2.7 The NODE Tag

A NODE aggregates a number of nodes and elementary data items.

| `<NODE` | | |
|---|---|---|
| | STATE="currentState"> | |
| | | A string representing the current application state of the node. |
| STATE | | |

Within the scope of this tag the following tags may optionally be defined:
`<NODE>, <CONTEXT-MENU>, <CAPTION>, <HINT>, <TIP>`

Unusually, a NODE can have multiple instances of `<CAPTION>, <HINT>, <TIP>`. There can be one specified for each STATE of the node.

Plus all elementary data types, complex data types and `<UDT>`.

e.g.
```
<TREE NAME="exampleAUIMLtree">
   <NODE STATE="CLOSED">
   <CAPTION STATE="OPEN">
     <META-IMAGE SRC="openBox.gif" />
   </CAPTION>
   <CAPTION STATE="CLOSED">
     <META-IMAGE SRC="closedBox.gif" />
   </CAPTION>
   <STRING>
     <CAPTION>Name</CAPTION>
     <VALUE>Roland A. Merrick</VALUE>
   </STRING>
   <NUMBER>
     <CAPTION>Serial No</CAPTION>
     <VALUE>099352</VALUE>
   </NUMBER>
   </NODE>
   ...
</TREE>
```

2.8 Precedence of attributes

The precedence rules for the attributes of the various group types and their contents are defined as follows:

SHOWN

| Parent value | | |
|---|---|---|
| | Item value | Item Rendered? |
| TRUE | TRUE | TRUE |
| TRUE | FALSE | FALSE |

| FALSE | FALSE | FALSE |
| FALSE | TRUE | FALSE |

ENABLED

Parent value

| | Item value | Item Enabled? |
|---|---|---|
| TRUE | TRUE | TRUE |
| TRUE | FALSE | FALSE |
| FALSE | FALSE | FALSE |
| FALSE | TRUE | FALSE |

SELECTED

Parent value

| | Item value | Item Selected? |
|---|---|---|
| TRUE | TRUE | TRUE |
| TRUE | FALSE | FALSE |
| FALSE | FALSE | FALSE |
| FALSE | TRUE | TRUE |

VALID

Parent value

| | Item value | Parent Valid? |
|---|---|---|
| TRUE | TRUE | TRUE |
| TRUE | FALSE | FALSE |
| FALSE | FALSE | FALSE |
| FALSE | TRUE | TRUE |

2.9 Elementary data types

There are a limited number of elementary data types which need to be understood by a renderer. This set has been purposely kept small. All of these elementary data types have a number of attributes in common and have a shared definition which will not be described for each of the elementary data types, these attributes include:

```
<type
        NAME="id"
        TEMPLATE="uri"
        SHOWN="TRUE | FALSE"
        ENABLED="TRUE | FALSE"
        READ-ONLY="TRUE | FALSE"
        SELECTED="TRUE | FALSE"
```

```
MANDATORY="TRUE | FALSE"
VALID="TRUE | FALSE"
NOTIFY-COMPLETE="TRUE | FALSE"
BINDING="databinding">
```

| | |
|---|---|
| NAME | common usage. Can be used to uniquely identify the data item. |
| TEMPLATE | Specifies the URI of a data item which is to be used as a template for this instance. |
| SHOWN | Data items may be defined as visible or invisible. If a data item is defined as invisible (`SHOWN="FALSE"`), then the renderer should not present the user with this item. |
| ENABLED | Data items may be defined as enabled or disabled. If a data item is defined as enabled (`ENABLED="TRUE"`), then the renderer should present the user with this item such that the user can change its value.<br><br>If a data item is defined as disabled (`ENABLED="FALSE"`), then the renderer should present the user with this item in exactly the same manner as if enabled BUT such that the user can NOT interact with its value. |
| READ-ONLY | Data items may be defined as READ-ONLY. If a data item is defined as not READ-ONLY (`READ-ONLY="FALSE"`), then the renderer should present the user with this item such that the user can change its value. |
| SELECTED | When "TRUE" is specified for this data item, the renderer should use this as a hint that this item should be rendered such that the user realises that it is "selected". |
| MANDATORY | When this attribute is specified with a "TRUE" value, then a value for the data item must entered whenever presented to a user. If an initial value is assigned, then the item is considered to have a value and will pass the mandatory test even if the value is unchanged. |
| VALID | Indicates the validity of the current state of the items value. Can be used as a hint by a renderer to communicate this state to the user. |
| NOTIFY-COMPLETE | Indicates that the task logic should be notified when data entry for this field is complete. This notification can be used, among other things, for validation of data supplied. |
| BINDING | Allow the specification of a string to facilitate binding of this `data-item` to the task logic. |

The interaction between the ENABLED and READ-ONLY attributes is complex and arises because of expectations that have been established by usage of analogous properties in GUI toolkits. The intended interpretation is as follows:

| | |
|---|---|
| READ-ONLY="FALSE", ENABLED="TRUE" | READ-ONLY="FALSE", ENABLED="FALSE" |
| When rendered the item may be updated even though the complete value might not be visible. This is usually encountered when a value has ben assigned to a TEXTFIELD which is too small but which will auto-scroll. | The item should be rendered exactly as if the item were enabled, except that the item will be "greyed" out to indicate that it cannot presently be changed. |
| READ-ONLY="TRUE", ENABLED="TRUE" | READ-ONLY="TRUE", ENABLED="FALSE" |
| The item will be rendered in exactly the same manner as when the READ-ONLY value is FALSE. However, although interactions such as striping for selection and auto scrolling are enabled, the value cannot be changed. | The item should be rendered exactly as if the item were enabled, except that the item will be "greyed" out to indicate that it cannot presently be changed. |

2.10 The WHEN-event tags

All elementary data types allow the specification of simple event handlers for the common supported events which are matched by the supported states (i.e. SELECTED, SHOWN, ENABLED).

There is an element type for each of these i.e. `<WHEN-SELECTED>`, `<WHEN-SHOWN>`, `<WHEN-ENABLED>`, `<WHEN-VALID>` and are all of the same form:

```
<WHEN-event
          CONDITION="TRUE | FALSE">
          Determine whether the condition is true or false.
CONDITION
```

A `<WHEN-VALUE>` element is also valid with a slightly different syntax to allow for a comparison value. This requires an additional child element of `<VALUE>`.

```
<WHEN-VALUE
          CONDITION="TRUE | FALSE | EQ | NE | GT | GE | LT | LE | CONTAINS">
          Determine whether the condition is true or false.
CONDITION
```

Within the element the behaviour, in terms of changing the state of another data item, can be specified. This is achieved by use of the `<CHANGE-ITEM>` and `<REFRESH-ITEM>` elements.

e.g.

```
<STRING NAME="FirstName">
   <CAPTION>Forename</CAPTION>
   <HINT>The first or Christian name for the person.</HINT>
   <VALUE></VALUE>
   <WHEN-SELECTED CONDITION="TRUE"> <!-- TRUE is default, shown for clarity --
>
      <CHANGE-ITEM NAME="item-to-change" .... />
      <REFRESH-ITEM NAME="item-to-change" .... />
   </WHEN-SELECTED>
   <WHEN-SELECTED CONDITION="FALSE">
      <CHANGE-ITEM NAME="item-to-change" .... />
   </WHEN-SELECTED>
   <WHEN-VALUE CONDITION="EQ"> <!-- EQ is default, shown for clarity -->
     <VALUE>Roland</VALUE>
     <CHANGE-ITEM NAME="item-to-change" .... />
   </WHEN-VALUE>
</STRING>
```

All elementary data types allow two ways to specify a value for the item, either through the use of a <VALUE> element which can be used in combination with other elements such as <CAPTION>, or alternatively accept PCDATA. Alternatively a binding to a task can be specified allowing the value to be created, modified and destroyed at runtime.

e.g.

```
<STRING NAME="FirstName">
   <CAPTION>Forename</CAPTION>
   <HINT>The first or Christian name for the person.</HINT>
   <VALUE>Roland</VALUE>
</STRING>
``` or
`<STRING NAME="FirstName" BINDING="aSegmentOfTask" />`

2.11 The VALUE Tag

All the individual data items can have a value. This can be statically defined in the source document. Elementary data types allow an inline representation of their value.

| <VALUE |   |
|--------|---|
|        | > |

2.12 The STRING Tag

Any valid combination of characters allowed in an XML string expression. This combination of characters may include special character definitions, entered using the XML &#xNNNN; format for entry of special characters, entity references e.g. > or other valid XML string specification syntax. It also supports the common meta-data attributes.

| <STRING | NAME="id"      | Standard definition.[2] |
|---------|----------------|-------------------------|
|         |                | Standard definition.    |
|         | TEMPLATE="uri" |                         |

| | | |
|---|---|---|
| | SHOWN="TRUE \| FALSE" | Standard definition. |
| | ENABLED="TRUE \| FALSE" | Standard definition. |
| | READ-ONLY="TRUE \| FALSE" | Standard definition. |
| | SELECTED="TRUE \| FALSE" | Standard definition. |
| | MANDATORY="TRUE \| FALSE" | Standard definition. |
| | VALID="TRUE \| FALSE" | Standard definition. |
| | MIN-LENGTH="min" | |
| | MAX-LENGTH="max" | |
| | OPTIMUM-LENGTH="opt" | |
| | OPTIMUM-SIZE="depth" | |
| | OBSCURED="TRUE \| FALSE" | |
| | NOTIFY-COMPLETE="TRUE \| FALSE" | Standard definition. |
| | BINDING="databinding"> | Standard definition. |
| MIN-LENGTH | Minimum number of characters for this string. Optional. | |
| MAX-LENGTH | Maximum number of characters for this string. Optional. | |
| OPTIMUM-LENGTH | Optimum length for this string. This acts as a hint to the renderer when explicit sizes are not being specified in the presentation syntax. Optional. | |
| | Indicates the number of lines this should occupy when rendered to a | |

| OPTIMUM-SIZE | display device. Depth is a number greater than 0. Optional. |
|---|---|
| OBSCURED | Indicates that values will be obscured in some way. An example of usage is for passwords where the value entered is not echoed back to the user. Optional. |

Within the scope of this tag the following tags may optionally be defined:
`<VALUE>, <CAPTION>, <HINT>, <TIP>, <CONTEXT-GROUP>, <WHEN-SHOWN>, <WHEN-ENABLED>, <WHEN-SELECTED>, <WHEN-VALID>, <WHEN-VALUE>` e.g.
```
<STRING NAME="FirstName" MIN-LENGTH="2" OPTIMUM-LENGTH="10" MANDATORY="TRUE">
   <CAPTION>Forename</CAPTION>
   <HINT>The first or Christian name for the person.</HINT>
   <VALUE>Roland</VALUE>
</STRING>
```

2.13 The NUMBER Tag

Any valid numeric expression of the form characteristic.fraction
Numbers are considered to be positive unless they have a leading negative (-) sign, e.g.
12345.66, .45, 0.0003, -12345.66, -0.0003

| <NUMBER | NAME="id" | Standard definition. |
|---|---|---|
| | TEMPLATE="uri" | Standard definition. |
| | SHOWN="TRUE \| FALSE" | Standard definition. |
| | ENABLED="TRUE \| FALSE" | Standard definition. |
| | READ-ONLY="TRUE \| FALSE" | Standard definition. |
| | SELECTED="TRUE \| FALSE" | Standard definition. |
| | MANDATORY="TRUE \| FALSE" | Standard definition. |
| | VALID="TRUE \| FALSE" | Standard definition. |
| | MIN="min" | |
| | MAX="max" | |

|  | PRECISION="characteristic.fraction" |  |
|---|---|---|
|  | NOTIFY-COMPLETE="TRUE \| FALSE" | Standard definition. |
|  | BINDING="databinding"> | Standard definition. |
| MIN | Minimum value. Same format as the VALUE. Optional. | |
| MAX | Maximum value. Same format as the VALUE. Optional. | |
| PRECISION | Specifies the precision of the numeric value in the form "*characteristic.fraction*". Optional. The default *fraction* is 0, i.e. the number is an integer. | |

Within the scope of this tag the following tags may optionally be defined:
<VALUE>, <CAPTION>, <HINT>, <TIP>, <CONTEXT-GROUP>, <WHEN-SHOWN>, <WHEN-ENABLED>, <WHEN-SELECTED>, <WHEN-VALID>, <WHEN-VALUE> e.g.
```
<NUMBER NAME="Age" MIN="0" MAX="150" PRECISION="3.0" MANDATORY="TRUE">
    <CAPTION>Person's Age</CAPTION>
    <HINT>Person's age in years</HINT>
    <VALUE>44</VALUE>
</NUMBER>
```

2.14 The DATE Tag

Any valid date expression in a subset of ISO 8601 format (yyyymmdd). The renderer is responsible for converting to *locale* specific date formatting.

| <DATE | NAME="id" | Standard definition. |
|---|---|---|
|  | TEMPLATE="uri" | Standard definition. |
|  | SHOWN="TRUE \| FALSE" | Standard definition. |
|  | ENABLED="TRUE \| FALSE" | Standard definition. |
|  | READ-ONLY="TRUE \| FALSE" | Standard definition. |
|  | SELECTED="TRUE \| FALSE" | Standard definition. |

| | | |
|---|---|---|
| | MANDATORY="TRUE \| FALSE" | Standard definition. |
| | VALID="TRUE \| FALSE" | Standard definition. |
| | EARLIEST="min" | |
| | LATEST="max" | |
| | NOTIFY-COMPLETE="TRUE \| FALSE" | Standard definition. |
| | BINDING="databinding"> | Standard definition. |
| EARLIEST | Earliest acceptable date. Optional | |
| LATEST | Latest acceptable date Optional. | |

Within the scope of this tag the following tags may optionally be defined:
<VALUE>, <CAPTION>, <HINT>, <TIP>, <CONTEXT-GROUP>, <WHEN-SHOWN>, <WHEN-ENABLED>, <WHEN-SELECTED>, <WHEN-VALID>, <WHEN-VALUE> e.g.
```
<DATE NAME="Dateofbirth" EARLIEST="18500101" LATEST="19990101"
MANDATORY="TRUE">
   <CAPTION>Birth date</CAPTION>
   <HINT>Date the Person was born</HINT>
   <VALUE>19541231</VALUE>
</DATE>
```

2.15 The TIME Tag

Any valid time expression in a subset of ISO 8601 format (hhmmss). The renderer is responsible for converting to *locale* specific formatting.

| <TIME | NAME="id" | Standard definition. |
|---|---|---|
| | TEMPLATE="uri" | Standard definition. |
| | SHOWN="TRUE \| FALSE" | Standard definition. |
| | ENABLED="TRUE \| FALSE" | Standard definition. |

|  |  | Standard definition. |
|---|---|---|
|  | READ-ONLY="TRUE \| FALSE" |  |
|  | SELECTED="TRUE \| FALSE" | Standard definition. |
|  | MANDATORY="TRUE \| FALSE" | Standard definition. |
|  | VALID="TRUE \| FALSE" | Standard definition. |
|  | EARLIEST="min" |  |
|  | LATEST="max" |  |
|  | NOTIFY-COMPLETE="TRUE \| FALSE" | Standard definition. |
|  | BINDING="databinding"> | Standard definition. |
| EARLIEST | Earliest acceptable time. Optional |  |
| LATEST | Latest acceptable time. Optional. |  |

Within the scope of this tag the following tags may optionally be defined:
<VALUE>, <CAPTION>, <HINT>, <TIP>, <CONTEXT-GROUP>, <WHEN-SHOWN>, <WHEN-ENABLED>, <WHEN-SELECTED>, <WHEN-VALID>, <WHEN-VALUE> e.g.
```
<TIME NAME="timeofbirth">
   <CAPTION>Birth time</CAPTION>
   <HINT>Time the Person was born, if known</HINT>
   <VALUE></VALUE>
</TIME>
```

2.16 The BOOLEAN Tag

This type allows the simple declaration of an elementary data item with only two possible values.

| <BOOLEAN | NAME="id" | Standard definition. |
|---|---|---|
|  | TEMPLATE="uri" | Standard definition. |

|  |  | Standard definition. |
|---|---|---|
|  | SHOWN="TRUE \| FALSE" |  |
|  | ENABLED="TRUE \| FALSE" | Standard definition. |
|  | READ-ONLY="TRUE \| FALSE" | Standard definition. |
|  | SELECTED="TRUE \| FALSE" | Standard definition. |
|  | MANDATORY="TRUE \| FALSE" | Standard definition. |
|  | VALID="TRUE \| FALSE" | Standard definition. |
|  | NOTIFY-COMPLETE="TRUE \| FALSE" | Standard definition. |
|  | BINDING="databinding"> | Standard definition. |

Within the scope of this tag the following tags may optionally be defined:
<VALUE>, <CAPTION>, <HINT>, <TIP>, <CONTEXT-GROUP>, <WHEN-SHOWN>, <WHEN-ENABLED>, <WHEN-SELECTED>, <WHEN-VALID>, <WHEN-VALUE>

There are only two valid values: TRUE and FALSE.

e.g.
```
<BOOLEAN NAME="Perhaps">
   <CAPTION>Vielleicht</CAPTION>
   <VALUE>TRUE</VALUE>
</BOOLEAN>
```

2.17 User Defined types

There are a large number of data types which may be required. To facilitate these a general purpose data type is included which allows new data types to be defined based on the Elementary data types. These may be considered aggregate when a number of elementary data types are used, or subtypes when a single elementary datatype is used, possibly with constraints.

2.18 The UDT Tag

The UDT is a container which allows arbitrary aggregations of Elementary data types. It support the usual metadata attributes so that they can be considered as a single entity.

| <UDT | NAME="id" | Standard definition. |
|---|---|---|

| | | |
|---|---|---|
| | TEMPLATE="uri" | Standard definition. |
| | TYPE="user defined type" | |
| | SHOWN="TRUE \| FALSE" | Standard definition. |
| | ENABLED="TRUE \| FALSE" | Standard definition. |
| | READ-ONLY="TRUE \| FALSE" | Standard definition. |
| | SELECTED="TRUE \| FALSE" | Standard definition. |
| | MANDATORY="TRUE \| FALSE" | Standard definition. |
| | VALID="TRUE \| FALSE" | Standard definition. |
| | NOTIFY-COMPLETE="TRUE \| FALSE" | Standard definition. |
| | BINDING="databinding"> | Standard definition. |
| TYPE | A string value to assign a name to the user defined data type . Required. | |

Within the scope of this tag the following tags may optionally be defined:
<UDT>, <CONTEXT-GROUP>, <STRING>, <NUMBER>, <DATE>, <TIME>, <BOOLEAN>, <IMAGE>, <AUDIO>, <CAPTION>, <HINT>, <TIP>, <WHEN-SHOWN>, <WHEN-ENABLED>, <WHEN-SELECTED>, <WHEN-VALID>, <WHEN-VALUE>

A TCP/IP address could be defined in the following way:

```
<UDT NAME="thisIPaddress" TYPE="IPADDRESS">
    <NUMBER MIN="0" MAX="255" />
    <NUMBER MIN="0" MAX="255" />
    <NUMBER MIN="0" MAX="255" />
    <NUMBER MIN="0" MAX="255" />
</UDT>

<UDT NAME="Gateway" TYPE="IPADDRESS" TEMPLATE="thisIPaddress">
    <CAPTION>Gateway</CAPTION>
    <NUMBER><VALUE>9</VALUE></NUMBER>
    <NUMBER><VALUE>180</VALUE></NUMBER>
    <NUMBER><VALUE>216</VALUE></NUMBER>
```

```
<NUMBER><VALUE>62</VALUE></NUMBER>
</UDT>
```

2.19 Complex data types

Unlike the elementary types described earlier (including UDT), a renderer need have no explicit support for these complex data types other than the ability to associate an appropriate rendering capability. These share the same common attributes as the elementary data types. However, values are assigned indirectly via URI.

2.20 The IMAGE Tag

The IMAGE tag defines an image in GIF or JPEG format.

| <IMAGE | NAME="id" | Standard definition. |
|---|---|---|
| | TEMPLATE="uri" | Standard definition. |
| | SHOWN="TRUE \| FALSE" | Standard definition. |
| | ENABLED="TRUE \| FALSE" | Standard definition. |
| | SELECTED="TRUE \| FALSE" | Standard definition. |
| | SRC="uri" | |
| | BINDING="databinding"> | Standard definition. |
| SRC | The specifies the URI of the item which constitutes the value for the image. | |

Within the scope of this tag the following tags may optionally be defined:
```
<CAPTION>, <HINT>, <TIP>, <WHEN-SHOWN>, <WHEN-ENABLED>, <WHEN-SELECTED>,
<CONTEXT-GROUP>
``` e.g.
```
<IMAGE NAME="portrait" SRC="http://.........jpg" >
   <CAPTION>Photograph of person</CAPTION>
</IMAGE>
```

2.21 The AUDIO Tag

The AUDIO tag defines a sound in AU format.

| <AUDIO | NAME="id" | Standard definition. |
|---|---|---|

| | | Standard definition. |
|---|---|---|
| | TEMPLATE="uri" | |
| | SHOWN="TRUE \| FALSE" | Standard definition. |
| | SRC="uri" | |
| | BINDING="databinding"> | Standard definition. |
| SRC | The specifies the URI of the item which constitutes the value for the audio stream. | |

Within the scope of this tag the following tags may optionally be defined:
`<CAPTION>, <HINT>, <TIP>, <WHEN-SHOWN>, <CONTEXT-GROUP>` e.g.
```
<AUDIO NAME="Speech" SRC="http://.........au" >
   <CAPTION>A talk by J. Bloggs.</CAPTION>
</AUDIO>
```

2.22 Item manipulation verbs

There are three element types which are valid in the `<WHEN-event>` elements which allow the state of other data elements (including the different types of Group) to be manipulated as a consequence of the event happening.

2.23 CHANGE-ITEM

This element allows the specification of changes that are to be made to attributes of elements defined elsewhere in the document model.

| `<CHANGE-ITEM` | |
|---|---|
| | ITEM-NAME="itemName"<br>SHOWN="TRUE \| FALSE"<br>ENABLED="TRUE \| FALSE"<br>SELECTED="TRUE \| FALSE"> |
| ITEM-NAME | The name of the item whose attributes are to be modified. | e.g.
```
<STRING NAME="FirstName">
   <CAPTION>Forename</CAPTION>
   <HINT>The first or Christian name for the person.</HINT>
   <VALUE>Roland</VALUE>
   <WHEN-SELECTED CONDITION="TRUE"> <!-- TRUE is default, shown for clarity --
>
      <CHANGE-ITEM NAME="item-to-change" ENABLED="TRUE"/>
```

```
</WHEN-SELECTED>
</STRING>
```

2.24 REFRESH-ITEM

This element defines that the value and the attributes of an item should be re-evaluated and the rendering refreshed.

| <REFRESH-ITEM | ITEM-NAME="itemName"> |
|---|---|
| ITEM-NAME | The name of the item whose rendering is to be refreshed. |

2.25 DISPLAY-ITEM

This element defines which of a set of items should be considered the "current" one for display purposes. This should ensure that the item should be immediately available to the user and should not be obscured. E.g. Should become top pane in a deck-pane, top tab in a property sheet etc.

| <DISPLAY-ITEM | ITEM-NAME="itemName"> |
|---|---|
| ITEM-NAME | The name of the item in a collection which should be rendered. |

2.26 User Actions against the Data Model

This section describes the actions which the user is allowed to perform on some or all of the data model. The individual actions can be aggregated and associated with one or more data items or aggregations of data items.

2.27 ACTION-GROUP

An ACTION-GROUP aggregates a list of individual ACTION and ACTION-GROUP items. It has an identity such that it can referenced and hence be reused. It also supports the common meta-data attributes. It is similar to a GROUP in that it can be nested. The nested structure allows related ACTIONs to grouped together and facilitates familiar visual renderings such as cascading menus.

| <ACTION-GROUP | NAME="id"<br>TEMPLATE="uri"> |
|---|---|
| NAME | common usage which is used to uniquely identify the ACTION-GROUP. |
| TEMPLATE | Specifies the URI of a data item which is to be used as a template for this instance. |

Within the scope of this tag the following tags may optionally be defined:
`<ACTION-GROUP>, <ACTION>, <ACTION-LIST>, <CAPTION>, <HINT>, <TIP>` e.g.
```
<ACTION-GROUP NAME="EditMenu">
   <CAPTION><MN>E</MN>dit</CAPTION>
   <ACTION NAME="ClipboardCut">
      <CAPTION>
         <META-TEXT>Cu<MN>t</MN></META-TEXT>
         <META-IMAGE SRC="http://cutObject.gif" />
      </CAPTION>
      <ACCELERATOR KEY="X" MODIFIER="ctrl" />
   </ACTION>
   <ACTION NAME="ClipboardCopy">
      <CAPTION>
         <META-TEXT><MN>C</MN>opy</META-TEXT>
         <META-IMAGE SRC="http://copyObject.gif" />
      </CAPTION>
      <ACCELERATOR KEY="C" MODIFIER="ctrl" />
   </ACTION>
   <ACTION NAME="ClipboardPaste">
      <CAPTION>
         <META-TEXT><MN>P</MN>aste</META-TEXT>
      </CAPTION>
      <ACCELERATOR KEY="C" MODIFIER="ctrl" />
   </ACTION>
</ACTION-GROUP>
```

2.28 ACTION-LIST

An ACTION-LIST aggregates a list of individual ACTION items. It has an identity such that it can referenced and hence be reused. It also supports the common meta-data attributes. The set of items is similar to a CHOICE in that a SELECTION-POLICY is required to indicate whether these actions are mutually exclusive or not.

| `<ACTION-LIST` | `NAME="id"`<br>`TEMPLATE="uri"`<br>`SELECTION-POLICY="SINGLE  \|  MULTIPLE">` |
|---|---|
| NAME | Common usage which is used to uniquely identify the element. |
| TEMPLATE | Specifies the URI of a data item which is to be used as a template for this instance. |
| SELECTION-POLICY | Specifies how many actions are allowed to be selected: one; more than one. |

Within the scope of this tag the following tags may optionally be defined: `<ACTION>` e.g.
```
<ACTION-LIST SELECTION-POLICY="SINGLE">
```

```
<ACTION>
  <CAPTION>
    <META-TEXT><MN>N</MN>ormal</META-TEXT>
    <META-IMAGE SRC="http://normalObject.gif" />
  </CAPTION>
</ACTION>
<ACTION>
  <CAPTION>
    <META-TEXT>Onlin<MN>e</MN> Layout</META-TEXT>
    <META-IMAGE SRC="http://onlineObject.gif" />
  </CAPTION>
</ACTION>
<ACTION>
  <CAPTION>
    <META-TEXT><MN>P</MN>age Layout</META-TEXT>
    <META-IMAGE SRC="http://PLObject.gif" />
  </CAPTION>
</ACTION>
<ACTION>
  <CAPTION>
    <META-TEXT><MN>O</MN>utline</META-TEXT>
    <META-IMAGE SRC="http://outlineObject.gif" />
  </CAPTION>
</ACTION>
</ACTION-LIST>
```

2.29 CONTEXT-GROUP

This is intended to facilitate context menus. It is similar to the ACTION-GROUP in that it is a structured set of ACTIONs.

| <CONTEXT-GROUP | | 
|---|---|
| | NAME="id"<br>TEMPLATE="uri"> |
| NAME | Common usage which is used to uniquely identify the ACTION-LIST. |
| TEMPLATE | Specifies the URI of a data item which is to be used as a template for this instance. |

Within the scope of this tag the following tags may optionally be defined:
`<ACTION>, <ACTION-LIST>, <CONTEXT-GROUP>` e.g.
```
<CONTEXT-GROUP>
    <ACTION ALIAS="ClipboardCut" />
    <ACTION ALIAS="ClipboardCopy" />
    <ACTION ALIAS="ClipboardPaste" />
</CONTEXT-GROUP>
```

2.30 ACTION

There are three types of action supplied each of which is intended to support a particular semantic which is useful to the author. It has an identity such that it can exist independently and hence be re-used by reference. It also supports the common meta-data attributes, which facilitate the familiar renderings for an action such as push-button, menu item, toobars. To allow ACTIONs to appear in menus, toolbars, and context menus they can be ALIASed.

Note: with an ALIAS there is only one underlying ACTION. Therefore any change to the attributes of an action, or the ALIAS of an action, will affect the originally specified ACTION and all its ALIASes.

| <ACTION | NAME="id"<br>TEMPLATE="uri"<br>ALIAS="uri"<br>SHOWN="TRUE \| FALSE"<br>ENABLED="TRUE \| FALSE"<br>TYPE="COMPLETE \| CANCEL \| OPEN \| ACTION \| HELP"<br>DEFAULT="TRUE \| FALSE"<br>BINDING="taskbinding"> |
|---|---|
| NAME | common usage which is used to uniquely identify the ACTION. |
| TEMPLATE | Specifies the URI of a data item which is to be used as a template for this instance. |
| ALIAS | Specifies the name of an ACTION for which this can be consider an alias. Allows the *same* action to defined as available in multiple contexts. |
| SHOWN | ACTIONS may be defined as visible or invisible. If it is defined as invisible (SHOWN="FALSE"), then the renderer should not present the user with this ACTION. |
| ENABLED | ACTIONS may be defined as enabled or disabled. If it is defined as enabled (ENABLED="TRUE"), then the renderer should present the user with this ACTION such that it can be invoked. |
| TYPE | COMPLETE and CANCEL are intended to terminate the current task. The OPEN action is used to indicate that the user wishes to "open" up the item for further processing. An action is also supplied specifically to request help. All other action types should use TYPE="ACTION". |
| DEFAULT | If the value is TRUE, indicates that this action is to be the default. In a visual rendering system the button would receive the default emphasis indicating that the button's action should be invoked if the user presses the Enter key. This tag is optional. |
|  | Allow the specification of a string to facilitate binding of this action to the task logic. |

| BINDING | |

Within the scope of this tag the following tags may optionally be defined:
<ACCELERATOR>, <CAPTION>, <HINT>, <TIP> e.g.
```
<ACTION NAME="Ok" Type="COMPLETE">
   <CAPTION>Ok</CAPTION>
   <HINT>Select this action to complete the task</HINT>
</ACTION>
```

2.31 ACCELERATORs

A number of keyboard accelerators can be defined as shortcuts to the ACTION which contains them.

| <ACCELERATOR> | |
|---|---|
| | KEY="key"<br>MODIFIER="none \| ctrl \| alt \| shift \| ctrl-alt \| ctrl-shift \| alt-shift \| ctrl-alt-shift"> |
| KEY | This defines which key on the keyboard is to be interpreted, in conjunction with any modifier, as a shortcut to the enclosing ACTION. E.g. The common copy to clipboard shortcut is CTRL+C, in this case KEY="C". |
| MODIFIER | This defines a limited set of valid modifier keys including "none". E.g. The common copy to clipboard shortcut is CTRL+C, in this case MODIFIER="ctrl". | e.g.
```
<ACTION NAME="Paste" Type="ACTION">
   <CAPTION>Paste</CAPTION>
   <ACCELERATOR KEY="ins" MODIFIER="shift" />
   <ACCELERATOR KEY="v" MODIFIER="ctrl" />
</ACTION>
```

3. Presentation Model

The presentation model allows considerable flexibility in amount of specificity a writer cares to exercise. At one end of the spectrum an author can control precisely what is to be displayed, at the other end just the interaction style can be specified leaving all other decisions to the renderer based upon the underlying data model.

Root Containers

The different types of root container provide built in semantics to simplify the design task. The Root containers form the start point of correspondence with a DATA-GROUP. The relationship between a Presentation Model element and a Data Model element can be established either through correspondence or explicit matching of NAME. Explicit matching should be used when explicit control over which visual control should be used to render a data element. The elements should appear in equivalent positions in the containment hierarchies.

The following figure illustrates the equivalence in structure between the Presentation Model and a Data Model.

| <DATA-GROUP> | <LAYOUT> |
|---|---|
| <GROUP> | <VERTICAL-AREA> |
| <STRING /> | <COMPONENT /> |
| <NUMBER /> | <COMPONENT /> |
| </GROUP> | </VERTICAL-AREA> |
| <GROUP> | <HORIZONTAL-AREA> |
| <ACTION /> | <BUTTON /> |
| <ACTION /> | <BUTTON /> |
| </GROUP> | </HORIZONTAL-AREA> |
| </DATA-GROUP> | </LAYOUT> |

Given a Root Presentation Container and a <DATA-GROUP>, the renderer must be able to generate a default Presentation Model.

Each <GROUP> in a <DATA-GROUP> is matched to an Area which is explicitly defined or implicitly generated. If there are more <GROUP> at a particular nesting level than there are areas specified, then Areas should be generated and logically inserted after the last Area specified at this nesting level.

Once all <GROUP> have been matched to an Area, individual data elements are similarly matched to a visual control which is explicitly defined or implicitly generated.

3.1 The WIZARD Tag

The wizard layout allows specification of a paged interface that users familiar with a wizard would recognise. The implied navigation behavior through the collection of pages such as Next, Back and Finish is included. A wizard layout is specified using the following tags. It also supports the common meta-data attributes.

| <WIZARD | |
|---|---|
| | NAME="id"<br>TEMPLATE="uri"<br>WINDOW-STYLE="ADDITIONAL \| REPLACEMENT"<br>SIZE="size"> |
| NAME | common usage which is used to uniquely identify the <WIZARD>.<br>This is a required attribute. |
| TEMPLATE | Specifies the URI of a WIZARD which is to be used as a template for this instance. |
| WINDOW-STYLE | Defines whether this wizard is launched into an additional window or whether it is to replace the contents of the current window. |
| | The size in pixels, where size is expressed as a pair of integers *width*, |

| | |
|---|---|
| SIZE | *height*. This is an optional attribute. |

Within the scope of this tag the following tags may optionally be defined:
`<...-AREA>, <TOOLBAR>, <MENUBAR>, <CAPTION>, <HINT>, <TIP>`

Plus any individual visual controls, e.g. `<COMPONENT>, <TEXTFIELD>`.

A simple, though useless, wizard might be:

```
<WIZARD NAME="notVeryInteresting" />

<DATA-GROUP NAME="notVeryInteresting">
   <CAPTION>
      <META-TEXT>A pretty useless wizard</STRING>
      <META-IMAGE SRC="HTTP://.......JPG" />
   </CAPTION>
   <GROUP>
      <CAPTION>Nothing much will happen here.</CAPTION>
      <STRING ENABLED="FALSE">
         <CAPTION>Person's name</CAPTION>
         <VALUE>Roland A. Merrick</VALUE>
      </STRING>
   </GROUP>
</DATA-GROUP>
```

This would be laid out with the same layout policy as that applied by a `<VERTICAL-AREA>`.

The user enters data into the wizard and subsequently presses an available (visible and enabled) action button. The events required merely for navigation (i.e. NEXT and PREVIOUS) through the wizard are handled automatically by the renderer. The following action events are generated from a wizard:

| | |
|---|---|
| COMPLETE | When the user presses the FINISH button (or equivalent depending on the renderer) on the final page.<br>Equivalent to having defined the following ACTION:<br>`<ACTION NAME="Ok" Type="COMPLETE">`<br>`   <CAPTION>Finish</CAPTION>`<br>`</ACTION>` |
| CANCEL | When the user presses the CANCEL button (or equivalent depending on the renderer) on any page of the wizard.<br>Equivalent to having defined the following ACTION:<br>`<ACTION NAME="Cancel" Type="CANCEL">`<br>`   <CAPTION>Cancel</CAPTION>`<br>`</ACTION>` |

3.2 The PROPERTYSHEET Tag

The propertysheet layout allows specification of a paged interface that users familiar with property sheets or tabbed notebooks. The implied behavior of switching directly from sheet to sheet by selecting the appropriate "tab" as well as the provision of OK and Cancel buttons is included. A property sheet is specified using the following tags. It also supports the common meta-data attributes.

| | |
|---|---|
| `<PROPERTYSHEET` | |

| | |
|---|---|
| | NAME="id"<br>TEMPLATE="uri"<br>WINDOW-STYLE="ADDITIONAL \| REPLACEMENT"<br>SIZE="size"<br>PLACEMENT="top \| bottom \| left \| right"> |
| NAME | common usage which is used to uniquely identify the `<PROPERTYSHEET>`. |
| TEMPLATE | Specifies the URI of a PROPERTYSHEET which is to be used as a template for this instance. |
| WINDOW-STYLE | Defines whether this wizard is launched into an additional window or whether it is to replace the contents of the current window. |
| SIZE | The size in pixels, where size is expressed as a pair of integers *width, height*. This is an optional attribute. |

Within the scope of this tag the following tags may optionally be defined:
`<...-AREA>, <TOOLBAR>, <MENUBAR>, <CAPTION>, <HINT>, <TIP>`

Plus any individual visual controls, e.g. `<COMPONENT>, <TEXTFIELD>`.

A simple, though useless, Propertysheet could be built using the `<DATA-GROUP>` defined earlier for the `<WIZARD>`:

`<PROPERTYSHEET NAME="thisonesname" />`

`<DATA-GROUP NAME="thisonesname" TEMPLATE="#notVeryInteresting" />`

The example used above would cause a single page to be built. OK and CANCEL buttons would automatically be constructed.

The user enters data onto the pages in whatever order they wish and subsequently presses an available (visible and enabled) action button. The events required merely for navigation (i.e. Selection of *Tabs* to choose the current page) are handled automatically by the renderer. The following action events are generated from a propertysheet:

COMPLETE    When the user presses the OK button (or equivalent depending on the renderer) on any final page.
    Equivalent to having defined the following ACTION:
```
<ACTION NAME="Ok" Type="COMPLETE">
   <CAPTION>Ok</CAPTION>
</ACTION>
```
CANCEL    When the user presses the CANCEL button (or equivalent depending on the renderer) on any page.
    Equivalent to having defined the following ACTION:
```
<ACTION NAME="Cancel" Type="CANCEL">
   <CAPTION>Cancel</CAPTION>
</ACTION>
```

3.3 The PANEL Tag

The panel allows specification of a single panel on which a interface and its interaction is constructed. A panel is specified using the following tags. It also supports the common meta-data attributes. There is no implied navigation behavior but provision for OK and Cancel buttons is included.

| `<PANEL` | |
|---|---|
| | `NAME="id"`<br>`TEMPLATE="uri"`<br>`WINDOW-STYLE="ADDITIONAL | REPLACEMENT"`<br>`SIZE="size"`<br>`COMPLETE-EVENT="TRUE | FALSE"`<br>`CANCEL-EVENT="TRUE | FALSE">` |
| NAME | common usage which is used to uniquely identify the `<PANEL>`. |
| TEMPLATE | Specifies the URI of a PANEL which is to be used as a template for this instance. |
| WINDOW-STYLE | Defines whether this wizard is launched into an additional window or whether it is to replace the contents of the current window. |
| SIZE | The size in pixels, where size is expressed as a pair of integers *width, height*. This is an optional attribute. |
| COMPLETE-EVENT | Specifies whether an OK button is to be generated. |
| CANCEL-EVENT | Specifies whether a Cancel button is to be generated. |

Within the scope of this tag the following tags may optionally be defined:
`<...-AREA>`, `<TOOLBAR>`, `<MENUBAR>`, `<CAPTION>`, `<HINT>`, `<TIP>`

Plus any individual visual controls, e.g. `<COMPONENT>`, `<TEXTFIELD>`.

COMPLETE     When the user presses the OK button (or equivalent).
                 Equivalent to having defined the following ACTION:
```
<ACTION NAME="Ok" Type="COMPLETE">
    <CAPTION>Ok</CAPTION>
</ACTION>
```
CANCEL       When the user presses the CANCEL button (or equivalent).
                 Equivalent to having defined the following `<ACTION>`:
```
<ACTION NAME="Cancel" Type="CANCEL">
    <CAPTION>Cancel</CAPTION>
</ACTION>
```

A simple, though useless, panel might be:.
```
<PANEL NAME="thisonesname" COMPLETE-EVENT="FALSE" CANCEL-EVENT="FALSE">
    <CAPTION>A pretty useless dialog</CAPTION>
    <LABEL>Something to show besides the title.</LABEL>
</PANEL>
```

```
<DATA-GROUP NAME="thisonesname">
</DATA-GROUP>
```

The example used above would cause a single "*page*" to be built. The user eventually chooses an available (visible and enabled) action from those available.

3.4 Action Containers

There are two common mechanisms GUIs use to surface collections of actions to a user. The first and most common is the menu bar, this is normally an organised collection of all the available actions. Those which are not available at a given point in time are "greyed" out.

While most primary windows have a menu bar not all have a tool bar. A tool bar is normally a set of "convenience" actions made immediately accessible. Actions which are not available at a given point in time may be "greyed" out or removed. This behaviour is determined by the renderer.

3.5 The MENUBAR Tag

Only one is allowed for each *Layout*. It is intended to facilitate the familiar menu bar which appears beneath the title bar on many graphical user interfaces. The menubar is an ordered collection of drop-down menus and cascading menus.

| <MENUBAR | |
|---|---|
| | NAME="id"<br>TEMPLATE="uri"> |
| NAME | common usage which is used to identify the <MENUBAR> and correspond to an <ACTION-GROUP>. |
| TEMPLATE | Specifies the URI of a <MENUBAR> which is to be used as a template for this instance. |

Within the scope of this tag the following tags may optionally be defined:
`<MENU>`

3.6 The MENU Tag

It is intended to facilitate both the drop-down menu and cascading menu.

| <MENU | |
|---|---|
| | NAME="id"<br>TEMPLATE="uri"> |
| NAME | common usage which is used to identify the <MENU> and correspond to an <ACTION-GROUP> or <ACTION-LIST>. |
| TEMPLATE | Specifies the URI of a <MENU> which is to be used as a template for this instance. |

Within the scope of this tag the following tags may optionally be defined:
`<MENU>, <MENUITEM>, <CAPTION>, <HINT>, <TIP>, <SEPARATOR>`

3.7 The MENUITEM Tag

It allows the default presentation attributes associated with an ACTION to be overridden.

| `<MENUITEM` | |
|---|---|
| | `NAME="id"`<br>`TEMPLATE="uri">` |
| NAME | common usage which is used to identify the `<MENUITEM>` and correspond to an `<ACTION>`. |
| TEMPLATE | Specifies the URI of a `<MENU>` which is to be used as a template for this instance. |

Within the scope of this tag the following tags may optionally be defined:
`<CAPTION>, <HINT>, <TIP>`

3.8 The SEPARATOR Tag

It allows allows a horizontal rule to be drawn across a menu.

| `<SEPARATOR` | `>` |
|---|---|

3.9 The TOOLBAR Tag

Only one is allowed for each *Layout*. It is intended to facilitate the familiar tool bar which appears most fequently beneath the menu bar. This represents a subset, sometime complete, of the actions available on the menu bar. Since the purpose is normally to provide quick access to "convenience" actions, only those specifically requested by a matching action name will appear in the toolbar.

| `<TOOLBAR` | |
|---|---|
| | `NAME="id"`<br>`TEMPLATE="uri">` |
| NAME | common usage which is used to identify the `<TOOLBAR>` and correspond to an `<ACTION-GROUP>`. |
| TEMPLATE | Specifies the URI of a `<TOOLBAR>` which is to be used as a template for this instance. |

Within the scope of this tag the following tags may optionally be defined:
`<MENU>` e.g.
```
<TOOLBAR NAME="validActions">
    <MENU NAME="FileMenu">
        <MENUITEM NAME="FileNew"/>
```

```
    <MENUITEM NAME="FileOpen"/>
    <MENUITEM NAME="FileSave"/>
  </MENU>
  <MENU NAME="EditMenu">
    <MENUITEM NAME="ClipboardCut" />
    <MENUITEM NAME="ClipboardCopy" />
    <MENUITEM NAME="ClipboardPaste" />
  </MENU>
</TOOLBAR>
```

This would generate a Tool bar with 6 buttons in two groups of three.

3.10 Areas

In a similar manner to how a number of predefined layouts are defined which imply certain styles of user interaction, there are a collection of area constructs defined which have built in layout policies for their child user interface elements.

3.11 The VERTICAL-AREA Tag

A VERTICAL-AREA is a rectangular area which lays out its contents in a vertical arrangement. A VERTICAL-AREA is specified using the following tags. It also supports the common meta-data attributes. This is the default area when none is specified in a layout.

| <VERTICAL-AREA | |
|---|---|
| | NAME="id"<br>TEMPLATE="uri"<br>CAPTION-POSITION="TOP \| BOTTOM \| _LEFT_ \| RIGHT"<br>CAPTION-ALIGN="_LEFT_ \| RIGHT \| CENTER"<br>SIZE="size"<br>POSITION="position"<br>BORDER="TRUE \| FALSE"<br>ACTIVATION="ActivationBinding"<br>SCROLL="TRUE \| FALSE"<br>DATE-FORMAT="_DEFAULT_ \| FULL \| LONG \| MEDIUM \| SHORT"<br>TIME-FORMAT="_DEFAULT_ \| FULL \| LONG \| MEDIUM \| SHORT"> |
| NAME | common usage which is used to uniquely identify the area. |
| TEMPLATE | Specifies the URI of an area which is to be used as a template for this instance. |
| CAPTION-POSITION | Defines where a CAPTION is positioned relative to its value. |
| CAPTION-ALIGN | Defines how a CAPTION is aligned relative to its value. |
| SIZE | The size in pixels, where size is expressed as a pair of integers *width*, *height*. This is optional. |

| | |
|---|---|
| POSITION | Anchor point of the top left of the area, measured in pixels, relative to its parent container. Position is expressed as a pair of integers *x-coordinate, y-coordinate*. This is only relevant when the parent container is a DEFINITE-AREA. |
| BORDER | Defines whether a border should be drawn around the area. |
| ACTIVATION | Allow the specification of a string to facilitate binding the activation of this AREA to the task logic. |
| SCROLL | If the items do not fit into the area and the SCROLL-BAR attribute value is "TRUE"; a vertical scroll bar will be displayed on the right hand side of the area to allow scrolling of the contents of the area. |
| DATE-FORMAT | The <DATE> type holds dates in the format YYYYMMDD. The *locale* should be inspected by the renderer to determine the basic ordering of the day, month and year elements, e.g. DMY or MDY plus the separator e.g. -, :, /. <br><br> Dates can also have a number of representations beyond simple ordering, e.g. Friday 23 July 1999 or 23 Jul 99. DATE-FORMAT allows a choice to be made from the four styles of date supported by *locale*. |
| TIME-FORMAT | The <TIME> type holds dates in the format HHMMSS. This attribute allows a choice to be made from the four styles of time supported by *locale*. |

Within the scope of this tag the following tags may optionally be defined:
<...-AREA>, <CAPTION>, <HINT>, <TIP>

Plus any individual visual controls, e.g. <COMPONENT>, <TEXTFIELD>.

3.12 The HORIZONTAL-AREA Tag

A HORIZONTAL-AREA is a rectangular area which lays out its contents in a horizontal arrangement. It is specified using the following tags. It also supports the common meta-data attributes.

| | |
|---|---|
| <HORIZONTAL-AREA | NAME="id"<br>TEMPLATE="uri"<br>CAPTION-POSITION="TOP \| BOTTOM \| <u>LEFT</u> \| RIGHT"<br>CAPTION-ALIGN="<u>LEFT</u> \| RIGHT \| CENTER"<br>SIZE="size"<br>POSITION="position"<br>BORDER="TRUE \| FALSE"<br>ACTIVATION="ActivationBinding"<br>SCROLL="TRUE \| <u>FALSE</u>"<br>DATE-FORMAT="<u>DEFAULT</u> \| FULL \| LONG \| MEDIUM \| SHORT"<br>TIME-FORMAT="<u>DEFAULT</u> \| FULL \| LONG \| MEDIUM \| SHORT"> |

| | |
|---|---|
| NAME | common usage which is used to uniquely identify the area. |
| TEMPLATE | Specifies the URI of an area which is to be used as a template for this instance. |
| CAPTION-POSITION | Defines where a CAPTION is positioned relative to its value. |
| CAPTION-ALIGN | Defines how a CAPTION is aligned relative to its value. |
| SIZE | The size in pixels, where size is expressed as a pair of integers *width, height*. This is optional. |
| POSITION | Anchor point of the top left of the area, measured in pixels, relative to its parent container. Position is expressed as a pair of integers *x-coordinate, y-coordinate*. This is only relevant when the parent container is a DEFINITE-AREA. |
| BORDER | Defines whether a border should be drawn around the area. |
| ACTIVATION | Allow the specification of a string to facilitate binding the activation of this AREA to the task logic. |
| SCROLL | If the items do not fit into the area and the SCROLL-BAR attribute value is "TRUE"; a horizontal scroll bar will be displayed at the bottom of the area to allow scrolling of the contents of the area. |
| DATE-FORMAT | DATE-FORMAT allows a choice to be made from the four styles of date supported by *locale*. |
| TIME-FORMAT | The <TIME> type holds dates in the format HHMMSS. This attribute allows a choice to be made from the four styles of time supported by *locale*. |

Within the scope of this tag the following tags may optionally be defined:
<...-AREA>, <CAPTION>, <HINT>, <TIP>

Plus any individual visual controls, e.g. <COMPONENT>, <TEXTFIELD>.

3.13 The DEFINITE-AREA Tag

A DEFINITE-AREA is a rectangular area in which all its contents must be explicitly positioned. A DEFINITE-AREA is specified using the following tags. It also supports the common meta-data attributes.

| | |
|---|---|
| <DEFINITE- | |

| AREA | NAME="id"<br>TEMPLATE="uri"<br>SIZE="size"<br>POSITION="position"<br>BORDER="TRUE \| FALSE"<br>ACTIVATION="ActivationBinding"<br>SCROLL="TRUE \| FALSE"<br>DATE-FORMAT="<u>DEFAULT</u> \| FULL \| LONG \| MEDIUM \| SHORT"<br>TIME-FORMAT="<u>DEFAULT</u> \| FULL \| LONG \| MEDIUM \| SHORT"> |
|---|---|
| NAME | common usage which is used to uniquely identify the area. |
| TEMPLATE | Specifies the URI of an area which is to be used as a template for this instance. |
| SIZE | The size in pixels, where size is expressed as a pair of integers *width, height*. This is optional. |
| POSITION | Anchor point of the top left of the area, measured in pixels, relative to its parent container. Position is expressed as a pair of integers *x-coordinate, y-coordinate*. This is optional. |
| BORDER | Defines whether a border should be drawn around the area. |
| ACTIVATION | Allow the specification of a string to facilitate binding the activation of this AREA to the task logic. |
| SCROLL | If the size of the definite-area is larger that the space reserved for it, and the SCROLL-BAR attribute value is "TRUE"; the vertical and/or horizontal scroll bars will be displayed as appropriate. |
| DATE-FORMAT | DATE-FORMAT allows a choice to be made from the four styles of date supported by *locale*. |
| TIME-FORMAT | The <TIME> type holds dates in the format HHMMSS. This attribute allows a choice to be made from the four styles of time supported by *locale*. |

Within the scope of this tag the following tags may optionally be defined:
<...-AREA>, <CAPTION>, <HINT>, <TIP>

Plus any individual visual controls, e.g. <COMPONENT>, <TEXTFIELD>.

All elements which have a POSITION attribute must have a position specified when defined in a DEFINITE-AREA, i.e. ...-AREAs and individual visual controls.

e.g.

```
...
<DEFINITE-AREA NAME="PersonName" SIZE="100,100" POSITION="0,0">
  <CAPTION>Person's complete name</CAPTION>
  <LABEL POSITION="10,20"><CAPTION>Title:</CAPTION></LABEL>
```

```
    <TEXTFIELD NAME="Title" POSITION="120,20" />
    <LABEL POSITION="10,40"><CAPTION>First name:</CAPTION></LABEL>
    <TEXTFIELD NAME="LastName" POSITION="120,40" />
    <LABEL POSITION="10,60"><CAPTION>Initial:</CAPTION></LABEL>
    <TEXTFIELD NAME="Initial" POSITION="120,60" />
    <LABEL POSITION="10,80"><CAPTION>Last name:</CAPTION></LABEL>
    <TEXTFIELD NAME="LastName" POSITION="120,80" />
    <BUTTON NAME="X" POSITION="10,120" />
  </DEFINITE-AREA>
  ...

<DATA-GROUP>
  ...
  <GROUP NAME="PersonName">
    <STRING NAME="Title">Mr.</STRING>
    <STRING NAME="FirstName">Roland</STRING>
    <STRING NAME="Initial">A.</STRING>
    <STRING NAME="LastName">Merrick</STRING>
    <ACTION NAME="Refresh" Type="USER-ACTION">
       <CAPTION>Refresh</CAPTION>
    </ACTION>
  </GROUP>
  ...
<DATA-GROUP>
```

3.14 The SPLIT-AREA Tag

This tag defines a rectangular area containing sub-areas separated by a graphical divider. Each sub-area consists of an Area which corresponds to a group in the data model. Size is an optional attribute which can alternatively be determined by the combined sizes of its two constituent areas.

| `<SPLIT-AREA` | `NAME="id"`<br>`TEMPLATE="uri"`<br>`SIZE="size"`<br>`POSITION="position"`<br>`ORIENTATION="horizontal | vertical">` |
|---|---|
| NAME | common usage which is used to uniquely identify the area. |
| TEMPLATE | Specifies the URI of an area which is to be used as a template for this instance. |
| SIZE | The size in pixels, where size is expressed as a pair of integers *width*, *height*. This is optional. |
| POSITION | Anchor point of the top left of the area, measured in pixels, relative to its parent container. Position is expressed as a pair of integers *x-coordinate*, *y-coordinate*. This is only relevant when the parent container is a DEFINITE-AREA. |
|  | Preferred orientation. The orientation of the two AREAs may be |

| ORIENTATION | controlled via the orientation attribute. |

Within the scope of this tag the following tags may optionally be defined:
`<...-AREA>, <CAPTION>, <HINT>, <TIP>` e.g.
```
...
   <SPLIT-AREA NAME="these2Details" ORIENTATION="horizontal">
     <CAPTION>A title for the split area</CAPTION>
     <HORIZONTAL-AREA NAME="1stHalf" />
     <VERTICAL-AREA NAME="2ndHalf" />
   </SPLIT-AREA>
...

<DATA-GROUP>
...
   <GROUP NAME="these2Details">
      <GROUP NAME="1stHalf" TEMPLATE="PersonHomeDetails" />
      <GROUP NAME="2ndHalf" TEMPLATE="PersonWorkDetails" />
   </GROUP>
...
<DATA-GROUP>
```

3.15 The DECK-AREA Tag

This tag defines a rectangular area containing a series of sub-areas which are displayed one at a time. Each sub-area consists of an Area which corresponds to a group in the data model. This provides a stack or "deck" of areas. Size is an optional attribute which can alternatively be determined from the largest of its constituent areas.

| `<DECK-AREA` | |
|---|---|
| | `NAME="id"`<br>`TEMPLATE="uri"`<br>`SIZE="size"`<br>`POSITION="position"`<br>`TOP="top-item-name">` |
| NAME | common usage which is used to uniquely identify the area. |
| TEMPLATE | Specifies the URI of an area which is to be used as a template for this instance. |
| SIZE | The size in pixels, where size is expressed as a pair of integers *width, height*. This is optional. |
| POSITION | Anchor point of the top left of the area, measured in pixels, relative to its parent container. Position is expressed as a pair of integers *x-coordinate, y-coordinate*. This is only relevant when the parent container is a DEFINITE-AREA. |
| TOP | This is the name of the data-item which is presently on the top of the stack. |

Within the scope of this tag the following tags may optionally be defined:
`<...-AREA>, <CAPTION>, <HINT>, <TIP>` e.g.
```
...
   <DECK-AREA NAME="theseDetails">
      <CAPTION>A title for the deck area as a whole</CAPTION>
      <HORIZONTAL-AREA NAME="1stHalf" />
      <VERTICAL-AREA NAME="2ndHalf" />
      <HORIZONTAL-AREA NAME="3rdHalf">
   </DECK-AREA>
...

<DATA-GROUP>
   ...
   <GROUP NAME="theseDetails">
      <GROUP NAME="1stHalf" TEMPLATE="PersonHomeDetails" />
      <GROUP NAME="2ndHalf" TEMPLATE="PersonWorkDetails" />
      <GROUP NAME="3rdHalf" TEMPLATE="PersonMobileDetails" />
   </GROUP>
   ...
<DATA-GROUP>
```

3.16 The TABBED-AREA Tag

This tag defines a rectangular area containing a series of sub-areas which are displayed one at a time and navigation between the different pages is "afforded" by "tabs". Each sub-area consists of an Area which corresponds to a group in the data model. This is very similar to the `<PROPERTYSHEET>`. Size is an optional attribute which can alternatively be determined from the largest of its constituent areas.

| `<TABBED-AREA` | NAME="id"<br>TEMPLATE="uri"<br>SIZE="size"<br>POSITION="position"<br>PLACEMENT="top \| bottom \| left \| right"<br>TOP="top-name"> |
|---|---|
| NAME | common usage which is used to uniquely identify the area. |
| TEMPLATE | Specifies the URI of an area which is to be used as a template for this instance. |
| SIZE | The size in pixels, where size is expressed as a pair of integers *width*, *height*. This is optional. |
| POSITION | Anchor point of the top left of the area, measured in pixels, relative to its parent container. Position is expressed as a pair of integers *x-coordinate, y-coordinate*. This is only relevant when the parent container is a `DEFINITE-AREA`. |
| | Determines the position of tabs. |

| PLACEMENT | |
|---|---|
| TOP | This is the name of the data-item which is presently on the top of the stack. |

Within the scope of this tag the following tags may optionally be defined:
`<...-AREA>, <CAPTION>, <HINT>, <TIP>` e.g.
```
   ...
   <TABBED-AREA NAME="theseDetails" PLACEMENT="right">
     <CAPTION>A title for the deck area as a whole</CAPTION>
     <HORIZONTAL-AREA NAME="1stHalf" />
     <VERTICAL-AREA NAME="2ndHalf" />
     <HORIZONTAL-AREA NAME="3rdHalf">
   </TABBED-AREA>
   ...

<DATA-GROUP>
   ...
   <GROUP NAME="theseDetails">
     <GROUP NAME="1stHalf" TEMPLATE="PersonHomeDetails" />
     <GROUP NAME="2ndHalf" TEMPLATE="PersonWorkDetails" />
     <GROUP NAME="3rdHalf" TEMPLATE="PersonMobileDetails" />
   </GROUP>
   ...
<DATA-GROUP>
```

This example implies three tabs. In this example the value to be displayed on each tab will be obtained from the `<CAPTION>` of each `<GROUP>`.

3.17 The CHOICE-AREA Tag

A CHOICE-AREA is intended for use with a CHOICE data item. It allows the nature of the control which would by default be assigned to be overridden.

| `<CHOICE-AREA` | |
|---|---|
| | NAME="id"<br>TEMPLATE="uri<br>CAPTION-POSITION="TOP \| BOTTOM \| <u>LEFT</u> \| RIGHT"<br>CAPTION-ALIGN="<u>LEFT</u> \| RIGHT \| CENTER"<br>SIZE="size"<br>POSITION="position"<br>ACTIVATION="ActivationBinding"<br>DATE-FORMAT="<u>DEFAULT</u> \| FULL \| LONG \| MEDIUM \| SHORT"<br>TIME-FORMAT="<u>DEFAULT</u> \| FULL \| LONG \| MEDIUM \| SHORT"> |
| NAME | common usage which is used to uniquely identify the area and coresspond to a data item. |
| TEMPLATE | Specifies the URI of an area which is to be used as a template for this instance. |

| | |
|---|---|
| CAPTION-POSITION | Defines where a CAPTION is positioned relative to its value. |
| CAPTION-ALIGN | Defines how a CAPTION is aligned relative to its value. |
| SIZE | The size in pixels, where size is expressed as a pair of integers *width, height*. This is optional. |
| POSITION | Anchor point of the top left of the area, measured in pixels, relative to its parent container. Position is expressed as a pair of integers *x-coordinate, y-coordinate*. This is only relevant when the parent container is a DEFINITE-AREA. |
| ACTIVATION | Allow the specification of a string to facilitate binding the activation of this AREA to the task logic. |
| DATE-FORMAT | DATE-FORMAT allows a choice to be made from the four styles of date supported by *locale*. |
| TIME-FORMAT | The <TIME> type holds dates in the format HHMMSS. This attribute allows a choice to be made from the four styles of time supported by *locale*. |

Within the scope of this tag, one of each of the following tags may optionally be defined:
`<CAPTION>, <HINT>, <TIP>`

Plus, optionally, one of the following
`<LIST>, <COMBOBOX>, <CHECKBOX>, <RADIOBUTTON>`

3.18 The TABLE-AREA Tag

This tag is intended for use with a TABLE data item. It allows the default presentation attributes to be overridden.

| | |
|---|---|
| <TABLE-AREA | NAME="id"<br>TEMPLATE="uri"<br>CAPTION-ALIGN="LEFT \| RIGHT \| CENTER"<br>DATA-ALIGN="LEFT \| RIGHT \| CENTER"<br>SIZE="size"<br>POSITION="position"<br>ACTIVATION="ActivationBinding"> |
| NAME | common usage which is used to uniquely identify the area and correspond to a data item. |
| TEMPLATE | Specifies the URI of an area which is to be used as a template for this instance. |

| | |
|---|---|
| DATA-ALIGN | Defines how the data values in a row are aligned relative to the cell in which they are rendered. |
| CAPTION-ALIGN | Defines how a CAPTION is aligned relative to the heading cell in which it is rendered. |
| SIZE | The size in pixels, where size is expressed as a pair of integers *width, height*. This is optional. |
| POSITION | Anchor point of the top left of the area, measured in pixels, relative to its parent container. Position is expressed as a pair of integers *x-coordinate, y-coordinate*.<br>This is only relevant when the parent container is a DEFINITE-AREA. |
| ACTIVATION | Allow the specification of a string to facilitate binding the activation of this AREA to the task logic. |

Within the scope of this tag, one of each of the following tags may optionally be defined:
<CAPTION>, <HINT>, <TIP>, <HEADING>

The default values for alignment are dependent on the data type which is associated with the column.

| Data type | Default alignment |
|---|---|
| STRING | LEFT |
| NUMBER | RIGHT |
| DATE | RIGHT |
| TIME | RIGHT |
| IMAGE | LEFT |
| AUDIO | LEFT |
| BOOLEAN | LEFT |
| UDT | LEFT |

If only one of the alignment attributes is specified, the other is assumed to have the same value.

3.19 The HEADING Tag

This tag is intended to allow the default presentation attributes to be overridden.

| <HEADING | > |
|---|---|

Within the scope of this tag the following tags may optionally be defined:
<COLUMN>

3.20 The COLUMN Tag

This tag is intended for use within a TABLE-AREA to allow the default presentation attributes to be overridden.

| <COLUMN | CAPTION-ALIGN="LEFT \| RIGHT \| CENTER"<br><br>DATA-ALIGN="LEFT \| RIGHT \| CENTER"<br>SIZE="size"<br>RENDER-BINDING="binding"<br>EDITOR-BINDING="binding"<br>DATE-FORMAT="DEFAULT \| FULL \| LONG \| MEDIUM \| SHORT"<br>TIME-FORMAT="DEFAULT \| FULL \| LONG \| MEDIUM \| SHORT"> |
|---|---|
| CAPTION-ALIGN | Defines how a CAPTION is aligned relative to the heading cell in which it is rendered. |
| DATA-ALIGN | Defines how the data values in a row are aligned relative to the cell in which they are rendered. |
| SIZE | The size in pixels, where size is expressed as an of integer *width*. This is optional. |
| RENDER-BINDING | Allow the specification of a string to facilitate binding of this component to task logic that will control the presentation. |
| EDITOR-BINDING | Allow the specification of a string to facilitate binding of this component to task logic that will control the presentation when the data is selected for modification. |
| DATE-FORMAT | DATE-FORMAT allows a choice to be made from the four styles of date supported by *locale*. |
| TIME-FORMAT | The <TIME> type holds dates in the format HHMMSS. This attribute allows a choice to be made from the four styles of time supported by *locale*. |

Within the scope of this tag the following tags may optionally be defined:
<CAPTION>, <HINT>, <TIP> e.g.
```
<TABLE-AREA NAME="tableName">
   <HEADING>
      <COLUMN DATA-ALIGN="LEFT" CAPTION-ALIGN="CENTER">
         <CAPTION>Full name</CAPTION> <!-- overrides Caption from data item -->
      </COLUMN>
      <COLUMN SIZE="60">
         <CAPTION>Column 2</CAPTION>
      </COLUMN>
   </HEADING>
</TABLE-AREA>

<TABLE NAME="tableName">
```

```
<ROW>
   <STRING>
      <CAPTION>Name</CAPTION>
      <VALUE>Roland A. Merrick</VALUE>
   </STRING>
   <NUMBER>
      <CAPTION>Serial No</CAPTION>
      <VALUE>099352</VALUE>
   </NUMBER>
</ROW>
   ...
</TABLE>
```

3.21 The TREE-AREA Tag

This tag is intended for use with a TREE data item. It allows the default presentation attributes to be overridden.

| <TREE-AREA | NAME="id"<br>TEMPLATE="uri"<br>SIZE="size"<br>POSITION="position"<br>ACTIVATION="ActivationBinding"<br>RENDER-BINDING="binding"<br>EDITOR-BINDING="binding"> |
|---|---|
| NAME | common usage which is used to uniquely identify the area and correspond to a data item. |
| TEMPLATE | Specifies the URI of an area which is to be used as a template for this instance. |
| SIZE | The size in pixels, where size is expressed as a pair of integers *width, height*. This is optional. |
| POSITION | Anchor point of the top left of the area, measured in pixels, relative to its parent container. Position is expressed as a pair of integers *x-coordinate, y-coordinate*.<br>This is only relevant when the parent container is a DEFINITE-AREA. |
| ACTIVATION | Allow the specification of a string to facilitate binding the activation of this AREA to the task logic. |
| RENDER-BINDING | Allow the specification of a string to facilitate binding of this component to task logic that will control the presentation. |
| EDITOR-BINDING | Allow the specification of a string to facilitate binding of this component to task logic that will control the presentation when the data is selected for modification. |

Within the scope of this tag the following tags may optionally be defined:
`<CAPTION>, <HINT>, <TIP>` e.g.
```
<TREE-AREA NAME="exampleAUIMLtree" />
```

3.22 The GRID-AREA Tag

This tag allows the children of a GROUP to be arranged in a grid pattern. Each child of a group is assigned to cells in the order they appear in the GROUP. Cells are filled starting at the top left and moving across a row and then progressing through subsequent rows. Data items occupy two cells, one for the caption and a second for the value. The caption-position determines the relationship between the cells allocated. If the caption position is left or right then two horizontally adjacent cells are used, If the caption position is top or bottom then two vertically adjacent cells are used.

| `<GRID-AREA` | |
|---|---|
| | `NAME="id"`<br>`TEMPLATE="uri"`<br>`CAPTION-POSITION="TOP | BOTTOM | LEFT | RIGHT"`<br>`CAPTION-ALIGN="LEFT | RIGHT | CENTER"`<br>`SIZE="size"`<br>`POSITION="position"`<br>`BORDER="TRUE | FALSE"`<br>`ACTIVATION="ActivationBinding"`<br>`SCROLL="TRUE | FALSE"`<br>`INSETS="insets"`<br>`SPACING="spacing">` |
| `INSETS` | The margins around the area (top, left, bottom, right). |
| `SPACING` | The default gap between components (rowSpacing, colSpacing). |

Within the scope of this tag the following tags may optionally be defined:
`<CAPTION>, <HINT>, <TIP>, <GRIDROW>, <GRIDCOLUMN>, <GRIDCELL>`

3.23 The GRIDROW Tag

| `<GRIDROW` | |
|---|---|
| | `INDEX="index"`<br>`SPACING="spacing"`<br>`EXPANDABLE="TRUE | FALSE">` |
| `INDEX` | The index of the row. |
| `SPACING` | The width in pixels between this row and the next. |
| `EXPANDABLE` | Determines whether the row will be allocated extra space. |

3.24 The GRIDCOLUMN Tag

| `<GRIDCOLUMN` | |
| --- | --- |
| | `INDEX="index"`<br>`SPACING="spacing"`<br>`EXPANDABLE="TRUE | FALSE">` |
| INDEX | The index of the column. |
| SPACING | The width in pixels between this column and the next. |
| EXPANDABLE | Determines whether the column will be allocated extra space. |

3.25 The GRIDCELL Tag

A GRIDCELL can be defined as a child of visual components and areas. It is only relevant when the parent container is a GRID-AREA.

| `<GRIDCELL` | |
| --- | --- |
| | `LOCATION="location"`<br>`SPAN="span"`<br>`ANCHOR="N | S | E | W | NE | NW | SE | SW | CENTER"`<br>`FILL="NONE | HORIZONTAL | VERTICAL | BOTH"`<br>`INSETS="insets">` |
| LOCATION | The placement in the grid (rowIndex,colIndex). |
| SPAN | The number of rows and columns spanned (rows,cols). |
| ANCHOR | Where to place the component in the cell. |
| FILL | How the component fills the extra space in the cell. |
| INSETS | The margins around the component (top,left,bottom,right). |

Within the scope of this tag the following tags may optionally be defined:
`<...-AREA>, <controls>`

3.26 Visual Controls

Any number of user interface components may also be specified within the scope of the various AREA tags. These tags are documented in the following section. The NAME assigned to each component must be unique within the scope of a given layout definition.

3.27 The COMPONENT Tag

The COMPONENT tag is intended to allow the ordering of items rendered but leaving the decision as to which control to use to the renderer.

| <COMPONENT | |
|---|---|
| | NAME="id"<br>SIZE="size"<br>POSITION="position"<br>MANAGER="managerbinding"<br>DATE-FORMAT="DEFAULT \| FULL \| LONG \| MEDIUM \| SHORT"<br>TIME-FORMAT="DEFAULT \| FULL \| LONG \| MEDIUM \| SHORT"> |
| NAME | common usage which is used for unique identification.<br>This attribute is optional. |
| SIZE | The size in pixels, where size is expressed as a pair of integers *width, height*. This attribute is optional. |
| POSITION | The location of the label in pixel units, where position is expressed as a pair of integers *x-coordinate, y-coordinate*. The origin is the top left corner of the parent container. This attribute is optional. |
| MANAGER | Allow the specification of a string to facilitate binding to a piece of code which implements a component. |
| DATE-FORMAT | DATE-FORMAT allows a choice to be made from the four styles of date supported by *locale*. |
| TIME-FORMAT | The <TIME> type holds dates in the format HHMMSS. This attribute allows a choice to be made from the four styles of time supported by *locale*. |

Within the scope of this tag the following tags may optionally be defined:
<CAPTION>, <HINT>, <TIP>

3.28 The LABEL Tag

The LABEL tag creates a static text component of the specified size and location on its parent AREA.

| <LABEL | |
|---|---|
| | NAME="id"<br>SIZE="size"<br>SOURCE="VALUE \| CAPTION"<br>POSITION="position"> |
| NAME | common usage which is used for unique identification.<br>This attribute is optional. |
| SIZE | The size in pixels, where size is expressed as a pair of integers *width, height*. This attribute is optional. |
| | The location of the label in pixel units, where position is expressed as |

| POSITION | a pair of integers *x-coordinate, y-coordinate*. The origin is the top left corner of the parent container. This attribute is optional. |

Within the scope of this tag the following tags may optionally be defined:
`<HINT>, <TIP>`

3.29 The BUTTON Tag

The BUTTON tag creates a pushbutton of the specified size and location on its parent AREA.

| `<BUTTON` | `NAME="id"`<br>`SIZE="size"`<br>`POSITION="position"`<br>`IMAGE-HPOSITION="LEFT | CENTER | RIGHT"`<br>`IMAGE-VPOSITION="TOP | CENTER | BOTTOM">` |
|---|---|
| NAME | common usage which is used for unique identification. This attribute is optional. |
| SIZE | The size in pixels, where size is expressed as a pair of integers *width, height*. This attribute is optional, if none is supplied the original size from the image source will be used. If supplied the image will be scaled to the specified size. |
| POSITION | The location of the label in pixel units, where position is expressed as a pair of integers *x-coordinate, y-coordinate*. The origin is the top left corner of the parent container. This attribute is optional. |

Within the scope of this tag the following tags may optionally be defined:
`<CAPTION>, <HINT>, <TIP>`

The following example illustrates how the `<CAPTION>` to be used on the button is overridden rather than use the one supplied with the `<ACTION>`.

```
...
<BUTTON NAME="ok" POSITION="5,80">
  <CAPTION>Okay</CAPTION>
</BUTTON>
...
<DATA-GROUP>
...
<ACTION NAME="ok" Type="COMPLETE">
  <CAPTION>
  <META-TEXT>Ok</META-TEXT>
  <META-IMAGE SRC="HTTP://......GIF" />
  </CAPTION>
</ACTION>
...
</DATA-GROUP>
```

3.30 The TEXTFIELD Tag

This tag creates an editable text entry field of the specified size and location on its parent AREA.

| `<TEXTFIELD` | |
| --- | --- |
| | NAME="id"<br>SIZE="size"<br>POSITION="position"> |
| NAME | common usage which is used for unique identification.<br>This attribute is optional. |
| SIZE | The size in pixels, where size is expressed as a pair of integers *width, height*. This attribute is optional. |
| POSITION | The location in pixel units, where position is expressed as a pair of integers *x-coordinate, y-coordinate*. The origin is the top left corner of the parent container. This attribute is optional. |

Within the scope of this tag the following tags may optionally be defined:
`<CAPTION>, <HINT>, <TIP>` e.g.
`<TEXTFIELD NAME="PFN" POSITION="5,80" />`

`<STRING NAME="PFN" TEMPLATE="#PersonFirstName" />`

3.31 The TEXTBOX Tag

This tag creates an editable multi-line entry field of the specified size and location on its parent AREA.

| `<TEXTBOX` | |
| --- | --- |
| | NAME="id"<br>SIZE="size"<br>POSITION="position"> |
| NAME | common usage which is used for unique identification.<br>This attribute is optional. |
| SIZE | The size in pixels, where size is expressed as a pair of integers *width, height*. This attribute is required. |
| POSITION | The location in pixel units, where position is expressed as a pair of integers *x-coordinate, y-coordinate*. The origin is the top left corner of the parent container. This attribute is optional. |

Within the scope of this tag the following tags may optionally be defined:
`<CAPTION>, <HINT>, <TIP>` e.g.
`<TEXTBOX NAME="PH" SIZE="100,400" />`

`<STRING NAME="PH" TEMPLATE="#PersonHobbies" />`

3.32 The IMG Tag

This tag creates an image on a display, the source is an IMAGE data type. This tag provides scaling and positioning.

| <IMG | NAME="id"<br>SIZE="size"<br>POSITION="position"> |
|---|---|
| NAME | common usage which is used for unique identification and correspondence with the source IMAGE data type. |
| SIZE | The size in pixels, where size is expressed as a pair of integers *width, height*. This attribute is optional, if not specified the intrinsic size of the data item will be used.required. If specified the image will be scaled appropriately. |
| POSITION | The location in pixel units, where position is expressed as a pair of integers *x-coordinate, y-coordinate*. The origin is the top left corner of the parent container.<br>This attribute is optional. |

Within the scope of this tag the following tags may optionally be defined:
<CAPTION>, <HINT>, <TIP>

3.33 The SLIDER Tag

This tag creates an adjustable slider control of the specified size and location on its parent AREA. The slider may be oriented horizontally or vertically.

| <SLIDER | NAME="id"<br>SIZE="size"<br>POSITION="position"<br>ORIENTATION="horizontal \| vertical"<br>MAJORTICKS="major"<br>MINORTICKS="minor"<br>ADJUST="adjustbinding"> |
|---|---|
| NAME | common usage which is used for unique identification.<br>This attribute is optional. |
| SIZE | The size in pixels, where size is expressed as a pair of integers *width, height*. This attribute is optional. |
| POSITION | The location in pixel units, where position is expressed as a pair of integers *x-coordinate, y-coordinate*. The origin is the top left corner of the parent container. This attribute is optional. |
| ORIENTATION | Preferred orientation. |
| MIN | A numeric constant which defines the lower bound of the slider. This attribute is required. |

| | |
|---|---|
| MAX | A numeric constant which defines the upper bound of the slider. This attribute is required. |
| MAJORTICKS | The interval at which labelled major ticks should be displayed, in slider units. This tag is optional; if omitted, no tick marks will be shown. Labels are in numeric slider units; custom labels are not supported. If this tag is present, snap-to-ticks is automatically set on. |
| MINORTICKS | The interval at which unlabelled minor ticks should be displayed, in slider units. This tag is optional, but is required if MAJORTICKS is specified. |
| ADJUST | Allow the specification of a string to facilitate binding to some task logic. |

Within the scope of this tag the following tags may optionally be defined:
`<CAPTION>, <HINT>, <TIP>` e.g.
`<SLIDER POSITION="5,80" MINVALUE="10" MAXVALUE="200" />`

3.34 The SPINNER Tag

This tag creates an adjustable spin button control of the specified size and location on its parent AREA.

| | |
|---|---|
| `<SPINNER` | `NAME="id"`<br>`SIZE="size"`<br>`POSITION="position"`<br>`ORIENTATION="horizontal | vertical"`<br>`WRAP="TRUE | FALSE"`<br>`INCREMENT="number">` |
| NAME | common usage which is used for unique identification.<br>This attribute is optional. |
| SIZE | The size in pixels, where size is expressed as a pair of integers *width*, *height*. This attribute is optional. |
| POSITION | The location in pixel units, where position is expressed as a pair of integers *x-coordinate*, *y-coordinate*. The origin is the top left corner of the parent container. This attribute is optional. |
| ORIENTATION | Preferred orientation. |
| WRAP | Counter wraps when it reaches its limit. |
| INCREMENT | Integer value to increment SPINNER value. |

Within the scope of this tag the following tags may optionally be defined:
`<CAPTION>, <HINT>, <TIP>` e.g.
`<SPINNER NAME="range" POSITION="5,80" WRAP="FALSE" />`

3.35 The PROGRESSBAR Tag

This tag creates a progress indicator of the specified size and location on its parent AREA.

| `<PROGRESSBAR` | `NAME="id"`<br>`SIZE="size"`<br>`POSITION="position"`<br>`MIN="minvalue"`<br>`MAX="maxvalue">` |
|---|---|
| NAME | common usage which is used for unique identification.<br>This attribute is optional. |
| SIZE | The size in pixels, where size is expressed as a pair of integers *width, height*. This attribute is optional. |
| POSITION | The location in pixel units, where position is expressed as a pair of integers *x-coordinate, y-coordinate*. The origin is the top left corner of the parent container. This attribute is optional. |
| MIN | A numeric constant which defines the lower bound of the progress bar. This attribute is required. |
| MAX | A numeric constant which defines the upper bound of the progress bar. This attribute is required. |

Within the scope of this tag the following tags may optionally be defined:
`<CAPTION>, <HINT>, <TIP>` e.g.
`<PROGRESSBAR POSITION="5,80" MINVALUE="10" MAXVALUE="200" />`

3.36 The RADIOBUTTON Tag

This tag creates a radio button of the specified size and location on its parent AREA.

| `<RADIOBUTTON` | `NAME="id"`<br>`SIZE="size"`<br>`POSITION="position">` |
|---|---|
| NAME | common usage which is used for unique identification.<br>This attribute is optional. |
| SIZE | The size in pixels, where size is expressed as a pair of integers *width, height*. This attribute is optional. |

| POSITION | The location in pixel units, where position is expressed as a pair of integers *x-coordinate, y-coordinate*. The origin is the top left corner of the parent container. This attribute is optional. |
|---|---|

Within the scope of this tag the following tags may optionally be defined:
<CAPTION>, <HINT>, <TIP> e.g.

```
...
   <RADIOBUTTON Position="10,10" NAME="MR" />
...

<CHOICE NAME="PersonTitles" Selection-Policy="SINGLE">
   <CAPTION>A set of Person titles</CAPTION>
   <HINT>This is a set of valid titles for a person.</HINT>
   <STRING NAME="Mr">
      <VALUE>Mr.</VALUE>
   </STRING>
   <STRING NAME="MRS">
      <VALUE>Mrs.</VALUE>
   </STRING>
   <STRING NAME="MISS">
      <VALUE>Miss</VALUE>
   </STRING>
   <STRING NAME="MS">
      <VALUE>Ms</VALUE>
   </STRING>
</CHOICE>
```

3.37 The CHECKBOX Tag

This tag creates a check box of the specified size and location on its parent AREA.

| <CHECKBOX | NAME="id"<br>SIZE="size"<br>POSITION="position"> |
|---|---|
| NAME | common usage which is used for unique identification.<br>This attribute is optional. |
| SIZE | The size in pixels, where size is expressed as a pair of integers *width, height*. This attribute is optional. |
| POSITION | The location in pixel units, where position is expressed as a pair of integers *x-coordinate, y-coordinate*. The origin is the top left corner of the parent container. This attribute is optional. |

Within the scope of this tag the following tags may optionally be defined:
<CAPTION>, <HINT>, <TIP> e.g.

```
...
   <CHECKBOX Position="10,10" NAME="HF" SELECTED="TRUE" />
```

```
...
<CHOICE NAME="PersonHobbies" SELECTION-POLICY="SINGLE">
    <CAPTION>A set of Hobbies</CAPTION>
    <HINT>This is a set of valid hobbies you may choose from.</HINT>
    <STRING NAME="HH"><VALUE>Hunting</VALUE></STRING>
    <STRING NAME="HS"><VALUE>Shooting</VALUE></STRING>
    <STRING NAME="HF"><VALUE>Fishing</VALUE></STRING>
</CHOICE>
```

3.38 The COMBOBOX Tag

This tag creates a dropdown list box of the specified size and location on its parent AREA.

| <COMBOBOX | |
|---|---|
| | NAME="id"<br>SIZE="size"<br>POSITION="position"> |
| NAME | common usage which is used for unique identification.<br>This attribute is optional. |
| SIZE | The size in pixels, where size is expressed as a pair of integers *width, height*. This attribute is optional. |
| POSITION | The location in pixel units, where position is expressed as a pair of integers *x-coordinate, y-coordinate*. The origin is the top left corner of the parent container. This attribute is optional. |

Within the scope of this tag the following tags may optionally be defined:
`<CAPTION>, <HINT>, <TIP>`

The following shows an editable example, The values Mr., Mrs., Miss. And Ms. would appear as items in the dropdown, the editable area would be obtained from the first element. If a value was supplied, this would act as a default which could be over typed.

```
...
<COMBOBOX NAME="PersonTitles" EDITABLE="TRUE">
</COMBOBOX>
...

<CHOICE NAME="PersonTitles" SELECTION-POLICY="SINGLE">
    <CAPTION>A set of Person titles</CAPTION>
    <HINT>This is a set of valid titles you may choose from.</HINT>
    <STRING NAME="Other"></STRING>
    <STRING NAME="MR"><VALUE>Mr.</VALUE></STRING>
    <STRING NAME="MRS"><VALUE>Mrs.<VALUE></STRING>
    <STRING NAME="MISS"><VALUE>Miss.</VALUE></STRING>
    <STRING NAME="MS"><VALUE>Ms.</VALUE></STRING>
</CHOICE>
```

3.39 The LIST Tag

This tag creates a list box of the specified size and location on its parent AREA.

| <LIST | |
|---|---|

|   | NAME="id"<br>SIZE="size"<br>POSITION="position"<br>RENDER-BINDING="binding"> |
|---|---|
| NAME | common usage which is used for unique identification.<br>This attribute is optional. |
| SIZE | The size in pixels, where size is expressed as a pair of integers *width, height*. This attribute is optional. |
| POSITION | The location in pixel units, where position is expressed as a pair of integers *x-coordinate, y-coordinate*. The origin is the top left corner of the parent container. This attribute is optional. |
| RENDER-<br>BINDING | Allow the specification of a string to facilitate binding of this component to task logic that will control the presentation. |

Within the scope of this tag the following tags may optionally be defined:
`<CAPTION>, <HINT>, <TIP>` e.g.
`<LIST NAME="PersonTitles" />`

4. Common Metadata Elements

All elements in a data model can have a number of common attributes which are to provide different degrees of information as to the purpose or function of the element. This defines three levels of information. Each of these levels have associated material which can be used by a renderer, or application, to communicate with the user. All of these elements allow a simple specification of PCDATA which the renderer is responsible to interpret, or one or more elements which contain information in differing media types. This means that either PCDATA or subordinate elements may be specified but not both.

| `<CAPTION>` | This is the most concise item of descriptive information. In a Graphical User Interface this would typically be a text string which is rendered as a field prompt or caption when the parent element is displayed. |
|---|---|
| `<HINT>` | Provides a short description of the purpose for this data item.<br>It should require little, if any, explicit action from the user to cause it to be rendered.<br>With a visual rendering this would typically be rendered in the style of Hover help.<br>With an audio system, an unexpectedly long pause could be the trigger. |
| `<TIP>` | Provides a longer detailed description of the data item, typically a number of sentences. This would not normally be expected to be rendered unless a user explicitly requests it. |

|   | A Graphical User Interface rendering should be able to contain text and/or a hypertext link.[3] |
|---|---|

Each of these common elements is a container. Each target environment will need content in an appropriate media format. The most common (at least for GUI interaction) will be a textual representation, however other formats should be catered for, e.g. Graphical (ICON), speech (Audio), Braille. The container must cater for multiple National Language representations of each of the media types.

A particular renderer might care to exploit more than one media type, e.g. Instead of a GUI renderer relying on text-to-speech, it could utilise any audio available.

|         | <CAPTION>       | <HINT>            | <TIP>              |
|---------|-----------------|-------------------|--------------------|
| Text    | Couple of words | A sentence or two.| A Paragraph or two.|
| Picture | Small "ICON"    | Large Image       | Animation or movie |
| Audio   | Couple of words | A sentence or two.| A Paragraph or two.|
| Braille | Couple of words | A sentence or two.| A Paragraph or two.|
| other.. |                 |                   |                    |

4.1 CAPTION, HINT and TIP

All three of these metadata elements can contain the information in the same media oriented types. These are textual <META-TEXT>, audio <META-AUDIO> and pictorial <META-IMAGE>. Over time it is desirable to move to these being containers of XHTML Semantic modules. http://www.w3.org/TR/xhtml-modularization/xhtml_modules.html All three elements are identical in their attributes and their child elements. The different elements are provided because three different semantic intents are intended.

| <CAPTION <HINT <TIP | STATE="itemState"> |
|---|---|
| STATE | Specifies which state of a data item this metadata item describes. If state is not specified, this element will be used as a default for all states of a data item. Optional. |

Within the scope these elements the following tags may be defined:
`<META-TEXT>, <META-IMAGE>, <META-AUDIO>`

4.4 META-TEXT

| <META-TEXT | > |
|---|---|

Over time this element should expand in the sophistication of the XHTML Semantic modules it should contain. The initial elements are `<P>` from the Block Structural Module and the `<A>` from the Linking Module. The <MN> element is also supported allowing a shortcut, or mnemonic, to be assigned.

4.5 META-IMAGE

| <META-IMAGE | |
|---|---|
| | SRC="URI"> |
| SRC | The specifies the URI of the item which constitutes the value for the image. |

The present specification for the Image Module in XHTML only allows the <IMG> element. It would be possible to make <META-IMAGE> a container like <META-TEXT> and only allow the <IMG> tag but that is rather verbose. This syntax is consistent with both the <IMAGE> elementary datatype and the XHTML <IMG>.

4.6 META-AUDIO

| <META-AUDIO | |
|---|---|
| | SRC="URI"> |
| SRC | The specifies the URI of the item which constitutes the value for the audio stream. |

The present specification for XHTML Semantic modules does not include any audio capabilities. The <META-AUDIO> has been modelled on the <META-IMAGE>.

E.g.
```
<CAPTION>First Name</CAPTION>
```

If a mnemonic is required then the following form must be used:
```
<CAPTION>
    <META-TEXT>First <MN>N</MN>ame</META-TEXT>
</CAPTION>
```
or
```
<CAPTION>
    <META-TEXT>First <MN>N</MN>ame</META-TEXT>
    <META-AUDIO SRC="Http://.............au" />
    <META-IMAGE SRC="Http://.............au" />
</CAPTION>

<TIP>
    <META-TEXT>The first name is also commonly known as the given name or
christian name. This is not the family name, surname or last name. See <A
HREF="Moreonnames.html">more about names</A>.</META-TEXT>
    <META-AUDIO SRC="Http://.............au" />
</TIP>
```

5. Examples

Panel

This example is intended to illustrate how a simple data model with an even simpler presentation model might be rendered in a Web browser:

```
<?xml version="1.0" encoding="UTF-8"?>
<!DOCTYPE UIDML SYSTEM "UIDMLv11.dtd">
<UIDML>
   <DATA-GROUP NAME="GetName">
     <GROUP NAME="PersonName">
       <CAPTION>Person's complete name</CAPTION>
       <CHOICE NAME="PersonTitles"
         SELECTION-POLICY="SINGLE">
         <CAPTION>Title</CAPTION>
         <HINT>This is a set of valid titles for a
         person.</HINT>
         <STRING NAME="Mr">
           <CAPTION>
              <META-TEXT>M<MN>r</MN>.
              </META-TEXT>
           </CAPTION>
         </STRING>
         <STRING NAME="MRS">
           <CAPTION>
              <META-TEXT>
                 <MN>M</MN>rs.
              </META-TEXT>
           </CAPTION>
         </STRING>
         <STRING NAME="MISS">
           <CAPTION>
              <META-TEXT>M<MN>i</MN>ss
              </META-TEXT>
           </CAPTION>
         </STRING>
         <STRING NAME="MS">
           <CAPTION>
              <META-TEXT>M<MN>s</MN>
              </META-TEXT>
           </CAPTION>
         </STRING>
       </CHOICE>
       <STRING NAME="FirstName">
         <CAPTION>First Name</CAPTION>
         <VALUE>Roland</VALUE>
       </STRING>
       <STRING NAME="Initial" MAX-LENGTH="1">
         <CAPTION>Initial</CAPTION>
         <VALUE>A</VALUE>
       </STRING>
       <STRING NAME="LastName">
         <CAPTION>Last Name</CAPTION>
         <VALUE>Merrick</VALUE>
       </STRING>
     </GROUP>
   </DATA-GROUP>
</UIDML>
```

Person's complete name

Title [ Mr. ▾ ]

First
Name [ Roland ]

Initial [ A ]

Last
Name [ Merrick ]

[ OK | Cancel ]

To ensure that the renderer chose the same control to display the list of titles, even if the number of choices for Title were to change two approaches can be taken.

- Modify the data model to indicate an optimum size. This will ensure that the same control is chosen each time but does not specify which control.
  `<CHOICE NAME="PersonTitles" SELECTION-POLICY="SINGLE" OPTIMUM-SIZE="4">`

- Modify the presentation model to indicate a desired control.

```
<PANEL NAME="GetName">
    <CHOICE-AREA NAME="PersonTitles">
      <COMBOBOX />
    </CHOICE-AREA>
</PANEL>
Another example illustrating use of a grid follows:

<PANEL NAME="GetName">
   <GRID-AREA NAME="PersonName" SIZE="400,300" INSETS="20,20,20,20">
     <GRID-COLUMN INDEX="0" EXPANDABLE="FALSE"/>
     <GRID-COLUMN INDEX="1" EXPANDABLE="TRUE"/>

<!-- The caption "Person's complete name" for GROUP NAME="PersonName"
will be generated in the boundary of the GRID-AREA rectangle -->

<GRID-CELL LOCATION="1,1" SPAN="1,2" FILL="BOTH" ANCHOR="CENTER">
       <COMBOBOX NAME="PersonTitles" />
     </GRID-CELL>
     <GRID-CELL LOCATION="2,1" SPAN="1,2" FILL="BOTH" ANCHOR="CENTER">
       <COMPONENT NAME="FirstName" />
     </GRID-CELL>
     <GRID-CELL LOCATION="3,1" SPAN="1,2" FILL="BOTH" ANCHOR="CENTER">
       <COMPONENT NAME="Initial" />
     </GRID-CELL>
     <GRID-CELL LOCATION="4,1" SPAN="1,2" FILL="BOTH" ANCHOR="CENTER">
```

Menus and actions

This example shows a typical set of actions which might be found arranged in a menu bar and the markup necessary to request it rendered as a menu bar.

```
<MENUBAR NAME="validActions">
   <MENU NAME="FileMenu">
      <MENUITEM />
      <MENUITEM />
      <MENUITEM />
      <SEPARATOR />
      <MENUITEM />
   </MENU>
   <MENU NAME="EditMenu" />
   <MENU NAME="ViewMenu" />
</MENUBAR>

<ACTION-GROUP NAME="validActions">
   <ACTION-GROUP NAME="FileMenu">
      <CAPTION><META-TEXT><MN>F</MN>ile</META-TEXT></CAPTION>
      <ACTION NAME="FileNew">
         <CAPTION>
            <META-TEXT><MN>N</MN>ew</META-TEXT>
            <META-IMAGE SRC="http://newObject.gif" />
         </CAPTION>
         <ACCELERATOR KEY="N" MODIFIER="ctrl" />
      </ACTION>
      <ACTION NAME="FileOpen">
         <CAPTION>
            <META-TEXT><MN>O</MN>pen</META-TEXT>
            <META-IMAGE SRC="http://openObject.gif" />
            <ACCELERATOR KEY="O" MODIFIER="ctrl" />
         </CAPTION>
      </ACTION>
      <ACTION>
         <CAPTION>
            <META-TEXT><MN>C</MN>lose</META-TEXT>
         </CAPTION>
      </ACTION>
      <ACTION NAME="FileSave">
         <CAPTION>
            <META-TEXT><MN>S</MN>ave</META-TEXT>
            <META-IMAGE SRC="http://saveObject.gif" />
            <ACCELERATOR KEY="S" MODIFIER="ctrl" />
         </CAPTION>
      </ACTION>
   </ACTION-GROUP>

<ACTION-GROUP NAME="EditMenu">
      <ACTION NAME="ClipboardCut">
         <CAPTION>
```

```
            <META-TEXT>Cu<MN>t</MN></META-TEXT>
            <META-IMAGE SRC="http://cutObject.gif" />
         </CAPTION>
         <ACCELERATOR KEY="X" MODIFIER="ctrl" />
      </ACTION>
      <ACTION NAME="ClipboardCopy">
         <CAPTION>
            <META-TEXT><MN>C</MN>opy</META-TEXT>
            <META-IMAGE SRC="http://copyObject.gif" />
         </CAPTION>
         <ACCELERATOR KEY="C" MODIFIER="ctrl" />
      </ACTION>
      <ACTION NAME="ClipboardPaste">
         <CAPTION>
            <META-TEXT><MN>P</MN>aste</META-TEXT>
         </CAPTION>
         <ACCELERATOR KEY="C" MODIFIER="ctrl" />
      </ACTION>
   </ACTION-GROUP>

<ACTION-GROUP NAME="ViewMenu">
      <CAPTION><META-TEXT><MN>V</MN>iew</META-TEXT></CAPTION>
      <ACTION-LIST SELECTION-POLICY="SINGLE">
         <ACTION>
            <CAPTION>
               <META-TEXT><MN>N</MN>ormal</META-TEXT>
               <META-IMAGE SRC="http://normalObject.gif" />
            </CAPTION>
         </ACTION>
         <ACTION>
            <CAPTION>
               <META-TEXT>Onlin<MN>e</MN> Layout</META-TEXT>
               <META-IMAGE SRC="http://onlineObject.gif" />
            </CAPTION>
         </ACTION>
         <ACTION>
            <CAPTION>
               <META-TEXT><MN>P</MN>age Layout</META-TEXT>
               <META-IMAGE SRC="http://PLObject.gif" />
            </CAPTION>
         </ACTION>
         <ACTION>
            <CAPTION>
               <META-TEXT><MN>O</MN>utline</META-TEXT>
               <META-IMAGE SRC="http://outlineObject.gif" />
            </CAPTION>
         </ACTION>
      </ACTION-LIST>
   </ACTION-GROUP>
</ACTION-GROUP>
```

[1] Elements in all three classes may have associated metadata i.e. <CAPTION>, <HINT>, <TIP>.

[2] Refer to the description of all the shared attribute definitions for elementary data types.

[3] A smart renderer is expected to recognise when the value is only a link and enable a single step navigation to the destination.

TABLE II

```
<?xml version="1.0" encoding="ISO-8859-1"?>

<!--=============================================================-->
<!--                                                             -->
<!-- MRIML.DTD - AUIML MRI Markup Langauge MRIML                 -->
<!--                                                             -->
<!-- COPYRIGHT: International Business Machines Incorporated     -->
<!--   (C) Copyright International Business Machines Incorporated 2000. -->
<!--   Licensed Material - Program Property of IBM - All Rights Reserved. -->
<!--                                                             -->
<!--=============================================================-->
<!ENTITY % MRIML_LANG_LEVEL   "1.0">

<!ELEMENT MRI (MRI-AGGREGATION | CAPTION | HINT | TIP | HELP | TEXT | IMAGE
| AUDIO | VIDEO)*>

<!ELEMENT MRI-AGGREGATION (META-CAPTION?, META-HINT?, META-TIP?,
META-HELP?)>
<!ATTLIST MRI-AGGREGATION NAME CDATA #REQUIRED>

<!ELEMENT META-CAPTION EMPTY>
<!ATTLIST META-CAPTION MRI-NAME CDATA #REQUIRED>

<!ELEMENT META-HINT   EMPTY>
<!ATTLIST META-HINT   MRI-NAME CDATA #REQUIRED>

<!ELEMENT META-TIP    EMPTY>
<!ATTLIST META-TIP    MRI-NAME CDATA #REQUIRED>

<!ELEMENT META-HELP   EMPTY>
<!ATTLIST META-HELP   MRI-NAME CDATA #REQUIRED>

<!ELEMENT CAPTION (META-TEXT?, META-IMAGE?, META-AUDIO?,
META-VIDEO?)>
<!ATTLIST CAPTION STATE CDATA #IMPLIED>
<!ATTLIST CAPTION NAME  CDATA #REQUIRED>

<!ELEMENT HINT (META-TEXT?, META-IMAGE?, META-AUDIO?, META-VIDEO?)>
<!ATTLIST HINT STATE CDATA #IMPLIED>
<!ATTLIST HINT NAME  CDATA #REQUIRED>
```

```
<!ELEMENT TIP (META-TEXT?, META-IMAGE?, META-AUDIO?, META-VIDEO?)>
<!ATTLIST TIP STATE CDATA #IMPLIED>
<!ATTLIST TIP NAME  CDATA #REQUIRED>

<!ELEMENT HELP (META-TEXT?, META-IMAGE?, META-AUDIO?, META-VIDEO?)>
<!ATTLIST HELP STATE CDATA #IMPLIED>
<!ATTLIST HELP NAME  CDATA #REQUIRED>

<!ELEMENT META-TEXT EMPTY>
<!ATTLIST META-TEXT MRI-NAME  CDATA #REQUIRED>

<!ELEMENT META-IMAGE EMPTY>
<!ATTLIST META-IMAGE MRI-NAME  CDATA #REQUIRED>

<!ELEMENT META-AUDIO EMPTY>
<!ATTLIST META-AUDIO MRI-NAME  CDATA #REQUIRED>

<!ELEMENT META-VIDEO EMPTY>
<!ATTLIST META-VIDEO MRI-NAME  CDATA #REQUIRED>

<!ELEMENT TEXT (#PCDATA | P | A | MN | BR)*>
<!-- Allow "Text" or para or anchor or Mnemonic or break -->

<!ELEMENT IMAGE EMPTY>
<!ATTLIST IMAGE SRC   CDATA #REQUIRED>
<!ATTLIST IMAGE NAME  CDATA #REQUIRED>

<!ELEMENT AUDIO EMPTY>
<!ATTLIST AUDIO SRC   CDATA #REQUIRED>
<!ATTLIST AUDIO NAME  CDATA #REQUIRED>

<!ELEMENT VIDEO EMPTY>
<!ATTLIST VIDEO SRC   CDATA #REQUIRED>
<!ATTLIST VIDEO NAME  CDATA #REQUIRED>
```

What is claimed is:

1. A computer program product for flexibly including descriptive items and media types in a user interface, said computer program product embodied on a computer-readable medium and comprising:

computer-readable program code means for processing a first document that specifies user interface (UI) content, wherein said first document is encoded in a markup language and said UI content comprises one or more data items to be rendered to a user;

computer-readable program code means for processing a second document that identifies, in at least one media format, one or more descriptive items, wherein: said second document is encoded in said markup language; each of said descriptive items provides information that is renderable to the user to further describe one or more of the data items; and said first document includes, for selected ones of said data items, a reference to one of the descriptive items;

computer-readable program code means for expanding the reference for each selected one of the data items, thereby creating a media-enhanced version of the first document, wherein the media-enhanced version includes the one or more data items of the UI content and also includes, for each of the selected ones of the data items, the descriptive item referenced therefrom in each of the at least one media formats; and computer-readable program code means for rendering said media-enhanced version of the first document.

2. The computer program product according to claim 1, wherein at least one of the descriptive items is specified as a descriptive media container which identifies multiple media formats for the at least one descriptive item.

3. The computer program product according to claim 2, wherein said descriptive media container further describes a caption for one or more of the data items, a hint for one or more of the data items, a tip for one or more of the data items, or help for one or more of the data items.

4. The computer program product according to claim 2, wherein said first document further specifies an exclusion statement to exclude particular ones of the media formats specified for said descriptive media container, and wherein said computer-readable program code means for expanding further comprises computer-readable program code means for omitting said particular ones of the media formats when creating said media-enhanced version of said first document.

5. The computer program product according to claim 1, wherein the media format for at least one of the descriptive items is specified as a text format, a video format, an audio format, or an image format.

6. The computer program product according to claim 2, wherein said first document further specifies an exclusion statement to exclude said descriptive media container, and wherein said computer-readable program code means for expanding further comprises computer-readable program code means for omitting said descriptive media container when creating said media-enhanced version of the first document.

7. The computer program product according to claim 1, wherein said computer-readable program code means for expanding uses a hash table for quick and efficient retrieval of the descriptive item referenced from each of the selected ones of the data items.

8. The computer program product according to claim 1, wherein said markup language is an Extensible Markup Language (XML) derivative.

9. The computer program product according to claim 8, wherein said XML derivative is an abstract UI markup language (AUIML).

10. The computer program product according to claim 1, wherein a third document is substituted for the second document, the third document being encoded in the markup language and specifying different descriptive items and/or different versions of the one or more descriptive items specified in the second document, such that operation of the computer-readable program code means for expanding automatically creates a different media-enhanced version of the first document for use by the computer-readable program code means for rendering, without requiring change to said first document.

11. The computer program product according to claim 1, wherein:

a third document is substituted for the first document, the third document being encoded in the markup language and specifying at least one data item that differs from the data items in the first document and that includes a reference to one of the descriptive items, such that operation of the computer-readable program code means for expanding automatically creates a different media-enhanced document by reusing said descriptive items in said second document; and the computer-readable program code means for rendering renders the different media-enhanced document.

12. A system for flexibly including descriptive items and media types in a user interface, comprising:

means for processing a first document that specifies user interface (UI) content, wherein said first document is encoded in a markup language and said UI content comprises one or more data items to be rendered to a user;

means for processing a second document that identifies, in at least one media format, one or more descriptive items, wherein: said second document is encoded in said markup language; each of said descriptive items provides information that is renderable to the user to further describe one or more of the data items; and the first document includes, for selected ones of the data items, a reference to one of the descriptive items;

means for expanding the reference for each selected one of the data items, thereby creating a media-enhanced version of the first document, wherein the media-enhanced version includes the one or more data items of the UI content and also includes, for each of the selected ones of the data items, the descriptive item referenced therefrom, in each of the at least one media formats; and means for rendering said media-enhanced version of the first document.

13. The system according to claim 12, wherein at least one of the descriptive item is specified as a descriptive media container which identifies multiple media formats for the at least one descriptive item.

14. The system according to claim 13, wherein said descriptive media container further describes a caption for one or more of the data items, a hint for one or more of the data items, a tip for one or more of the data items, or help for one or more of the data items.

15. The system according to claim 13, wherein the first document further specifies an exclusion statement to exclude particular ones of the media formats specified for the descriptive media container, and wherein said means for expanding further comprises means for omitting said particular ones of the media formats when creating the media-enhanced version of the first document.

16. The system according to claim 12, wherein the media format for at least one of the descriptive items is specified as a text format, a video format, an audio format, or an image format.

17. The system according to claim 13, wherein said first document further specifies an exclusion statement to exclude said descriptive media container, and wherein said means for expanding further comprises means for omitting said descriptive media container when creating the media-enhanced version of the first document.

18. The system according to claim 12, wherein said means for expanding uses a hash table for quick and efficient retrieval of the descriptive item referenced from each of the selected ones of the data items.

19. The system according to claim 12, wherein the markup language is an Extreme Markup Language (XML) derivative.

20. The system according to claim 19, where said XML derivative is an abstract UI markup language (AUIML).

21. The system according to claim 12, wherein a third document is substituted for the second document, the third document being encoded in the markup language and specifying different descriptive items and/or different versions of the one or more descriptive items specified in the second document, such that operation of the means for expanding automatically creates a different media-enhanced version of the first document for use by the means for rendering, without requiring change to the first document.

22. The system according to claim 12, wherein:
- a third document is substituted for the first document, the third document being encoded in the markup language and specifying at least one data item that differs from the data items in the first document and that includes a reference to one of the descriptive items, such that operation of the means for expanding automatically creates a different media-enhanced document by reusing descriptive items in the second document; and
- the means for rendering renders the different media-enhanced document.

23. A method for flexibly including descriptive items and media types in a user interface, comprising the steps of:
- processing a first document that specifies user interface (UI) content, wherein the first document is encoded in a markup language and said UI content comprises one or more data items to be rendered to a user;
- processing a second document that identifies, in at least one media format, one or more descriptive items, wherein: the second document is encoded in the markup language; each of the descriptive items provides information that is renderable to the user to further describe one or more of the data items; and the first document includes, for selected ones of the data items, a reference to one of the descriptive items;
- expanding the reference for each selected one of the data items, thereby creating a media-enhanced version of the first document, wherein the media-enhanced version includes the one or more data items of the UI content and also includes, for each of the selected ones of the data items, the descriptive item referenced therefrom, in each of the at least one media formats; and
- rendering said media-enhanced version of the first document.

24. The method according to claim 23, wherein at least one of the descriptive items is specified as a descriptive media container which identifies multiple media formats for the at least one descriptive item.

25. The method according to claim 24, wherein said descriptive media container further describes a caption for one or more of the data items, a hint for one or more of the data items, a tip for one or more of the data items, or help for one or more of the data items.

26. The method according to claim 24, wherein the first document further specifies an exclusion statement to exclude particular ones of the media formats specified for the descriptive media container, and wherein the expanding step further comprises the step of omitting said particular ones of the media formats when creating the media-enhanced version of the first document.

27. The method according to claim 23, wherein the media format for at least one of the descriptive items is specified as a text format, a video format, an audio format, or an image format.

28. The method according to claim 24, wherein the first document further specifies an exclusion statement to exclude said descriptive media container, and wherein said expanding step further comprises the step of omitting the descriptive media container when creating the media-enhanced version of the first document.

29. The method according to claim 23, wherein the expanding step uses a hash table for quick and efficient retrieval of the descriptive item referenced from each of the selected ones of the data items.

30. The method according to claim 23, wherein the markup language is an Extensible Markup Language (XML) derivative.

31. The method according to claim 30, wherein said XML derivative is an abstract UI markup Language (AUIML).

32. The method according to claim 23, wherein a third document is substituted for the second document, the third document being encoded in the markup language and specifying different descriptive items and/or different versions of the one or more descriptive items specified in the second document, such that operation of the expanding step automatically creates a different media-enhanced version of the first document for use by the rendering step, without requiring change to the first document.

33. The method according to claim 23, wherein:
- a third document is substituted for the first document, the third document being encoded in the markup language and specifying at least one data item that differs from the data items in the first document and that includes a reference to one of the descriptive items, such that operation of the expanding step automatically creates a different media-enhanced document by reusing descriptive items in the second document; and
- the rendering step renders different media-enhanced document.

34. The method according to claim 23, wherein at least one of the descriptive items is specified as a reference to a descriptive item.

35. The method according to claim 23, wherein at least one of the descriptive items is specified as a reference to a descriptive media container which identifies multiple media formats for the at least one descriptive item.

* * * * *